(12) United States Patent  (10) Patent No.: US 8,173,315 B2
Yoshida  (45) Date of Patent: May 8, 2012

(54) FUEL BATTERY SYSTEM, METHOD FOR DETECTING GAS LEAKAGE IN SUCH SYSTEM, AND MOBILE OBJECT

(75) Inventor: Naohiro Yoshida, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 919 days.

(21) Appl. No.: 11/922,357

(22) PCT Filed: Jun. 30, 2006

(86) PCT No.: PCT/JP2006/313534
§ 371 (c)(1),
(2), (4) Date: Dec. 17, 2007

(87) PCT Pub. No.: WO2007/004719
PCT Pub. Date: Jan. 11, 2007

(65) Prior Publication Data
US 2009/0239105 A1  Sep. 24, 2009

(30) Foreign Application Priority Data

Jul. 1, 2005 (JP) ................................. 2005-194377

(51) Int. Cl.
H01M 8/04 (2006.01)
H01M 2/38 (2006.01)
H01M 2/40 (2006.01)
H01M 8/24 (2006.01)

(52) U.S. Cl. ......... 429/443; 429/444; 429/446; 429/455

(58) Field of Classification Search .................. 429/443, 429/444, 455, 446
See application file for complete search history.

(56) References Cited

U.S. PATENT DOCUMENTS

| | | | | |
|---|---|---|---|---|
| 5,302,471 A * | 4/1994 | Ito et al. | ........................ | 429/442 |
| 6,294,277 B1 * | 9/2001 | Ueno et al. | .................... | 429/413 |
| 6,662,633 B2 * | 12/2003 | Pratt | ........................... | 73/40.5 R |
| 6,815,107 B2 * | 11/2004 | Inai et al. | ....................... | 429/432 |
| 2002/0192519 A1 | 12/2002 | Fujita et al. | | |
| 2004/0099048 A1 | 5/2004 | Miura et al. | | |

FOREIGN PATENT DOCUMENTS

| | | |
|---|---|---|
| DE | 102 42 162 A1 | 3/2004 |
| JP | 2003-148252 A | 5/2003 |
| JP | 2003-308866 A | 10/2003 |
| JP | 2004-95425 A | 3/2004 |
| JP | 2004-170321 A | 6/2004 |
| JP | 2006-134861 A | 5/2006 |
| WO | WO 2006/033426 A1 | 3/2006 |
| WO | WO 2006/082993 A1 | 8/2006 |

* cited by examiner

*Primary Examiner* — Patrick Ryan
*Assistant Examiner* — Julian Anthony
(74) *Attorney, Agent, or Firm* — Kenyon & Kenyon LLP

(57) ABSTRACT

The accuracy of detecting gas leakage in a fuel battery system is improved. A fuel battery system includes a fuel battery to which a reactive gas is supplied to generate power, and a gas passage (a fuel gas supply path and a fuel gas circulation path) connected to this fuel battery, this gas passage is provided with a plurality of adjoining closed spaces, and the system includes a detecting unit (a control section) to detect gas leakage in one closed space in a state in which at least a pressure of another closed space adjoining the one closed space as a gas leakage detection target on a downstream side is lowered.

6 Claims, 34 Drawing Sheets

FUEL BATTERY SYSTEM, METHOD FOR DETECTING GAS LEAKAGE IN SUCH SYSTEM, AND MOBILE OBJECT

This is a 371 national phase application of PCT/JP2006/313534 filed 30 Jun. 2006, which claims priority of Japanese Patent Application No. 2005-194377 filed 01 Jul. 2005, the contents of which are incorporated herein by reference.

TECHNICAL FIELD

The present invention relates to a fuel battery system, a method for detecting gas leakage in such a system, and a mobile object.

BACKGROUND ART

At present, a fuel battery system which generates power by an electrochemical reaction of a reactive gas (a fuel gas and an oxidizing gas) is proposed and put to practical use. In such a fuel battery system, it is very important to quickly and accurately detect gas leakage in a gas passage for the reactive gas.

For example, in Japanese Patent Application Laid-Open No. 2003-308866, a technology is proposed in which when an electric load of a fuel battery is small, power generation of the fuel battery is stopped, a predetermined closed space is formed in a gas circulation supply system of the fuel battery system, and leakage of the fuel gas is detected based on a pressure state in this closed space.

Moreover, in Japanese Patent Application Laid-Open No. 2004-170321, a technology is proposed in which a pressure on an upstream side of a closed space formed in the gas circulation supply system of the fuel battery system is set to be larger than that of the closed space, a pressure on a downstream side of the space is set to be smaller than that of the closed space, and the leakage of the fuel gas is detected in this state based on a pressure change of the closed space.

DISCLOSURE OF THE INVENTION

In the technology described in Japanese Patent Application Laid-Open No. 2003-308866, the gas leakage is detected based on the pressure state in the closed space, but even in a case where power generation of a fuel battery is stopped, a reactive gas flows through a gas passage for a while. Therefore, even when there is not any gas leakage in the gas passage, a pressure change in the closed space might occur.

Moreover, in the technology described in Japanese Patent Application Laid-Open No. 2003-308866, when the gas leakage is detected, the closed space needs to be formed in the gas passage, but this closed space cannot sometimes securely be formed, depending on the system. In such a case, since a gas flows into the closed space as a detection object, the pressure state in the closed space as the detection object changes, and the detection of the gas leakage is disturbed.

Furthermore, in the technology described in Japanese Patent Application Laid-Open No. 2004-170321, when a pressure of the closed space becomes lower than a predetermined pressure, it cannot be specified whether the gas leakage is generated at a valve on a downstream side of the closed space or at a pipe of a closed space other than the valve.

As described above, in a gas leakage detection system based on the only pressure state in the closed space, there have been a problem of incorrect detection and a problem that a leakage portion cannot be specified.

The present invention has been developed in view of the above-mentioned situation, and an object is to improve accuracy of gas leakage detection in a fuel battery system.

To solve the above-mentioned problem, a fuel battery system according to the present invention has: a fuel battery to which a reactive gas is supplied to generate power; a gas passage which communicates with the fuel battery; a plurality of valves which are disposed halfway in the gas passage and which form a plurality of adjoining closed spaces in the gas passage; a first pressure sensor which measures a pressure of a first closed space as a gas leakage detection target; a second pressure sensor which measures a pressure of a second closed space adjoining the first closed space on a downstream side; and detecting means for detecting gas leakage in the first closed space based on a pressure measurement result of the first pressure sensor and a pressure measurement result of the second pressure sensor in a state in which the pressure of the second closed space is lowered below the pressure of the first closed space.

According to such a constitution, since not only a pressure drop (a pressure change) of the first closed space as the gas leakage detection target but also a pressure rise (a pressure change) of the second closed space adjoining the first closed space on the downstream side can be measured, as a gas leakage mode of the first closed space, it is possible to detect not only the gas leakage (external leakage) due to crack of a wall surface of a gas passage pipe which defines a part of the first closed space but also gas leakage (internal leakage) to the second closed space due to valve closing abnormality (e.g., a seal defect) of a valve (sealing means) for forming the first closed space in the gas passage. Therefore, as compared with a case where an only conventional gas leakage detection system to detect the gas leakage based on an only pressure state in the first closed space is employed, accuracy of the gas leakage detection can be improved.

Here, it is meant that the "reactive gas" includes not only a fuel gas to be supplied to the fuel battery but also an oxidizing gas to be supplied to the fuel battery. The "gas passage" is at least one of a gas supply passage, a gas circulation passage and a gas discharge passage of the reactive gas to be supplied to the fuel battery. The gas passage as the target of the gas leakage detection is at least one of a gas passage on the side of the fuel gas and a gas passage on the side of the oxidizing gas, or may be both of them. Therefore, in the above-mentioned constitution, "to detect the gas leakage in the first closed space" means that the gas leakage is detected in at least a part of an area of the gas passages on the fuel gas side and the oxidizing gas side. It is to be noted that the "gas leakage" means that the gas leaks from the gas passage with respect to the first closed space owing to an abnormality (e.g., failure) of the valve arranged along the gas passage, damage on the pipe or the like.

For example, the detecting means detects the gas leakage from the valve disposed between the first closed space and the second closed space, in a case where a pressure reduction value of the first closed space is a predetermined threshold value or more and a pressure rise value of the second closed space is a predetermined threshold value or more.

It is preferable that the system further has a third pressure sensor disposed in a third closed space which adjoins the second closed space on the downstream side. In this case, the detecting means detects the gas leakage from the first closed space other than the valve based on a pressure measurement result of a new closed space including the first closed space and the second closed space in a state in which the pressure of the third closed space is lowered below the pressure of the second closed space, in a case where the pressure reduction value of the first closed space is a predetermined threshold value or more and the pressure rise value of the second closed space is less than a predetermined threshold value.

According to such a constitution, in a case where the pressure of the second closed space adjoining the first closed space as the gas leakage detection target on the downstream side rises, since two closed spaces are allowed to communicate with each other so that the gas leakage (the abnormality) can be detected from one closed space, the gas leakage can easily and quickly be detected in the whole system.

Moreover, in the fuel system, the detecting means is configured to detect the gas leakage of the closed space including at least one pressure reduction valve.

Furthermore, a mobile object according to the present invention comprises the fuel battery system.

In a case where such a constitution is employed, since the fuel battery system having high accuracy of gas leakage detection is disposed, safety of the mobile object can be improved.

In addition, a method for detecting gas leakage in a fuel battery system according to the present invention is a method for detecting gas leakage in a fuel battery system including a fuel battery to which a reactive gas is supplied to generate power, and a gas passage which communicates with the fuel battery and in which a plurality of adjoining closed spaces are formed, the method comprising: a first step of lowering a pressure of another closed space adjoining at least one closed space as a gas leakage detection target on a downstream side below a pressure of the one closed space; a second step of judging whether or not a pressure reduction value in the one closed space for a predetermined time is a predetermined threshold value or more; and a third step of judging whether or not the pressure of the other closed space has risen, in a case where affirmative judgment is performed in the second step.

According to such a method, in a state in which the pressure of the other closed space adjoining at least one closed space as the gas leakage detection target on the downstream side is lowered below the pressure of the one closed space, judgment of a pressure state in the one closed space judgment whether or not the pressure reduction value for the predetermined time is the predetermined threshold value or more) and judgment of a pressure state in the other closed space (judgment whether or not the pressure has risen), so that the gas leakage in the one closed space can easily and securely be detected. That is, when the pressure state of the one closed space has an abnormality (the pressure reduction value for the predetermined time is the predetermined threshold value or more) and the pressure state in the other closed space adjoining the one closed space on the downstream side is normal (no pressure rise), it can be judged that the gas leakage from the gas passage is generated owing to crack of a wall surface of a gas pipe in the one closed space or the like. On the other hand, when the pressure state in the other closed space has an abnormality (the pressure rise), it can be judged that there occurs the gas leakage from the one closed space to the other closed space due to a valve closing abnormality of a valve (sealing means) forming the closed space, that is, the gas leakage in the gas passage. Therefore, the accuracy of the gas leakage detection can be improved.

In the method for detecting the gas leakage in the fuel battery system, it is preferable that when affirmative judgment is performed in the third step, a new closed space is set from the one closed space and the other closed space to repeat the first to third steps.

In this case, when the pressure state in the one closed space has an abnormality (the pressure reduction value for the predetermined time is the pressure threshold value or more) and the pressure state in the other closed space adjoining the one closed space on the downstream side has an abnormality (there is a pressure rise), two closed spaces can be allowed to communicate with each other so that the gas leakage (the abnormality) can be detected from one closed space. Therefore, the gas leakage can easily and quickly be detected in the whole system.

Figure 1:
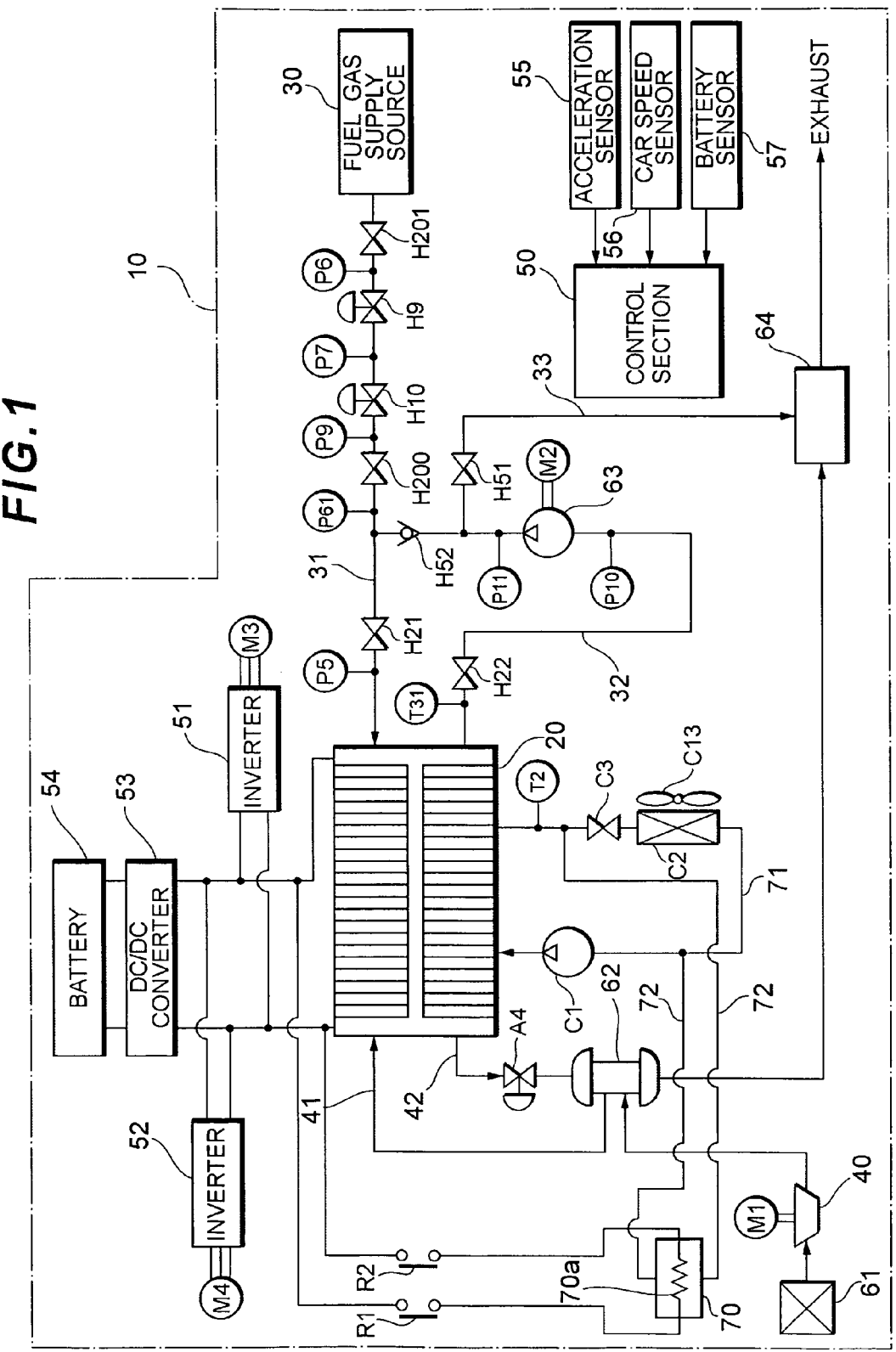
FIG. 1 is a block diagram showing a constitution of a fuel battery system according to a first embodiment of the present invention.

BEST MODE FOR CARRYING OUT THE INVENTION (First Embodiment)

Next, a preferable embodiment for carrying out the present invention will be described with reference to the drawings. The following embodiment is merely one configuration of the present invention, and the present invention is not limited to this embodiment, and is applicable.

First, a constitution of a fuel battery system 10 according to the embodiment of the present invention will be described with reference to FIG. 1. It is to be noted that in the present embodiment, an example will be described in which the fuel battery system 10 is used as a power generation system to be mounted on a fuel battery vehicle (fuel cell hybrid vehicle; FCHV), but the system may be used as a power generation system to be mounted on a mobile object (e.g., a ship, an airplane, a robot, etc.) other than the vehicle or a stationary power generation system.

The fuel battery system 10 includes a fuel battery 20, a fuel gas supply system and an oxidizing gas supply system connected to the fuel battery 20, and a cooling system which cools the fuel battery 20. The fuel battery 20 includes a stack structure in which a plurality of cells are laminated, and is constituted of, for example, a solid polymer electrolytic fuel battery or the like.

The fuel gas supply system connected to the fuel battery 20 generically refers to gas pipes, valves and the like arranged along a path to supply a fuel gas to the fuel battery 20. As shown in FIG. 1, the system includes a fuel gas supply source 30, a fuel gas supply path 31, a fuel gas circulation path 32 and an anode off gas passage 33. At least a part of the fuel gas supply path 31, the fuel gas circulation path 32 and the anode off gas passage 33 corresponds to one embodiment of a gas passage in the present invention.

The fuel gas supply source 30 is constituted of a hydrogen storage source such as a high pressure hydrogen tank or a hydrogen storage tank, a reforming unit which reforms a reforming material into a hydrogen rich gas and the like. The fuel gas supply path 31 is a gas passage for guiding the fuel gas discharged from the fuel gas supply source 30 to an anode pole of the fuel battery 20. As shown in FIG. 1, the gas passage is provided with a tank valve H201, a high pressure regulator H9, a low pressure regulator H10, a hydrogen supply valve H200 and an FC inlet valve H21 in order from an upstream side to a downstream side. A pressure of the fuel gas compressed to a high pressure is reduced to an intermediate pressure in the high pressure regulator H9, and further reduced to a low pressure (a usual operation pressure) in the low pressure regulator H10. It is to be noted that the high pressure regulator H9 and the low pressure regulator H10 correspond to one embodiment of a pressure reduction valve in the present invention.

The fuel gas circulation path 32 is a reflow gas passage for allowing an unreacted fuel gas in the anode pole to reflow to the fuel battery 20. As shown in FIG. 1, the passage is provided with an FC outlet valve H22, a hydrogen pump 63 and a check valve H52 in order from the upstream side to the downstream side. The low-pressure unreacted fuel gas discharged from the fuel battery 20 is appropriately pressurized by the hydrogen pump 63, and guided to the fuel gas supply path 31. The check valve H52 inhibits counter flow of the fuel gas from the fuel gas supply path 31 to the fuel gas circulation path 32. The anode off gas passage 33 is a gas passage for discharging a hydrogen off gas discharged from the fuel battery 20 to the outside of the system. As shown in FIG. 1, the passage is provided with a purge valve H51.

The tank valve H201, the hydrogen supply valve H200, the FC inlet valve H21, the FC outlet valve H22 and the purge valve H51 described above are shut valves for supplying or shutting the fuel gas with respect to the gas passages 31 to 33 and the fuel battery 20, and are constituted of, for example, electromagnetic valves. As such an electronic valve, for example, an on/off-valve, a linear valve in which a valve open degree can linearly be regulated under PWM control or the like is preferable.

It is to be noted that the FC inlet valve H21, the FC outlet valve H22 and the check valve H52 may be omitted. The hydrogen supply valve H200 may be omitted.

The fuel gas supply system is constituted of four sections of a high pressure section (a section of the tank valve H201 to the hydrogen supply valve H200), a low pressure section (the hydrogen supply valve H200 to the FC inlet valve H21), an FC section (the stack inlet valve H21 to the FC outlet valve H22) and a circulating section (the FC outlet valve H22 to the check valve H52). In the present embodiment, a closed space is formed for each section (the high pressure section, the low pressure section, the FC section and the circulating section), and gas leakage detection is performed for each of these closed spaces. In the present embodiment, in a case where the gas leakage is detected in a certain closed space, it is assumed that the gas leakage detection is performed in a new closed space constituted of the closed space and a closed space adjoining the closed space.

Moreover, as another embodiment, the closed space may include two sections of the high pressure section and the low pressure section. The low pressure section in this case is constituted of the low pressure section (the hydrogen supply valve H200 to the FC inlet valve H21), the FC section and the circulating section of the present embodiment.

Each section is provided with pressure sensors P6, P7, P9, P61, P5, P10 and P11 which measure a pressure of the fuel gas. The pressure sensor P6 measures a fuel gas supply pressure of the fuel gas supply source 30. The pressure sensor P7 measures a secondary pressure of the high pressure regulator H9. The pressure sensor P9 measures a secondary pressure of the low pressure regulator H10. The pressure sensor P61 measures a pressure of the low pressure section of the fuel gas supply path 31. The pressure sensor P5 measures a pressure of a stack inlet. The pressure sensor P10 measures a pressure of the hydrogen pump 63 on the side of an input port (an upstream side). The pressure sensor P11 measures a pressure of the hydrogen circulation pump 63 on the side of an output port (the downstream side). It is to be noted that positions and the number of the pressure sensors may appropriately be changed depending on the number of the valves (the number of the closed spaces).

The oxidizing gas supply system connected to the fuel battery 20 generically refers to gas pipes, valves and the like arranged along a path to supply an oxidizing gas to the fuel battery 20. As shown in FIG. 1, the system includes an air compressor (an oxidizing gas supply source) 40, an oxidizing gas supply path 41 and a cathode off gas channel 42.

As shown in FIG. 1, the air compressor 40 compresses air captured from outside air via an air filter 61, and supplies the compressed air as the oxidizing gas to a cathode pole of the fuel battery 20. An oxygen off gas subjected to a battery reaction of the fuel battery 20 flows through the cathode off gas channel 42, and is discharged from the system. The oxygen off gas contains water produced by the battery reaction in the fuel battery 20, and therefore has a highly wet state. A humidification module 62 performs water content exchange between a lowly wet oxidizing gas flowing through the oxidizing gas supply path 41 and a highly wet oxygen off gas flowing through the cathode off gas channel 42 to appropriately humidify the oxidizing gas to be supplied to the fuel battery 20.

As shown in FIG. 1, a back pressure of the oxidizing gas to be supplied to the fuel battery 20 is regulated by a pressure regulation valve A4 disposed around a cathode outlet of the cathode off gas channel 42. The cathode off gas channel 42 on the downstream side communicates with a dilution unit 64 to supply the oxygen off gas to the dilution unit 64. The dilution unit 64 also communicates with the anode off gas channel 33 on the downstream side, and is constituted to mix and dilute the hydrogen off gas with the oxygen off gas and then discharge the gas from the system.

As shown in FIG. 1, a cooling system which cools the fuel battery 20 includes a cooling water path 71, a circulation pump C1, a radiator C2, a bypass valve C3 and a heat exchanger 70. The circulation pump C1 circulates a refrigerant flowing through the fuel battery 20 via the cooling water path 71. The cooling water path 71 is provided with bypass channels 72 which guide the refrigerant to the heat exchanger 70 without passing any refrigerant thorough the radiator C2. A fan C13 is rotated to lower a temperature of the refrigerant in the radiator C2.

The heat exchanger 70 includes a heater 70a, and receives supply of power from the fuel battery 20 to heat the heater 70a, thereby raising the temperature of the refrigerant. The power supply from the fuel battery 20 to the heat exchanger 70 can be controlled by turning on/off relays R1, R2. The radiator C2 on the upstream side is provided with the bypass valve C3, and it is constituted that a valve open degree of the bypass valve C3 is regulated to control a flow rate of the refrigerant flowing toward the radiator C2 and the heat exchanger 70, so that the refrigerant temperature can be regulated.

As shown in FIG. 1, a pressure of a part of direct-current power generated in the fuel battery 20 is lowered by a DC/DC converter 53, and a battery (a power accumulation device) 54 is charged. A traction inverter 51 and an auxiliary inverter 52 converts the direct-current power supplied from both or one of the fuel battery 20 and the battery 54 into alternating-current power to supply the alternating-current power to a traction motor M3 and an auxiliary motor M4, respectively. The auxiliary motor M4 generically refers to a motor M2 which drives the hydrogen pump 63, a motor M1 which drives the air compressor 40 and the like. It is to be noted that instead of the battery 54, various secondary batteries (lithium ions, nickel hydrogen) and capacitors may be used as the power accumulation device.

As shown in FIG. 1, a control section 50 obtains system required power (the sum of vehicle running power and auxiliary machine power) based on an accelerator open degree detected by an acceleration sensor 55 which detects acceleration request with respect to a vehicle, a car speed detected by a car speed sensor 56 and the like, and controls the fuel battery system 10 so that output power of the fuel battery 20 agrees with target power. Specifically, the control section 50 regulates the rotation number of the motor M1 which drives the air compressor 40 to regulate an amount of the oxidizing gas to be supplied. Moreover, the section controls opening/closing of various valves of the fuel gas supply system, and regulates the rotation number of the motor M2 which drives the hydrogen pump 63, to regulate an amount of the fuel gas to be supplied. The control section 50 also controls the DC/DC converter 53 to regulate an operation point (output voltage, output current) of the fuel battery 20, and performs the regulation so that the output power of the fuel battery 20 agrees with target power.

Moreover, the control section 50 detects fuel gas leakage for each of closed space formed in the sections (the high pressure section, the low pressure section, the FC section and the circulating section) of the fuel gas supply system. In this case, the control section 50 detects gas leakage of one closed space in a state in which a pressure of another closed space adjoining at least the one closed space as a gas leakage detection target on the downstream side is lowered. In a case where a pressure of the one closed space as the gas leakage detection target on the downstream side rises, the control section 50 detects gas leakage of a new closed space constituted of this one closed space and the other closed space adjoining this one closed space on the downstream side. That is, the control section 50 functions as one embodiment of detecting means in the present invention.

Next, system control to be executed by the control section 50 of the fuel battery system 10 according to the embodiment of the present invention will be described with reference to FIGS. 2 to 29.

Figure 2:
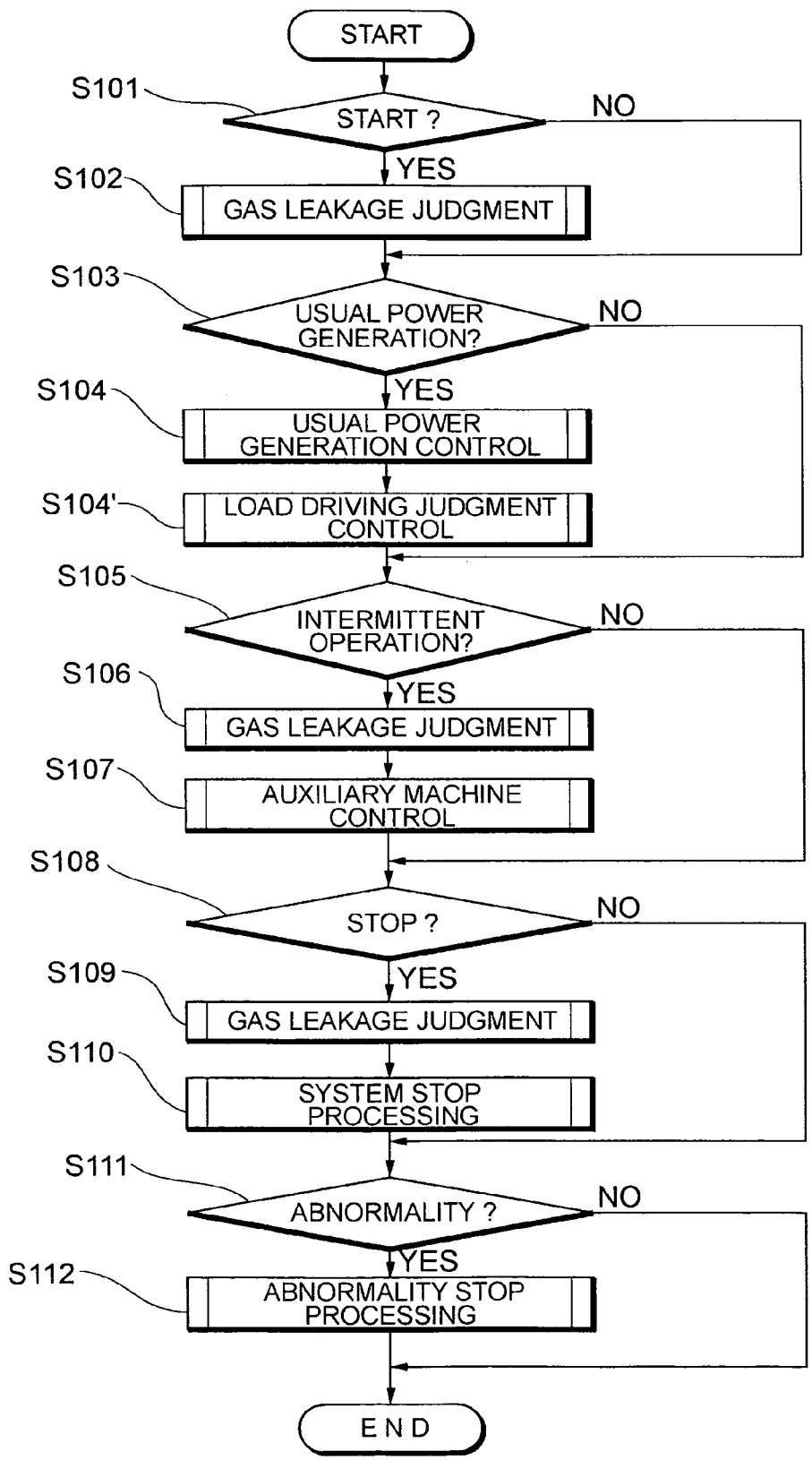
FIG. 2 shows a main routine of system control capacitor the first embodiment of the present invention.

First, an outline of system control (a main routine) to be executed by the control section 50 of the fuel battery system 10 will be described with reference to a flow chart of FIG. 2, and afterward sub-routines will be described with reference to flow charts of FIGS. 3 to 29.

First, when the fuel battery system 10 starts (S101; YES), the control section 50 judges gas leakage of the fuel gas supply system (S102). Here, in a case where it is judged that there is not any gas leakage and that the power can normally be generated (S102; YES), usual power generation control is performed (S104), and then load driving judgment control is performed (S104'). When a usual operation is continued in this manner and predetermined intermittent operation start conditions are satisfied (S105; YES), power generation is stopped, and the control section 50 judges the gas leakage of the fuel gas supply system (S106). Here, an intermittent operation is an operation mode in which the power generation of the fuel battery 20 is temporarily halted at a low load operation time as in an idling time, a low speed running time, a regenerative braking time or the like, and running is performed with the power supplied from the battery 54.

Subsequently, when the fuel battery 20 has a surplus amount of the power to be generated, auxiliary machine control is performed in order to increase power consumption of auxiliary machines (S107). Then, when system stop is performed (S108; YES), the control section 50 judges the gas leakage of the fuel gas supply system (S109), and performs system stop processing (S110). When the gas leakage is detected (S111; YES), abnormality stop processing is performed (S112). It is to be noted that the auxiliary machine control of S107 may be performed after the load driving judgment control of S104'.

Figure 3:
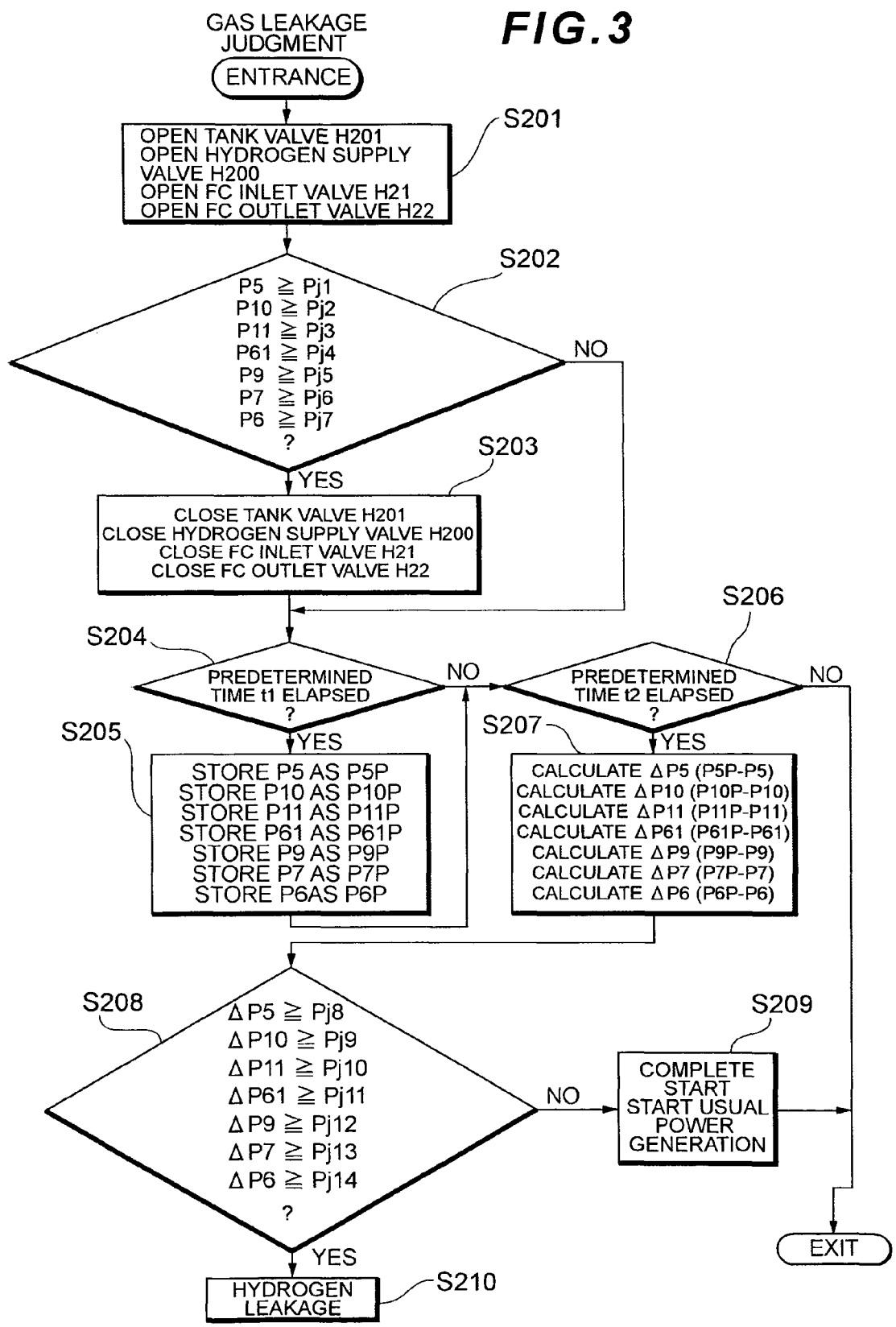
FIG. 3 shows a gas leakage judgment processing routine at the start of the system in the system control according to the first embodiment of the present invention.

Next, the respective sub-routines will be described. FIG. 3 is a flow chart showing the gas leakage judgment processing routine (S102) at the start of the system. When such a gas leakage judgment processing routine is called, the control section 50 opens the tank valve H201, the hydrogen supply valve H200, the FC inlet valve H21 and the FC outlet valve H22, and supplies the fuel gas to the fuel battery 20 through the fuel gas supply path 31 (S201).

Subsequently, the control section 50 judges whether or not pressure values of all the pressure sensors P5 to P6 arranged in the fuel gas supply system are predetermined pressure values Pj1 to Pj7 or more (S202). In a case where all the pressure sensors P5 to P6 reach the predetermined pressure values Pj1 to Pj7 or more and the pressures of the fuel gas supply path 31 and the fuel gas circulation path 32 rise to such an extent that the gas leakage judgment is performed (S202; YES), the control section 50 closes the tank valve H201, the hydrogen supply valve H200, the FC inlet valve H21 and the FC outlet valve H22 (S203). Such valves are closed, whereby the closed spaces are formed in the sections (the high pressure section, the low pressure section, the FC section and the circulating section) of the fuel gas supply path 31 and the fuel gas circulation path 32.

After elapse of a predetermined time t1 from a time when the closed spaces are formed in this manner (S204), the control section 50 stores the pressure values of the pressure sensors P5 to P6 as P5P to P6P (S205). Furthermore, in a case where a predetermined time t2 elapses after the closed spaces are formed (S206), the control section 50 calculates differential pressures $\Delta P5$ to $\Delta P6$ between the stored pressure values P5P to P6P and the pressure values measured by the pressure sensors P5 to P6 after the elapse of the predetermined time t2 (S207). Here, the obtained differential pressures $\Delta P5$ to $\Delta P6$ correspond to a pressure drop amount in a predetermined time (t2-t1).

The control section 50 judges whether or not the respective differential pressures $\Delta P5$ to $\Delta P6$ are predetermined pressure values pj8 to Pj14 or more (S208). When all the differential pressures ΔP5 to ΔP6 are the predetermined pressure values pj8 to Pj14 or less (S208; NO), it is supposed that there is not any gas leakage, and hence system start is completed to start usual power generation (S209). On the other hand, when one of the differential pressures ΔP5 to ΔP6 is the predetermined pressure values pj8 to Pj14 or more (S208; YES), the control section 50 judges that the gas leakage occurs (S210).

Figure 4:
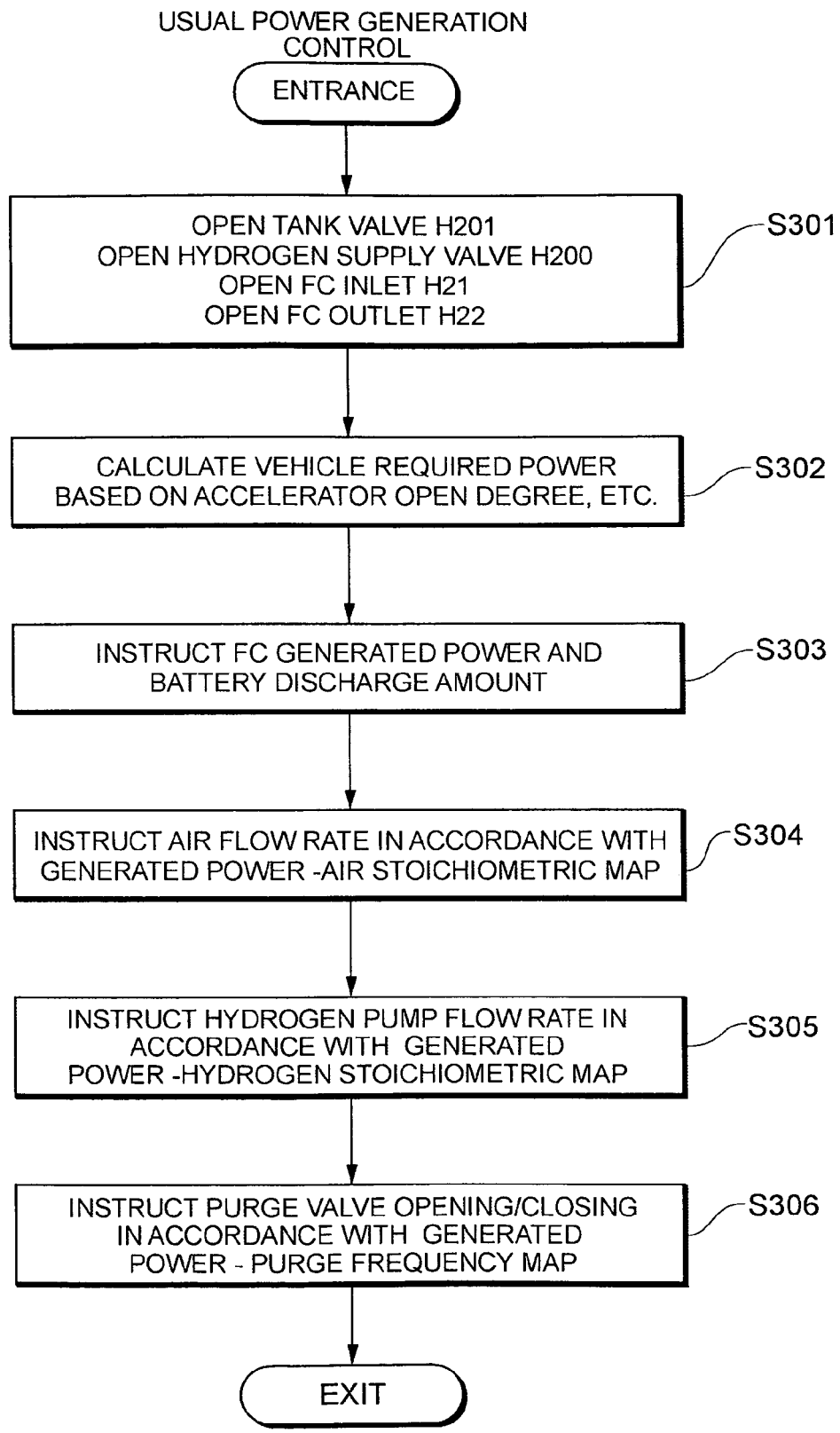
FIG. 4 shows a usual power generation control routine in the system control according to the first embodiment of the present invention.

FIG. 4 is a flow chart showing the usual power generation control routine (S104). When such a usual power generation control routine is called, the control section 50 opens the valves (the tank valve H201, the hydrogen supply valve H200, the FC inlet valve H21 and the FC outlet valve H22) of the fuel gas supply system (S301). Subsequently, the control section calculates vehicle required power (system required power) based on an accelerator open degree, a car speed or the like (S302), and determines a ratio between the output power of the fuel battery 20 and the output power of the battery 54 (S303). The control section 50 controls the rotation number of the motor M1 with reference to a fuel battery generated power-air stoichiometric map so that the oxidizing gas is supplied to the fuel battery 20 at a desired flow rate (S304). Furthermore, the control section 50 controls various valves of the fuel gas supply system and the rotation number of the motor M2 with reference to a fuel battery generated power-hydrogen stoichiometric map so that the fuel gas is supplied to the fuel battery 20 at a desired flow rate (S305). Subsequently, the control section 50 controls opening/closing of the purge valve H51 with reference to a fuel battery generated power-fuel gas purge frequency map (S306).

Figure 5:
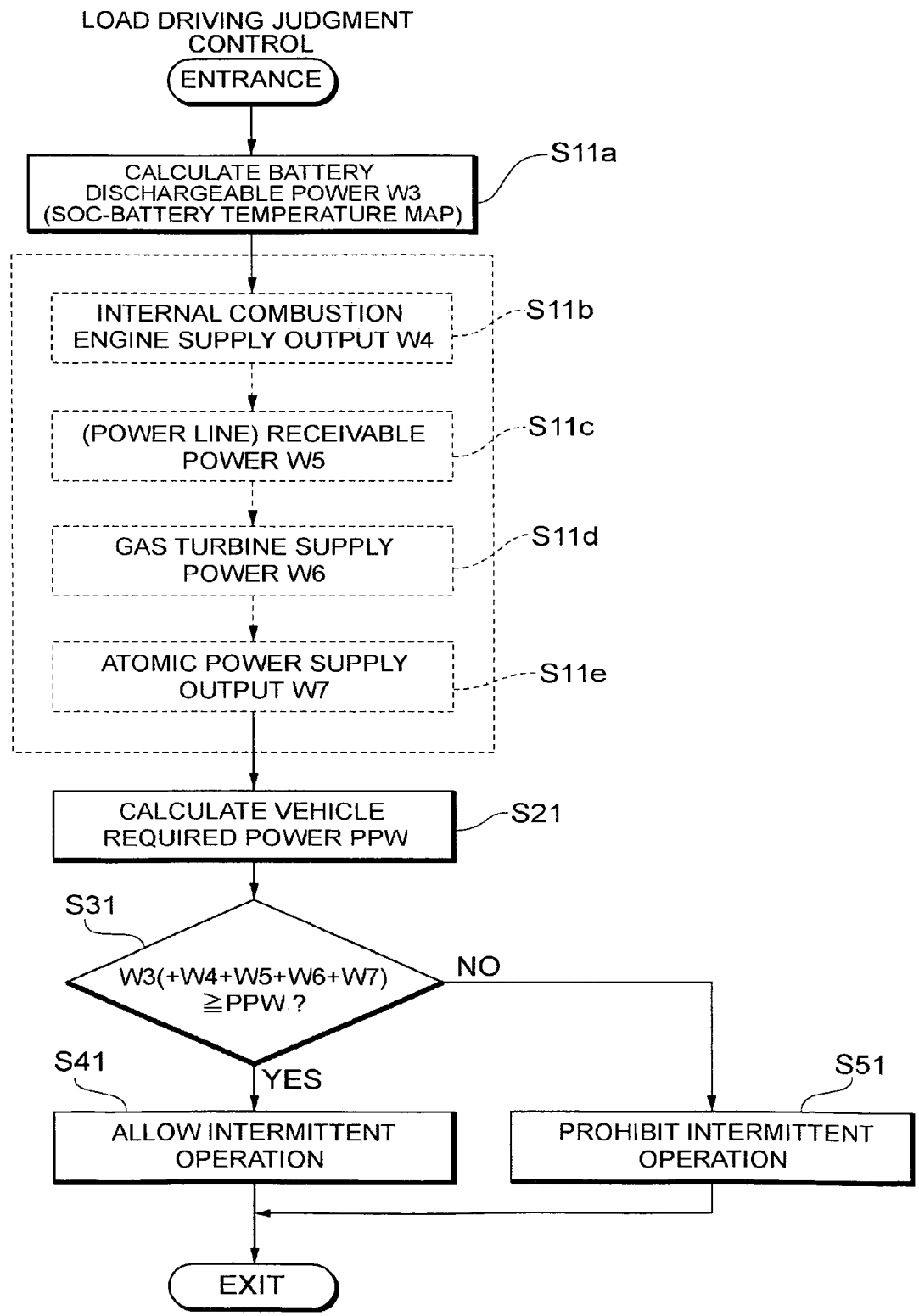
FIG. 5 shows a load driving judgment control routine in the system control according to the first embodiment of the present invention.

FIG. 5 is a flow chart showing the load driving judgment control routine (S104') to be executed after ending the usual power generation control routine. When such a load driving judgment control routine is called, the control section 50 calculates an amount (a battery dischargeable power) W3 of the power which can be supplied to loads (e.g., power consumption devices such as the motors M1, M2) by the battery 54 with reference to a detection signal supplied from a battery sensor 57 and an SOC-battery temperature map (S11a). Subsequently, the control section 50 calculates a vehicle required power (a system required power) PPW based on an accelerator open degree, a vehicle speed and the like (S21), and judges whether or not the battery dischargeable power W3 is the vehicle required power PPW or more (i.e., whether or not a power not less than the system required power can be supplied from the battery 54 to the load) (S31). When the control section 50 can obtain an affirmative result (S31; YES), the section allows shift from a usual operation to an intermittent operation (S41), and starts such control as to drive the load with the battery 54 only. On the other hand, when the control section 50 can obtain a negative result (S31; NO), the section prohibits the shift from the usual operation to the intermittent operation (S51), and drives the load by use of the fuel battery 20 and the battery 54 together. The above-mentioned usual power generation control routine and load driving judgment control routine are repeatedly executed at predetermined intervals.

Figure 6:
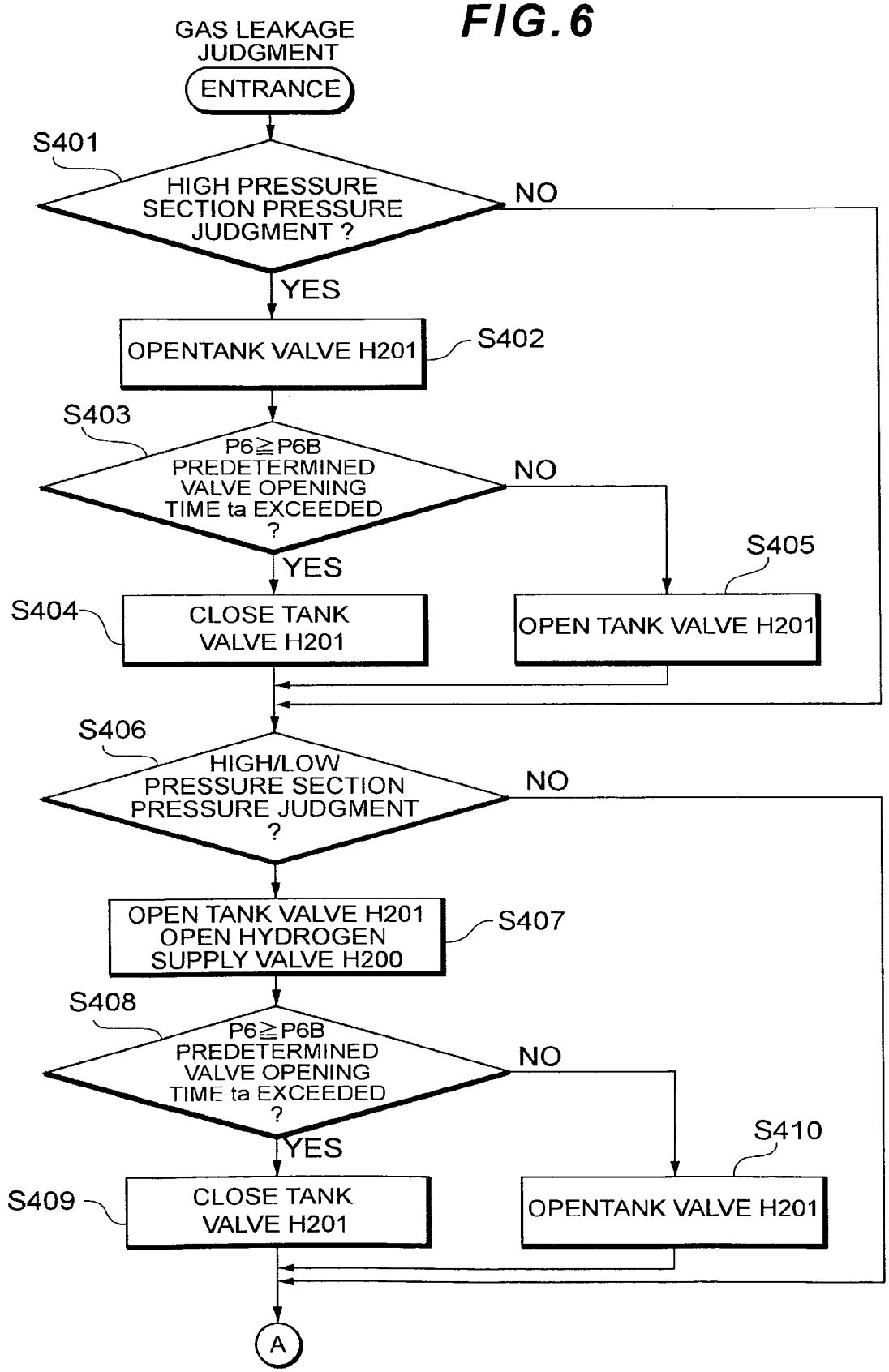
FIGS. 6 to 25 show a gas leakage judgment processing routine in the system control according to the first embodiment of the present invention.

FIGS. 6 to 25 are flow charts showing the gas leakage judgment processing routines (S106, S109) during the intermittent operation or system stop. When such a gas leakage judgment processing routine is called, the control section 50 performs pressure judgment of the high pressure section (S401). The pressure judgment is to judge whether or not the pressure of each section reaches a pressure required for the gas leakage judgment. As shown in FIG. 6, first the control section 50 opens the tank valve H201 (S402). When the pressure measured by the pressure sensor P6 is a predetermined threshold value P6B or more and this state is sustained in excess of a predetermined valve opening time ta (S403; YES), the section closes the tank valve H201 (S404). On the other hand, in a case where the pressure measured by the pressure sensor P6 is less than the predetermined threshold value P6B, or in a case where the pressure measured by the pressure sensor P6 is the predetermined threshold value P6B or more, but the state is not sustained in excess of the predetermined valve opening time ta (S403; NO), the tank valve H201 is left to open (S405).

Subsequently, the control section controls pressure judgment of a section (a high/low pressure section) constituted of the high pressure section and the low pressure section (S406). As shown in FIG. 6, first the control section 50 opens the tank valve H201 and the hydrogen supply valve H200 (S407). When the pressure detected by the pressure sensor P6 is the predetermined threshold value P6B or more and the state is sustained in excess of the predetermined valve opening time ta (S408; YES), the section closes the tank valve H201 (S409). On the other hand, in a case where the pressure measured by the pressure sensor P6 is less than the predetermined threshold value P6B, or in a case where the pressure measured by the pressure sensor P6 is the predetermined threshold value P6B or more, but the state is not sustained in excess of the predetermined valve opening time ta (S408; NO), the tank valve H201 is left to open (S410).

Figure 7:
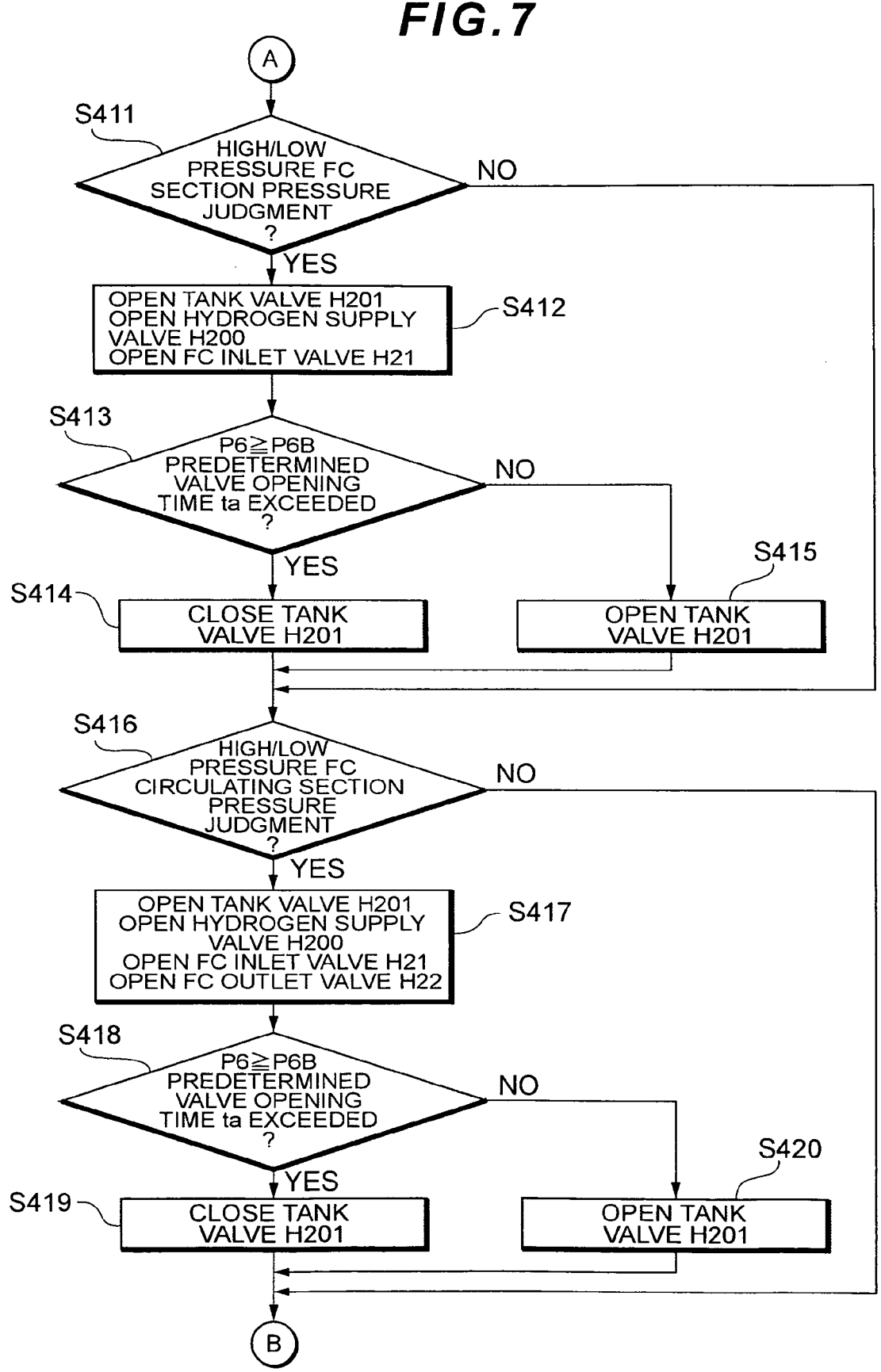

Subsequently, the control section performs the pressure judgment of a section (a high/low pressure FC section) constituted of the high pressure section, the low pressure section and the FC section (S411). As shown in FIG. 7, first the control section 50 opens the tank valve H201, the hydrogen supply valve H200 and the FC inlet valve H21 (S412). When the pressure measured by the pressure sensor P6 is the predetermined threshold value P6B or more and the state is sustained in excess of the predetermined valve opening time ta (S413; YES), the section closes the tank valve H201 (S414). On the other hand, in a case where the pressure measured by the pressure sensor P6 is less than the predetermined threshold value P6B, or in a case where the pressure measured by the pressure sensor P6 is the predetermined threshold value P6B or more, but the state is not sustained in excess of the predetermined valve opening time ta (S413; NO), the tank valve H201 is left to open (S415).

Subsequently, the control section performs the pressure judgment of a section (a high/low pressure FC circulating section) constituted of the high pressure section, the low pressure section, the FC section and the circulating section (S416). As shown in FIG. 7, first the control section 50 opens the tank valve H201, the hydrogen supply valve H200, the FC inlet valve H21 and the FC outlet valve H22 (S417). When the pressure measured by the pressure sensor P6 is the predetermined threshold value P6B or more and the state is sustained in excess of the predetermined valve opening time ta (S418; YES), the section closes the tank valve H201 (S419). On the other hand, in a case where the pressure measured by the pressure sensor P6 is less than the predetermined threshold value P6B, or in a case where the pressure measured by the pressure sensor P6 is the predetermined threshold value P6B or more, but the state is not sustained in excess of the predetermined valve opening time ta (S418; NO), the tank valve H201 is left to open (S420).

Figure 8:
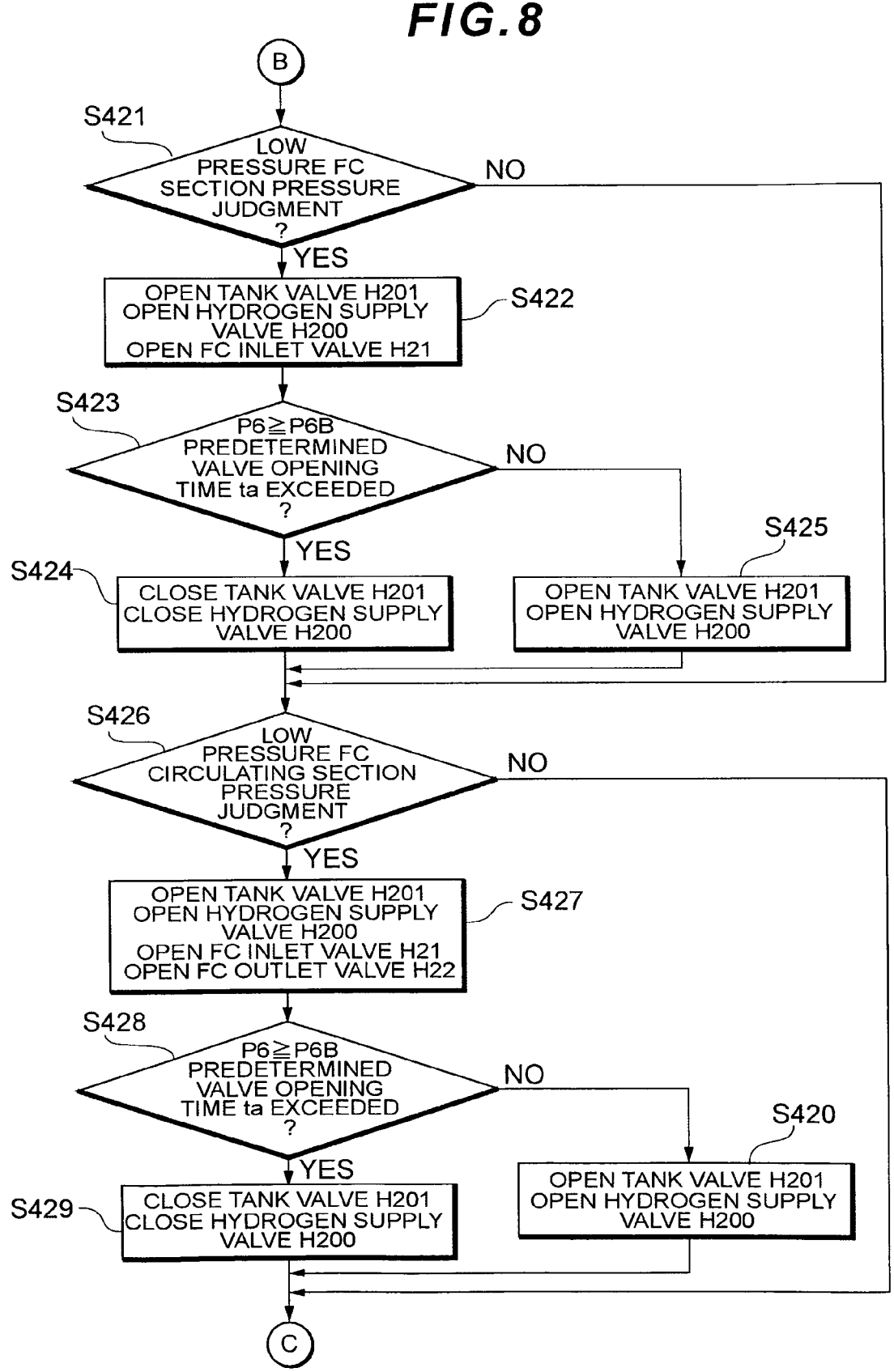

Subsequently, the control section judges the pressure judgment of a section (a low pressure FC section) constituted of the low pressure section and the FC section (S421). As shown in FIG. 8, first the control section 50 opens the tank valve H201, the hydrogen supply valve H200 and the FC inlet valve H21 (S422). When the pressure measured by the pressure sensor P6 is the predetermined threshold value P6B or more and the state is sustained in excess of the predetermined valve opening time ta (S423; YES), the section closes the tank valve H201 and the hydrogen supply valve H200 (S424). On the other hand, in a case where the pressure measured by the pressure sensor P6 is less than the predetermined threshold value P6B, or in a case where the pressure measured by the pressure sensor P6 is the predetermined threshold value P6B or more, but the state is not sustained in excess of the predetermined valve opening time ta (S423; NO), the tank valve H201 and the hydrogen supply valve H200 are left to open (S425).

Subsequently, the control section performs the pressure judgment of a section (a low pressure FC circulating section) constituted of the low pressure section, the FC section and the circulating section (S426). As shown in FIG. 8, first the control section 50 opens the tank valve H201, the hydrogen supply valve H200, the FC inlet valve H21 and the FC outlet valve H22 (S427). When the pressure measured by the pressure sensor P6 is the predetermined threshold value P6B or more and the state is sustained in excess of the predetermined valve opening time ta (S428; YES), the section closes the tank valve H201 and the hydrogen supply valve H200 (S429). On the other hand, in a case where the pressure measured by the pressure sensor P6 is less than the predetermined threshold value P6B, or in a case where the pressure measured by the pressure sensor P6 is the predetermined threshold value P6B or more, but the state is not sustained in excess of the predetermined valve opening time ta (S428; NO), the tank valve H201 and the hydrogen supply valve H200 are left to open (S430).

Figure 9:
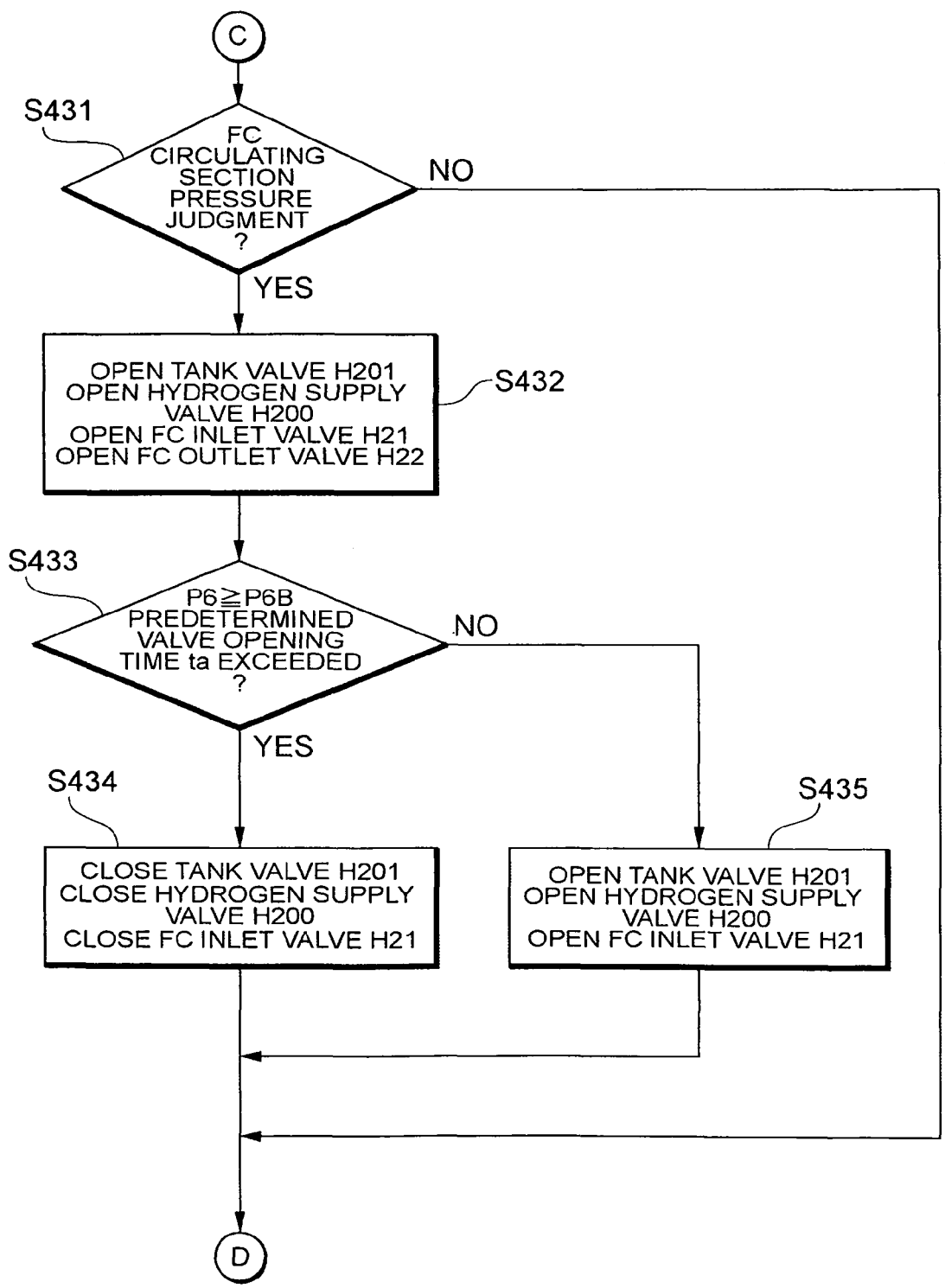

Subsequently, the control section performs the pressure judgment of a section (an FC circulating section) constituted of the FC section and the circulating section (S431). As shown in FIG. 9, first the control section 50 opens the tank valve H201, the hydrogen supply valve H200, the FC inlet valve H21 and the FC outlet valve H22 (S432). When the pressure measured by the pressure sensor P6 is the predetermined threshold value P6B or more and the state is sustained in excess of the predetermined valve opening time ta (S433; YES), the section closes the tank valve H201, the hydrogen supply valve H200 and the FC inlet valve H21 (S434). On the other hand, in a case where the pressure measured by the pressure sensor P6 is less than the predetermined threshold value P6B, or in a case where the pressure measured by the pressure sensor P6 is the predetermined threshold value P6B or more, but the state is not sustained in excess of the predetermined valve opening time ta (S433; NO), the tank valve H201, the hydrogen supply valve H200 and the FC inlet valve H21 are left to open (S435).

Figure 10:
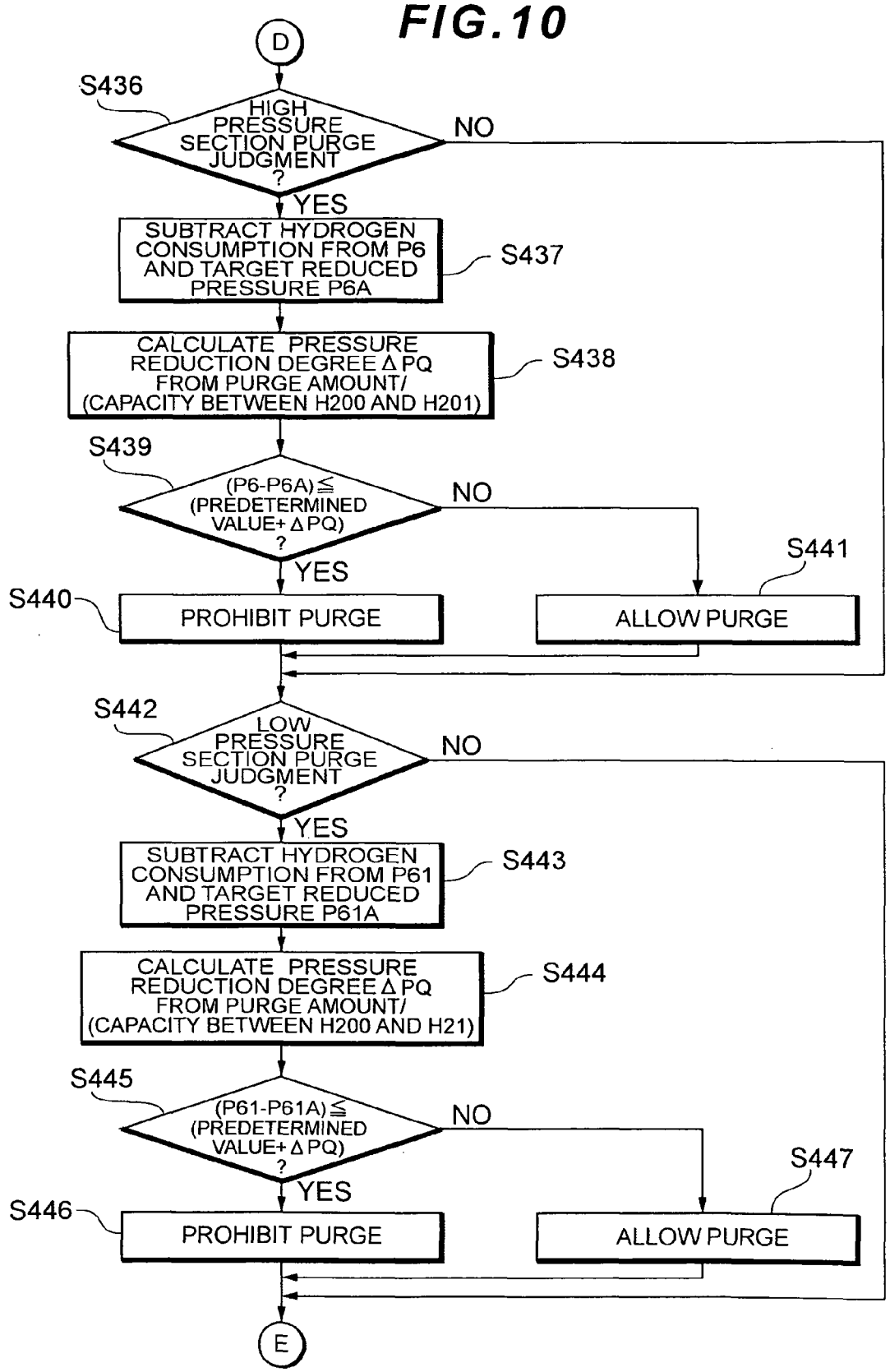

Subsequently, the control section 50 performs purge judgment of the high pressure section (S436). The purge judgment is to judge whether or not to purge the fuel gas. As shown in FIG. 10, first the section calculates fuel gas consumption required for matching the pressure of the high pressure section with a target pressure P6A based on a differential pressure between the pressure measured by the pressure sensor P6 and the target pressure P6A of the high pressure section (S437). Subsequently, the section calculates a pressure reduction degree ΔPQ from a ratio between a purge amount of the purge valve H51 at one purge time and a capacity of the high pressure section (S438). In a case where the differential pressure between the pressure of the high pressure section and the target pressure P6A is ΔPQ+a predetermined value (an allowance) or less (S439; YES), when the fuel gas is purged, the pressure of the high pressure section drops below the target pressure P6A, and hence the purging is prohibited (S440). On the other hand, in a case where the differential pressure between the pressure of the high pressure section and the target pressure P6A exceeds ΔPQ+the predetermined value (the allowance) (S439; NO), even when the fuel gas is purged, the pressure of the high pressure section is not the target pressure P6A or less, and hence the purging is allowed (S441).

Subsequently, the control section performs purge judgment of the low pressure section (S442). As shown in FIG. 10, first the section calculates the fuel gas consumption required for matching the pressure of the low pressure section with a target pressure P61A based on the differential pressure between the pressure measured by the pressure sensor P61 and the target pressure P61A of the low pressure section (S443). Subsequently, the section calculates the pressure reduction degree ΔPQ from the ratio between the purge amount of the purge valve H51 at one time and a capacity of the low pressure section (S444). In a case where the differential pressure between the pressure of the low pressure section and the target pressure P61A is ΔPQ+the predetermined value (the allowance) or less (S445; YES), when the fuel gas is purged, the pressure of the low pressure section drops below the target pressure P61A, and hence the purging is prohibited (S446). On the other hand, in a case where the differential pressure between the pressure of the low pressure section and the target pressure P61A exceeds ΔPQ+the predetermined value (the allowance) (S445; NO), even when the fuel gas is purged, the pressure of the low pressure section is not the target pressure P61A or less, and hence the purging is allowed (S447).

Figure 11:
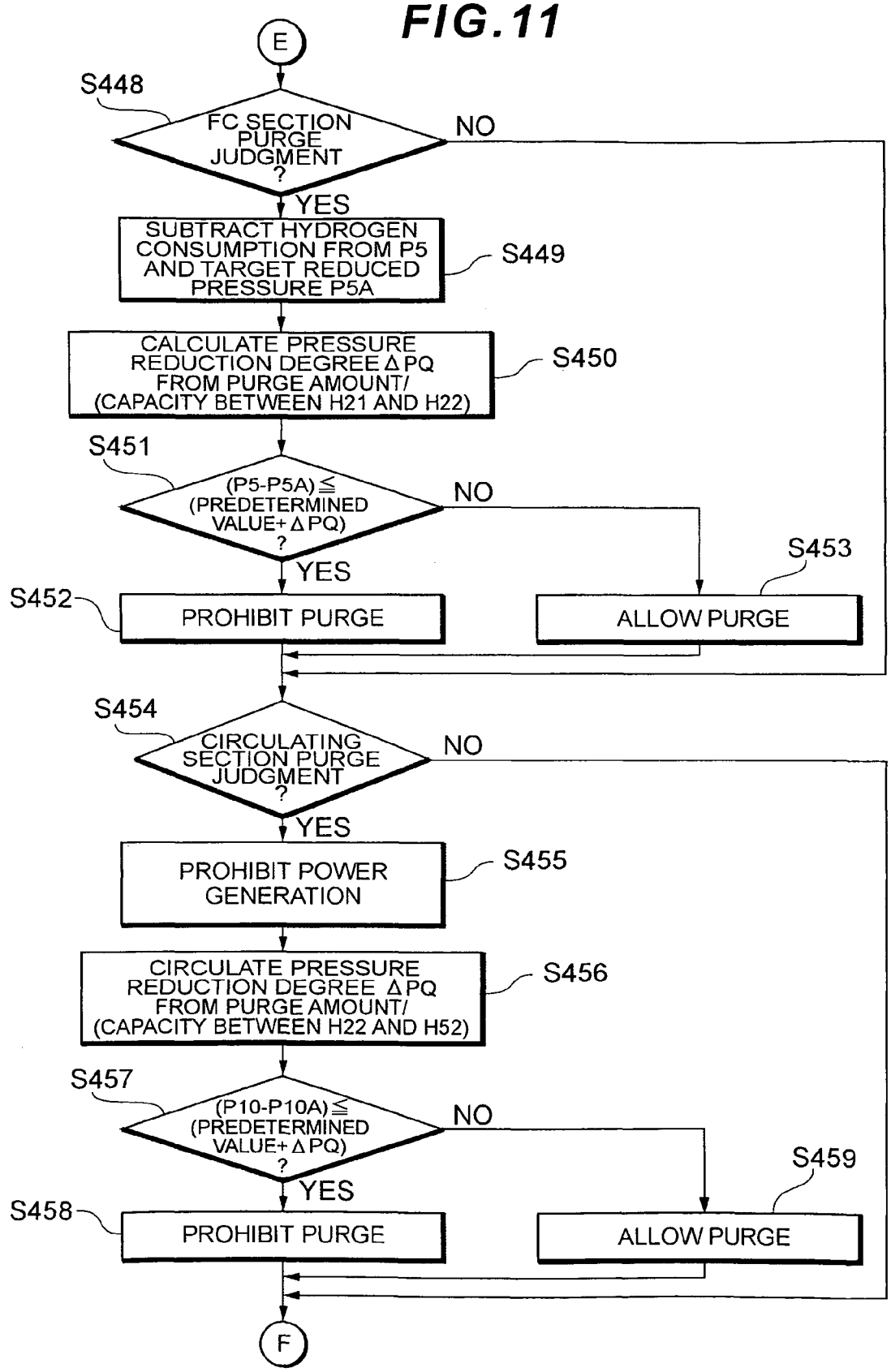

Subsequently, the control section performs the purge judgment of the FC section (S448). As shown in FIG. 11, first the section calculates fuel gas consumption required for matching the pressure of the FC section with a target pressure P5A based on a differential pressure between the pressure measured by the pressure sensor P6 and the target pressure P5A of the FC section (S449). Subsequently, the section calculates the pressure reduction degree ΔPQ from the ratio between the purge amount of the purge valve H51 at one time and a capacity of the FC section (S450). In a case where the differential pressure between the pressure of the FC section and the target pressure P5A is ΔPQ+the predetermined value (the allowance) or less (S451; YES), when the fuel gas is purged, the pressure of the FC section drops below the target pressure P5A, and hence the purging is prohibited (S452). On the other hand, in a case where the differential pressure between the pressure of the FC section and the target pressure P5A exceeds ΔPQ+the predetermined value (the allowance) (S451; NO), even when the fuel gas is purged, the pressure of the FC section is not the target pressure P5A or less, and hence the purging is allowed (S453).

Subsequently, the control section performs the purge judgment of the circulating section (S454). As shown in FIG. 11, first the control section prohibits the power generation (S455). Then, in a case where the section calculates the pressure reduction degree ΔPQ from the ratio between the purge amount of the purge valve H51 at one time and a capacity of the circulating section (S456) and the differential pressure between the pressure of the circulating section and a target pressure P10A is ΔPQ+the predetermined value (the allowance) or less (S457; YES), when the fuel gas is purged, the pressure of the circulating section drops below the target pressure P10A, and hence the purging is prohibited (S458). On the other hand, in a case where the differential pressure between the pressure of the circulating section and the target pressure P10A exceeds ΔPQ+the predetermined value (the allowance) (S457; NO), even when the fuel gas is purged, the pressure of the circulating section is not the target pressure P10A or less, and hence the purging is allowed (S459).

Figure 12:
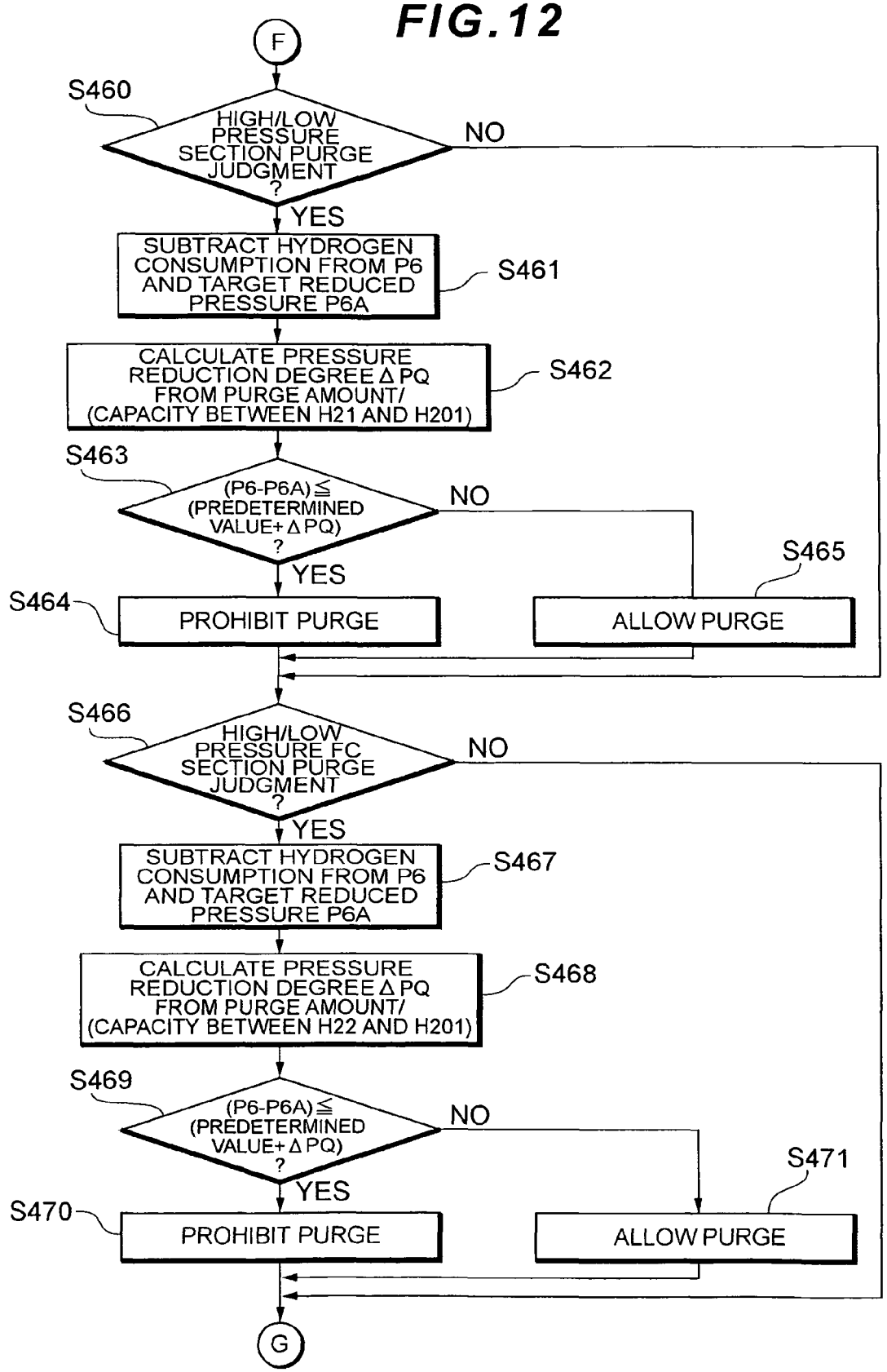

Subsequently, the control section performs the purge judgment of the section (the high/low pressure section) constituted of the high pressure section and the low pressure section (S460). As shown in FIG. 12, first the section calculates fuel gas consumption required for matching the pressure of the high/low pressure section with the target pressure P6A based on a differential pressure between the pressure measured by the pressure sensor P6 and the target pressure P6A of the high/low pressure section (S461). Subsequently, the section calculates the pressure reduction degree $\Delta PQ$ from a ratio between the purge amount of the purge valve H51 at one time and the capacity of the high/low pressure section (S462). In a case where the differential pressure between the pressure of the high/low pressure section and the target pressure P6A is $\Delta PQ$+a predetermined value (an allowance) or less (S463; YES), when the fuel gas is purged, the pressure of the high/low pressure section drops below the target pressure P6A, and hence the purging is prohibited (S464). On the other hand, in a case where the differential pressure between the pressure of the high/low pressure section and the target pressure P6A exceeds $\Delta PQ$+the predetermined value (the allowance) (S463; NO), even when the fuel gas is purged, the pressure of the high/low pressure section is not the target pressure P6A or less, and hence the purging is allowed (S465).

Then, the control section performs the purge judgment of the section (the high/low pressure FC section) constituted of the high pressure section, the low pressure section and the FC section (S466). As shown in FIG. 12, first the control section calculates the fuel gas consumption required for matching the pressure of the high/low pressure FC section with a target pressure P6A based on the differential pressure between the pressure measured by the pressure sensor P6 and the target pressure P6A of the high/low pressure FC section (S467). Subsequently, the section calculates the pressure reduction degree $\Delta PQ$ from a ratio between the purge amount of the purge valve H51 at one time and a capacity of the high/low pressure FC section (S468). In a case where the differential pressure between the pressure of the high/low pressure FC section and the target pressure P6A is $\Delta PQ$+the predetermined value (the allowance) or less (S469; YES), when the fuel gas is purged, the pressure of the high/low pressure FC section drops below the target pressure P6A, and hence the purging is prohibited (S470). On the other hand, in a case where the differential pressure between the pressure of the high/low pressure FC section and the target pressure P6A exceeds $\Delta PQ$+the predetermined value (the allowance) (S469; NO), even when the fuel gas is purged, the pressure of the high/low pressure FC section is not the target pressure P6A or less, and hence the purging is allowed (S471).

Figure 13:
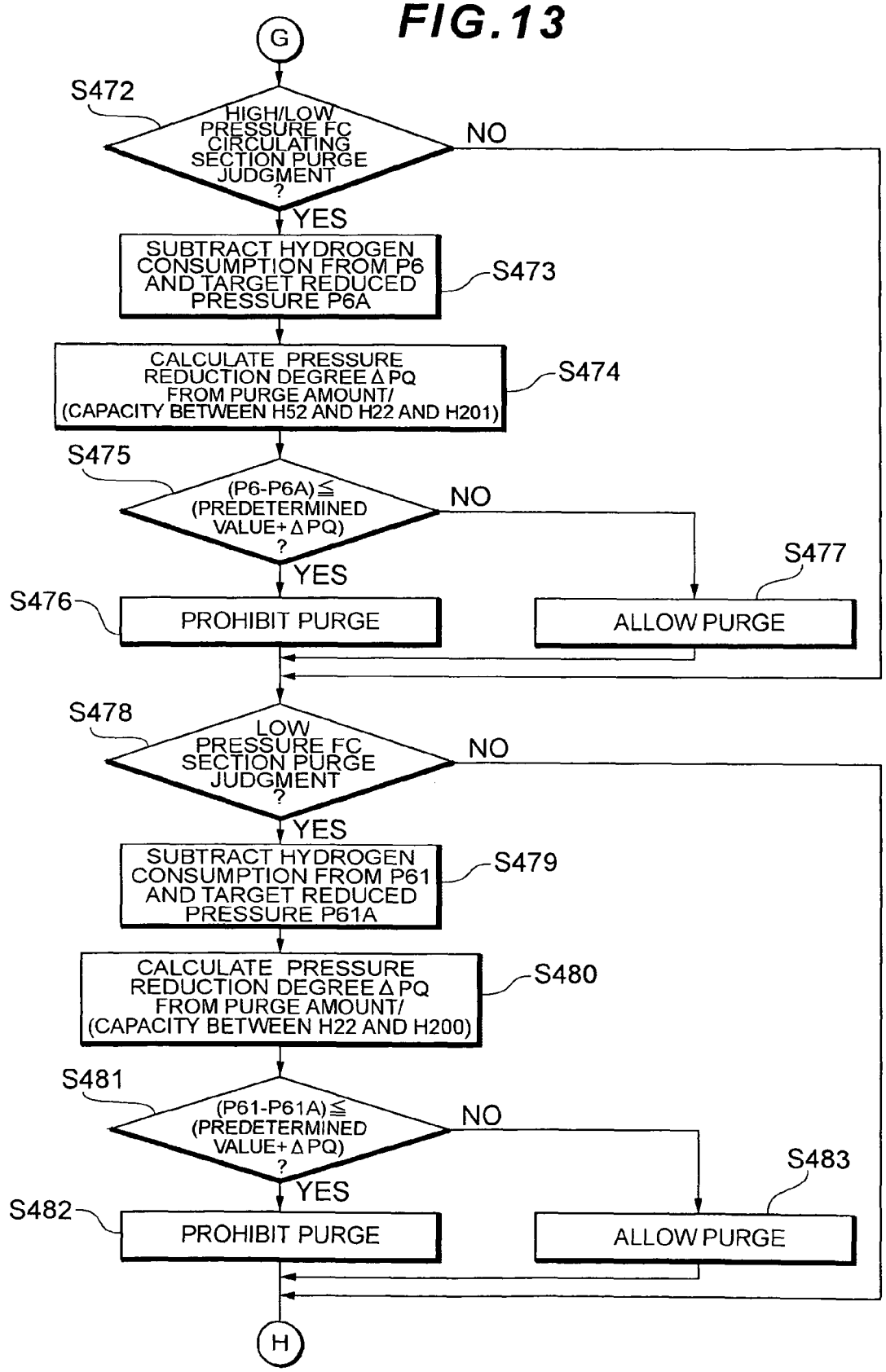

Subsequently, the control section performs the purge judgment of the section (the high/low pressure FC circulating section) constituted of the high pressure section, the low pressure section, the FC section and the circulating section (S472). As shown in FIG. 13, first the section calculates fuel gas consumption required for matching the pressure of the high/low pressure FC circulating section with the target pressure P6A based on a differential pressure between the pressure measured by the pressure sensor P6 and the target pressure P6A of the high/low pressure FC circulating section (S473). Subsequently, the section calculates the pressure reduction degree $\Delta PQ$ from a ratio between the purge amount of the purge valve H51 at one time and the capacity of the high/low pressure FC circulating section (S474). In a case where the differential pressure between the pressure of the high/low pressure FC circulating section and the target pressure P6A is $\Delta PQ$+the predetermined value (the allowance) or less (S475; YES), when the fuel gas is purged, the pressure of the high/low pressure FC circulating section drops below the target pressure P6A, and hence the purging is prohibited (S476). On the other hand, in a case where the differential pressure between the pressure of the high/low pressure FC circulating section and the target pressure P6A exceeds $\Delta PQ$+the predetermined value (the allowance) (S475; NO), even when the fuel gas is purged, the pressure of the high/low pressure FC circulating section is not the target pressure P6A or less, and hence the purging is allowed (S477).

Then, the control section performs the purge judgment of the section (the low pressure FC section) constituted of the low pressure section and the FC section (S478). As shown in FIG. 13, first the control section calculates the fuel gas consumption required for matching the pressure of the low pressure FC section with the target pressure P61A based on the differential pressure between the pressure measured by the pressure sensor P61 and the target pressure P61A of the low pressure FC section (S479). Subsequently, the section calculates the pressure reduction degree $\Delta PQ$ from a ratio between the purge amount of the purge valve H51 at one time and a capacity of the low pressure FC section (S480). In a case where the differential pressure between the pressure of the low pressure FC section and the target pressure P61A is $\Delta PQ$+the predetermined value (the allowance) or less (S481; YES), when the fuel gas is purged, the pressure of the low pressure FC section drops below the target pressure P61A, and hence the purging is prohibited (S482). On the other hand, in a case where the differential pressure between the pressure of the low pressure FC section and the target pressure P61A exceeds $\Delta PQ$+the predetermined value (the allowance) (S481; NO), even when the fuel gas is purged, the pressure of the low pressure FC section is not the target pressure P61A or less, and hence the purging is allowed (S483).

Figure 14:
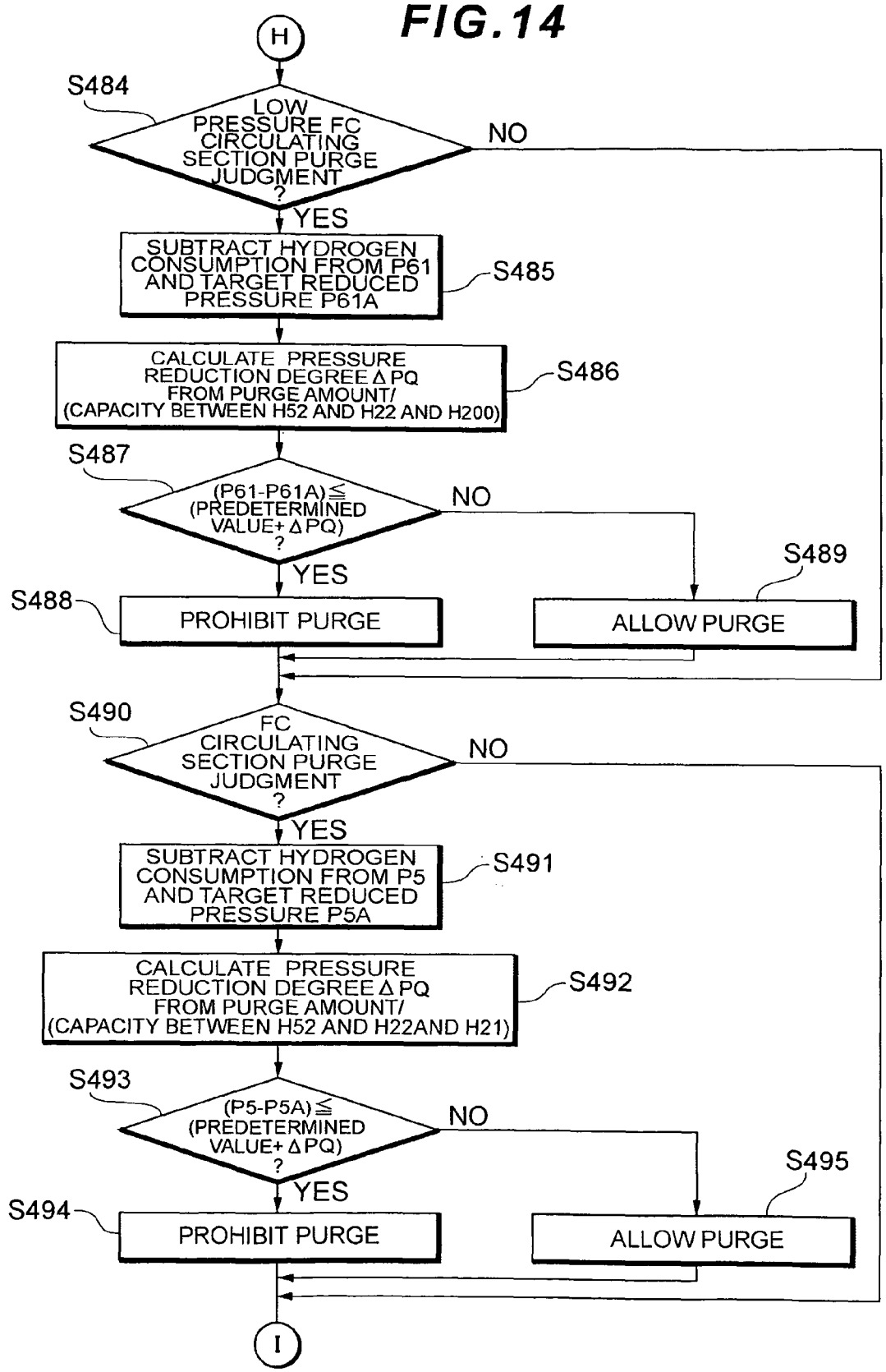

Subsequently, the control section performs the purge judgment of the section (the low pressure FC circulating section) constituted of the low pressure section, the FC section and the circulating section (S484). As shown in FIG. 14, first the section calculates fuel gas consumption required for matching the pressure of the low pressure FC circulating section with the target pressure P61A based on a differential pressure between the pressure measured by the pressure sensor P61 and the target pressure P61A of the low pressure FC circulating section (S485). Subsequently, the section calculates the pressure reduction degree $\Delta PQ$ from a ratio between the purge amount of the purge valve H51 at one time and the capacity of the low pressure FC circulating section (S486). In a case where the differential pressure between the pressure of the low pressure FC circulating section and the target pressure P61A is $\Delta PQ$+the predetermined value (the allowance) or less (S487; YES), when the fuel gas is purged, the pressure of the low pressure FC circulating section drops below the target pressure P61A, and hence the purging is prohibited (S488). On the other hand, in a case where the differential pressure between the pressure of the low pressure FC circulating section and the target pressure P61A exceeds $\Delta PQ$+the predetermined value (the allowance) (S487; NO), even when the fuel gas is purged, the pressure of the low pressure FC circulating section is not the target pressure P61A or less, and hence the purging is allowed (S489).

Then, the control section performs the purge judgment of the section (the FC circulating section) constituted of the FC section and the circulating section (S490). As shown in FIG. 14, first the control section calculates the fuel gas consumption required for matching the pressure of the FC circulating section with the target pressure P5A based on the differential pressure between the pressure measured by the pressure sensor P5 and the target pressure P5A of the FC circulating section (S491). Subsequently, the section calculates the pressure reduction degree ΔPQ from a ratio between the purge amount of the purge valve H51 at one time and a capacity of the FC circulating section (S492). In a case where the differential pressure between the pressure of the FC circulating section and the target pressure P5A is ΔPQ+the predetermined value (the allowance) or less (S493; YES), when the fuel gas is purged, the pressure of the FC circulating section drops below the target pressure P5A, and hence the purging is prohibited (S494). On the other hand, in a case where the differential pressure between the pressure of the FC circulating section and the target pressure P5A exceeds ΔPQ+the predetermined value (the allowance) (S493; NO), even when the fuel gas is purged, the pressure of the FC circulating section is not the target pressure P5A or less, and hence the purging is allowed (S495).

Figure 15:
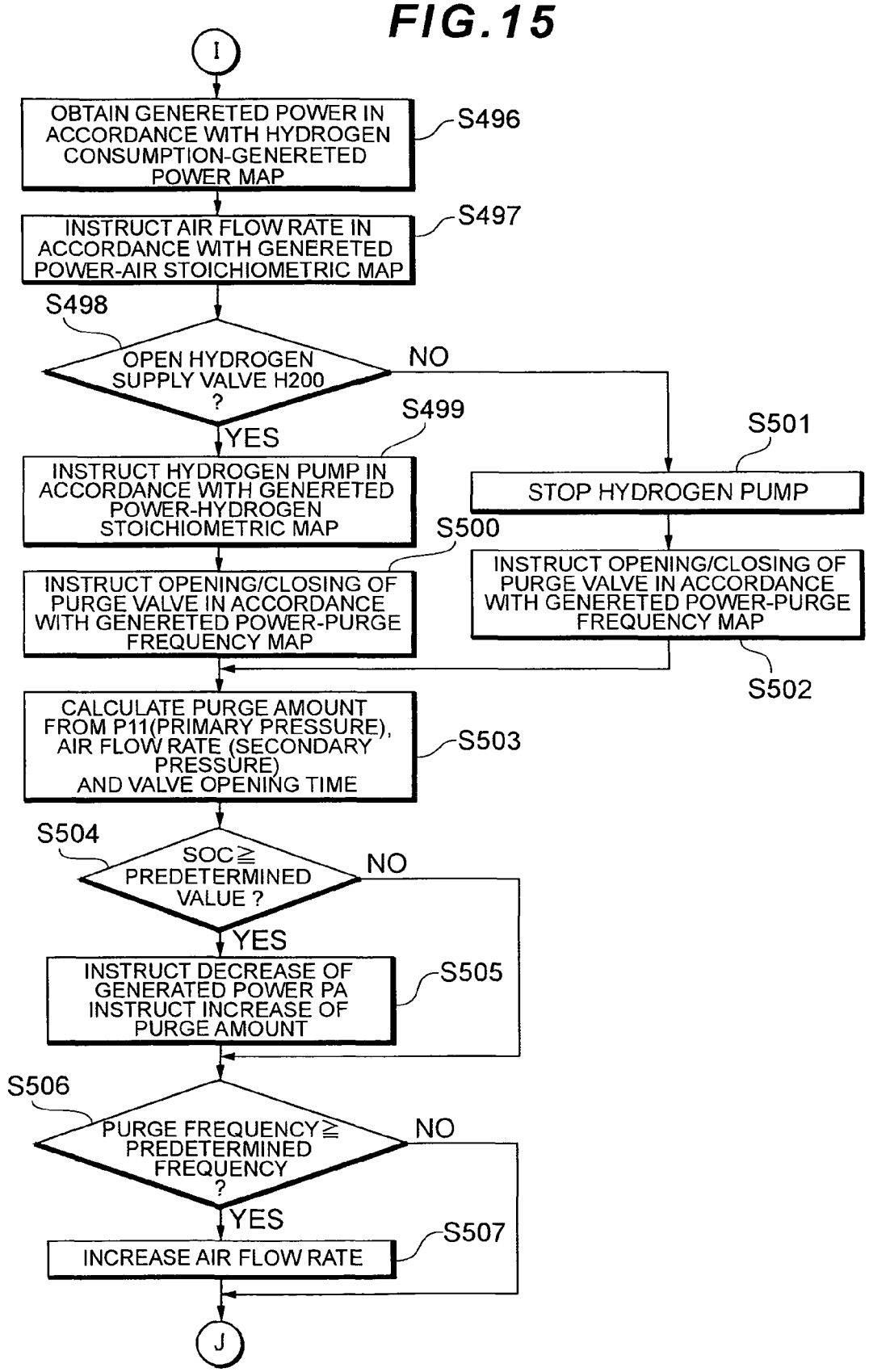

When the purge judgment of each section ends, as shown in FIG. 15, the control section 50 obtains the generated power of the fuel battery 20 for consuming the fuel gas obtained in S437, S443, S449, S461, S467, S473, S479, S485 and S491 (S496). Furthermore, the section regulates the rotation number of the motor M1 with reference to the fuel battery generated power-air stoichiometric map so that the oxidizing gas required for obtaining desired generated power is supplied to the fuel battery 20 (S497). Then, when the hydrogen supply valve H200 opens (S498; YES), the control section 50 regulates the valves of the fuel gas supply system and the rotation number of the motor M2 with reference to the fuel battery generated power-hydrogen stoichiometric map so that the fuel gas flow rate required for obtaining the desired generated power is supplied to the fuel battery 20 (S499). Furthermore, the control section 50 controls the opening/closing of the purge valve H51 with reference to the fuel battery generated power-purge frequency map (S500).

On the other hand, when the hydrogen supply valve H200 closes (S498; NO), the control section 50 stops the hydrogen pump 63 (S501), and controls the opening/closing of the purge valve H51 with reference to the fuel battery generated power-purge frequency map (S502). To open/close the purge valve H51, the purge amount at one time is calculated based on a primary pressure, a secondary pressure and the valve opening time of the purge valve H51 (S503). Here, the primary pressure of the purge valve H51 can be obtained in accordance with a pressure value measured by the pressure sensor P11. The secondary pressure of the purge valve H51 can be obtained in accordance with a flow rate of an oxygen off gas which flows through the cathode off gas channel 42.

When a state of charge (SOC) of the battery 54 indicates a predetermined value (e.g., 80% to 90%) or more (S504; YES), the control section 50 cannot accumulate, in the battery 54, the power generated by the consumption of the fuel gas, and hence the control section 50 decreases the generated power of the fuel battery 20, and increases the purge amount of the fuel gas (S505). When purge frequency of the fuel gas is larger than predetermined frequency (S506; YES), concentration of the fuel gas discharged from the system increases. Therefore, the rotation number of the air compressor 40 is increased in order to reduce the concentration of the discharged fuel gas, the flow rate of the oxygen off gas flowing through the cathode off gas channel 42 is increased, and the concentration of the discharged fuel gas to be diluted by the dilution unit 64 is reduced (S507).

As described above, the consumption of the fuel gas by the power generation and a purge operation of the fuel gas are executed (S496 to S507), the pressure of each section of the fuel gas supply system can quickly be lowered. More specifically, the pressures of the high pressure section, the low pressure section and the FC section can be lowered by the consumption of the fuel gas due to the power generation and the purge operation of the fuel gas, and the pressure of the circulating section can be lowered by the purge operation of the fuel gas. It is to be noted that to lower the pressure, the purge operation is not performed, and the only consumption of the fuel gas due to the power generation may be performed.

Next, the gas leakage judgment will be described in detail. In the gas leakage judgment of each section, the valves disposed in the fuel gas supply system are closed, the closed space (a substantially sealed space) is formed and a pressure drop allowance of the closed space is measured to perform the judgment.

Figure 16:
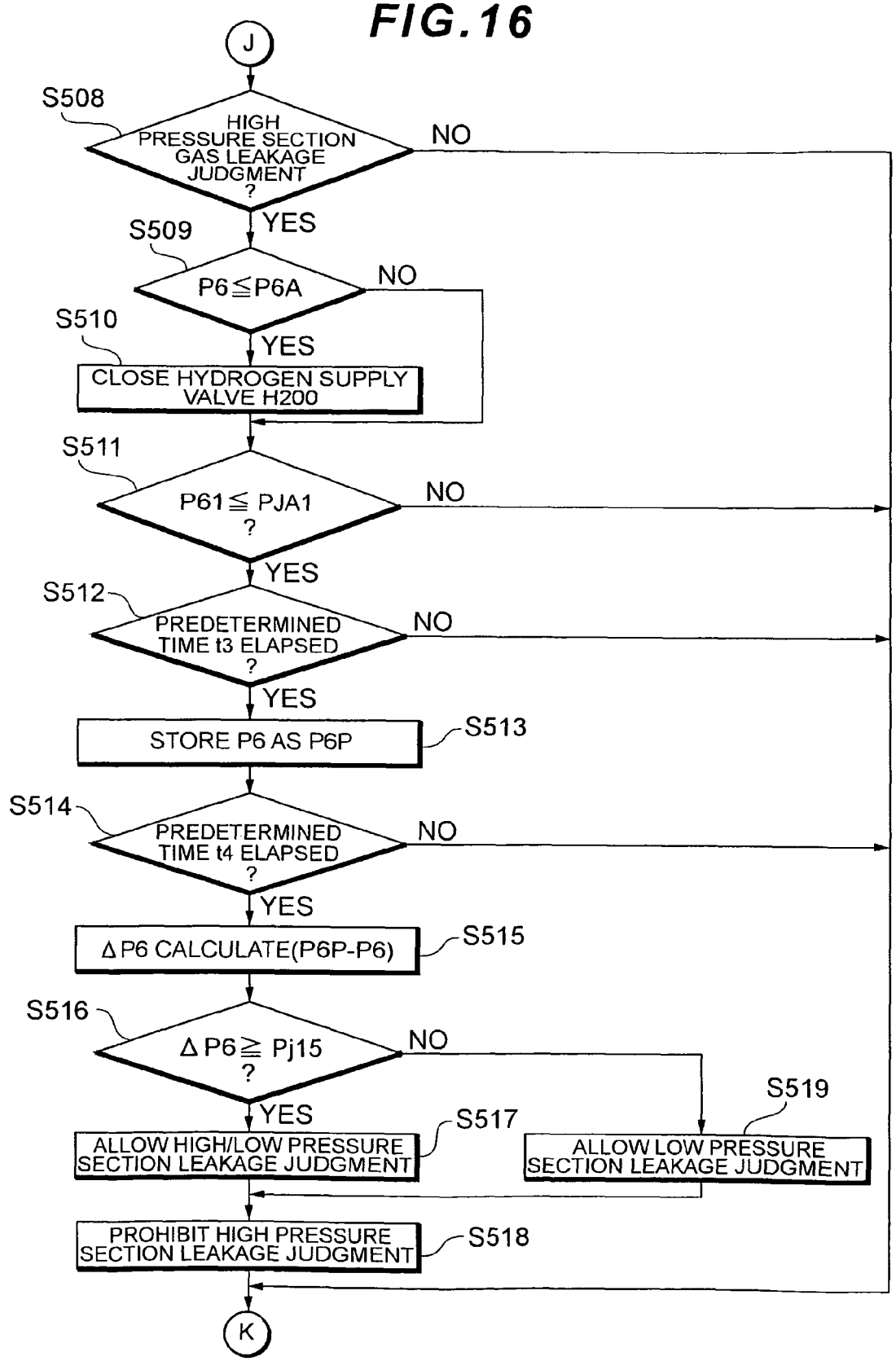

First, the gas leakage judgment (S508) of the high pressure section will be described. As shown in FIG. 16, in a case where the pressure measured by the pressure sensor P6 is the target pressure P6A or less (S509; YES), since it is indicated that the pressure of the high pressure section reaches the pressure suitable for the gas leakage judgment, the control section 50 closes the hydrogen supply valve H200 (S510). In consequence, the high pressure section is brought into a sealed state to form the closed space. Then, the control section 50 judges whether or not the pressure measured by the pressure sensor P61 disposed on the downstream side of the hydrogen supply valve H200 drops below a predetermined pressure PJA1 (S511). The predetermined pressure PJA1 is a pressure for judging whether or not the hydrogen supply valve H200 securely closes. When the measured pressure of the pressure sensor P61 is the predetermined pressure PJA1 or less (S511; YES), to perform the gas leakage judgment of the high pressure section, it is judged whether or not a predetermined time t3 has elapsed from a time when the hydrogen supply valve H200 was closed (S512). When the predetermined time t3 elapses (S512; YES), the measured pressure of the pressure sensor P6 is stored as P6P (S513).

Furthermore, it is judged whether or not a predetermined time t4 has elapsed from a time when the hydrogen supply valve H200 was closed (S514). When the predetermined time t4 elapses (S514; YES), a differential pressure (the pressure drop allowance) ΔP6 between the stored pressure P6P and the measured pressure of the pressure sensor P6 is calculated (S515). Here, when the differential pressure ΔP6 is a predetermined pressure Pj15 (the predetermined threshold value) or more (S516; YES), the leakage judgment of the section (the high/low pressure section) constituted of the high pressure section and the low pressure section is allowed (S517), and the leakage judgment of the high pressure section is prohibited (S518). On the other hand, when the differential pressure ΔP6 is less than the predetermined pressure Pj15 (S516; NO), the control section 50 allows the gas leakage judgment of the low pressure section (S519), and prohibits the leakage judgment of the high pressure section (S518). It is to be noted that when the measured pressure of the pressure sensor P61 exceeds the predetermined pressure PJA1 (S511; NO), when the predetermined time t3 has not elapsed from a time when the hydrogen supply valve H200 was closed (S512; NO), or when the predetermined time t4 has not elapsed (S514; NO), the control section 50 shifts to the next gas leakage judgment of the low pressure section.

Figure 17:
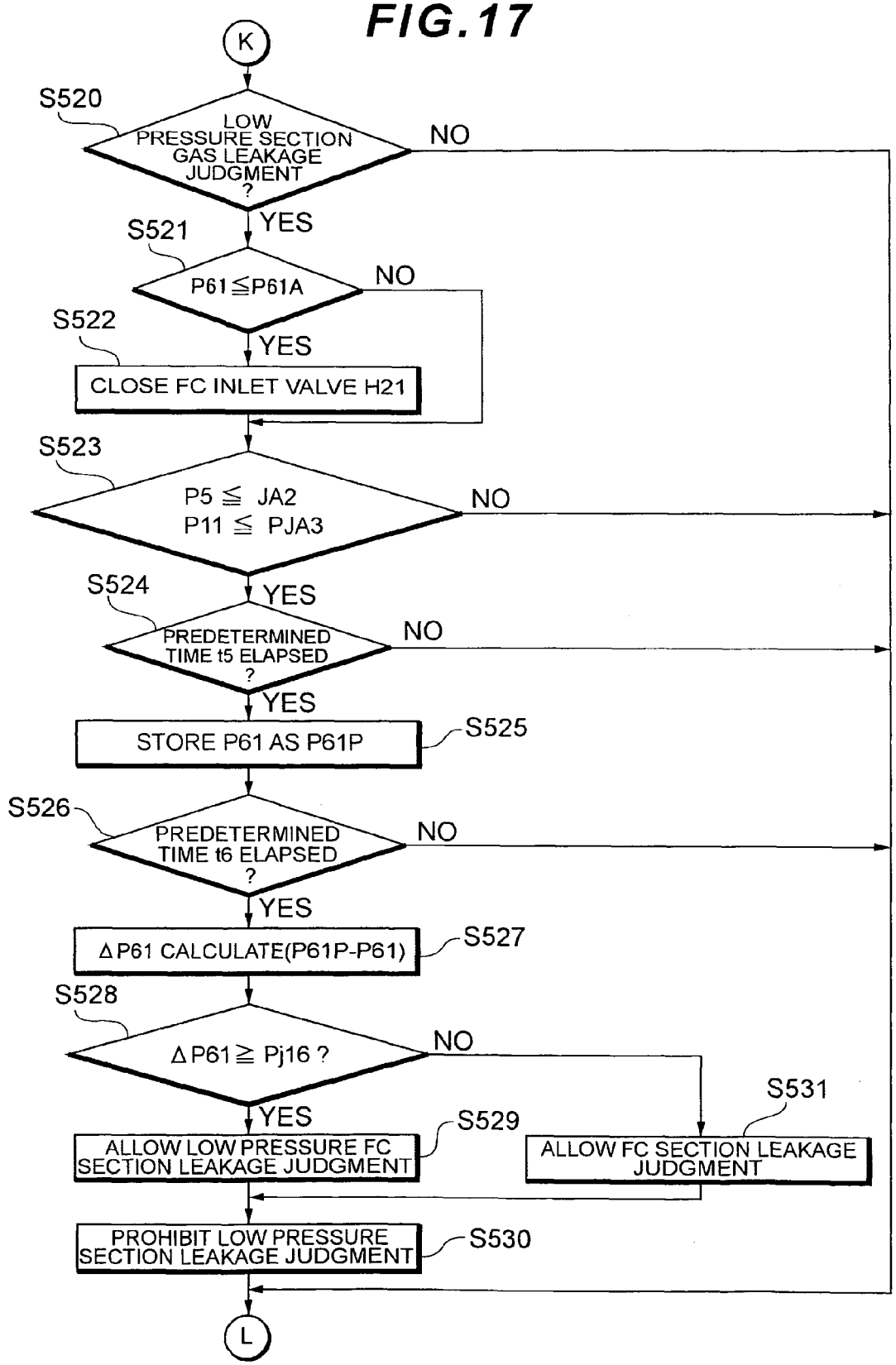

Next, the gas leakage judgment (S520) of the low pressure section will be described. As shown in FIG. 17, in a case where the control section 50 judges that the pressure measured by the pressure sensor P61 is the target pressure P61A or less (S521; YES), since it is indicated that the pressure of the low pressure section reaches the pressure suitable for the gas leakage judgment, the control section 50 closes the FC inlet valve H21 (S522). In consequence, the low pressure section is brought into the sealed state to form the closed space. Then, the control section judges whether or not the pressures measured by the pressure sensors P5, P11 disposed on the downstream side of the FC inlet valve H21 drop below predetermined pressures PJA2, PJA3, respectively (S523). The predetermined pressures PJA2, PJA3 are pressures for judging whether or not the FC inlet valve H21 securely closes. When the measured pressures of the pressure sensors P5, P11 are the predetermined pressures PJA2, PJA3 or less, respectively (S523; YES), to perform the gas leakage judgment of the low pressure section, it is judged whether or not a predetermined time t5 has elapsed from a time when the FC inlet valve H21 was closed (S524). When the predetermined time t5 elapses (S524; YES), the measured pressure of the pressure sensor P61 is stored as P61P (S525).

Furthermore, it is judged whether or not a predetermined time t6 has elapsed from a time when the FC inlet valve H21 was closed (S526). When the predetermined time t6 elapses (S526; YES), a differential pressure (the pressure drop allowance) ΔP61 between the stored pressure P61P and the measured pressure of the pressure sensor P61 is calculated (S527). Here, when the differential pressure ΔP61 is a predetermined threshold pressure Pj16 or more (S528; YES), the leakage judgment of the section (the low pressure FC section) constituted of the low pressure section and the FC section is allowed (S529), and the leakage judgment of the low pressure section is prohibited (S530). On the other hand, when the differential pressure ΔP61 is less than the predetermined pressure Pj16 (S528; NO), the control section 50 allows the gas leakage judgment of the FC section (S531), and prohibits the leakage judgment of the low pressure section (S530). It is to be noted that when the measured pressures of the pressure sensors P5, P11 exceed the predetermined pressures PJA2, PJA3 (S523; NO), when the predetermined time t5 has not elapsed from a time when the FC inlet valve H21 was closed (S524; NO), or when the predetermined time t6 has not elapsed (S526; NO), the control section 50 shifts to the next gas leakage judgment of the FC section.

Figure 18:
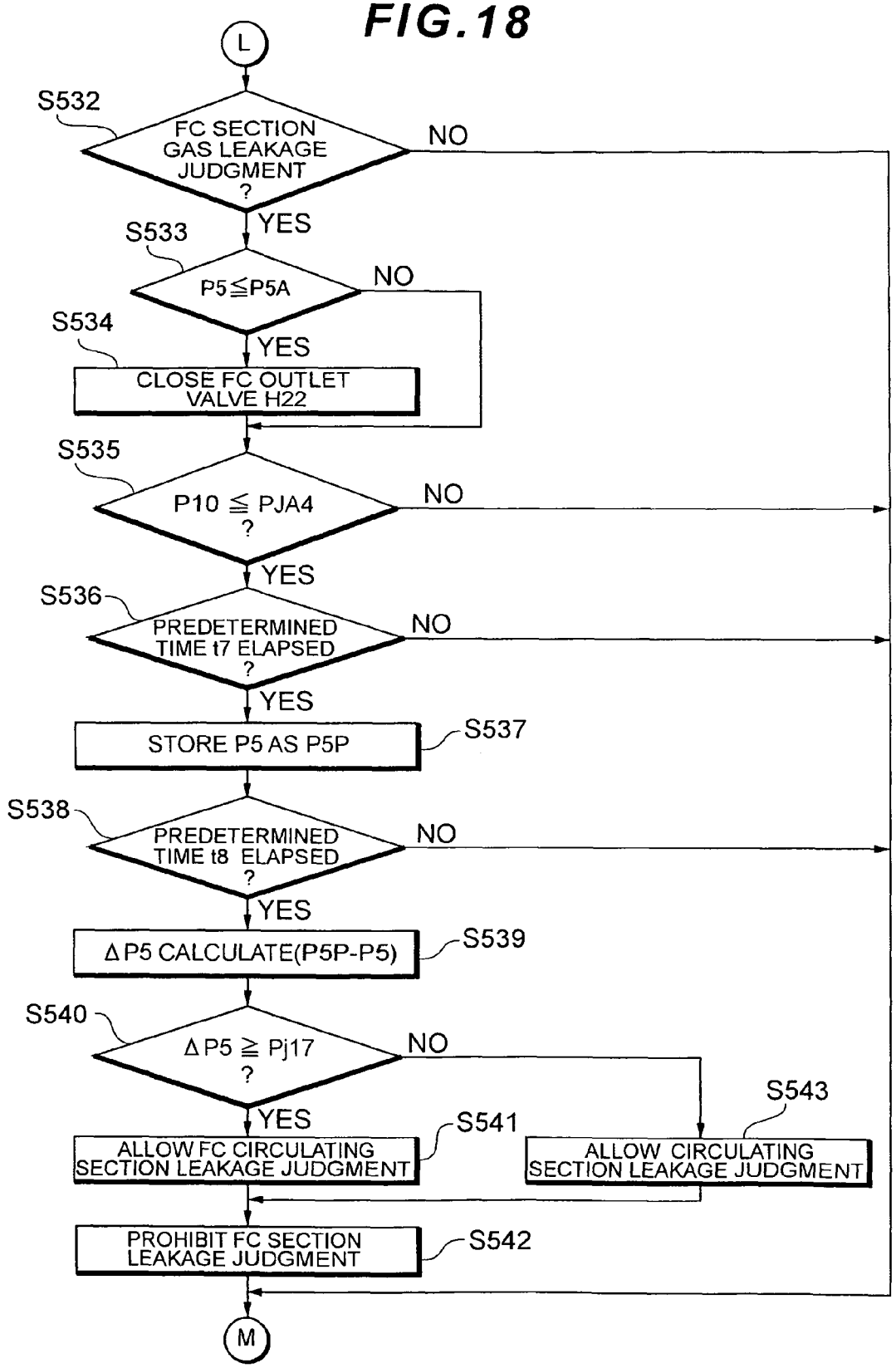

Next, the gas leakage judgment (S532) of the FC section will be described. As shown in FIG. 18, in a case where the control section 50 judges that the pressure measured by the pressure sensor P5 is the target pressure P5A or less (S533; YES), since it is indicated that the pressure of the FC section reaches the pressure suitable for the gas leakage judgment, the control section 50 closes the FC outlet valve H22 (S524). In consequence, the FC section is brought into the sealed state to form the closed space. Then, the control section judges whether or not the pressure measured by the pressure sensor P10 disposed on the downstream side of the FC outlet valve H22 drops below a predetermined pressure PJA4 (S535). The predetermined pressures PJA4 is a pressure for judging whether or not the FC outlet valve H22 securely closes. When the measured pressure of the pressure sensor P10 is the predetermined pressure PJA4 (S535; YES), to perform the gas leakage judgment of the FC section, it is judged whether or not a predetermined time t7 has elapsed from a time when the FC outlet valve H22 was closed (S536). When the predetermined time t7 elapses (S536; YES), the measured pressure of the pressure sensor P5 is stored as P5P (S537).

Furthermore, it is judged whether or not a predetermined time t8 has elapsed from a time when the FC outlet valve H22 was closed (S538). When the predetermined time t8 elapses (S538; YES), a differential pressure (the pressure drop allowance) ΔP5 between the stored pressure P5P and the measured pressure of the pressure sensor P5 is calculated (S539). Here, when the differential pressure ΔP5 is a predetermined pressure Pj17 or more (S540; YES), the leakage judgment of the section (the FC circulating section) constituted of the FC section and the circulating section is allowed (S541), and the leakage judgment of the FC section is prohibited (S542). On the other hand, when the differential pressure ΔP5 is less than the predetermined pressure Pj17 (S540; NO), the control section 50 allows the gas leakage judgment of the circulating section (S543), and prohibits the leakage judgment of the FC section (S542). It is to be noted that when the measured pressure of the pressure sensor P10 exceeds the predetermined pressure PJA4 (S535; NO), when the predetermined time t7 has not elapsed from a time when the FC outlet valve H22 was closed (S536; NO), or when the predetermined time t8 has not elapsed (S538; NO), the control section 50 shifts to the next gas leakage judgment of the circulating section.

Figure 19:
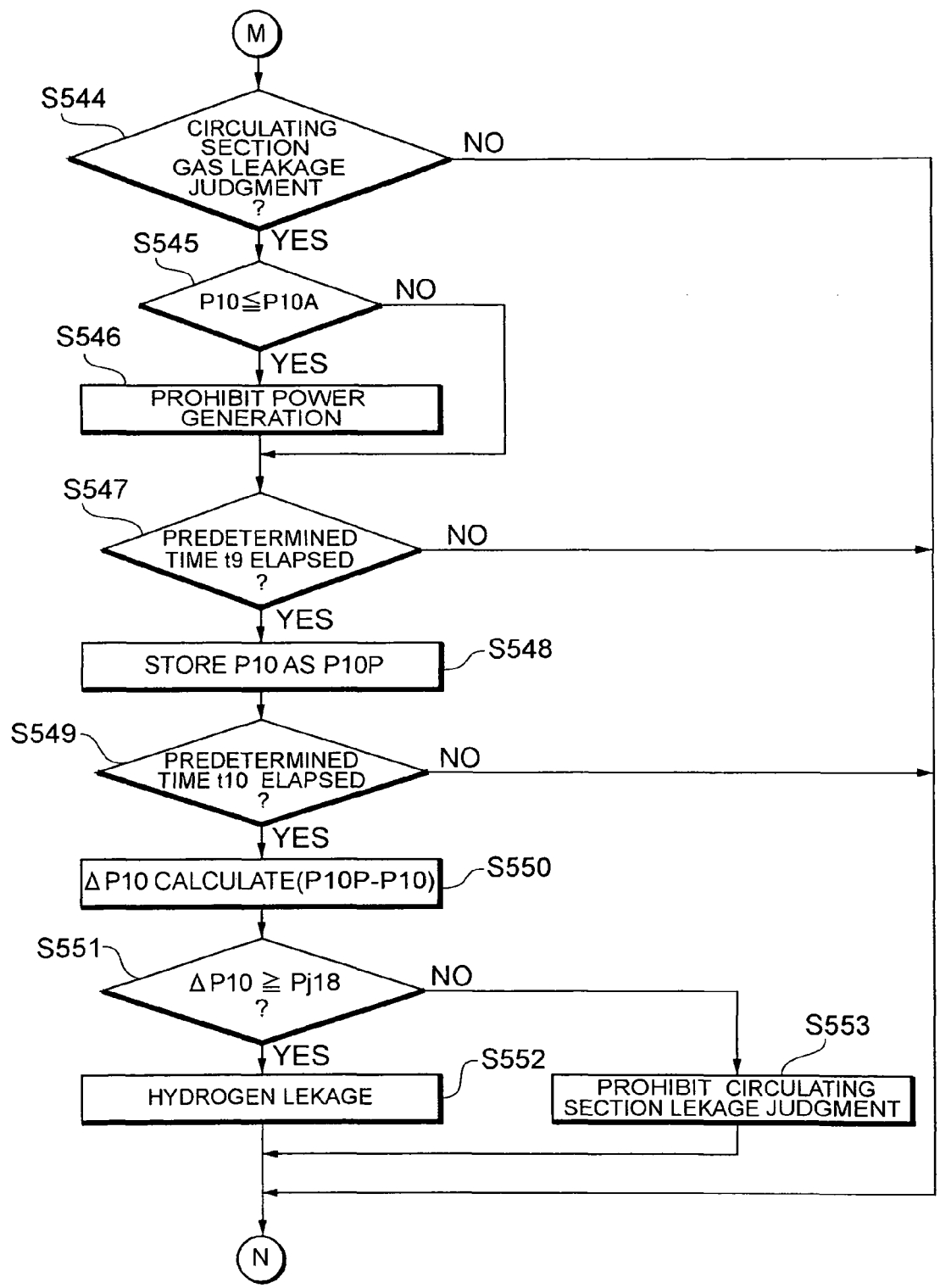

Next, the gas leakage judgment (S544) of the circulating section will be described. As shown in FIG. 19, in a case where the control section 50 judges that the pressure measured by the pressure sensor P10 is the target pressure P10A or less (S545; YES), since it is indicated that the pressure of the circulating section reaches the pressure suitable for the gas leakage judgment, the control section 50 prohibits the power generation (S546). At this time, the opening of the purge valve is prohibited to bring the circulating section into the sealed state, thereby forming a closed space. Then, to perform the gas leakage judgment of the circulating section, it is judged whether or not a predetermined time t9 has elapsed from a time when the power generation was prohibited (S547). When the predetermined time t9 elapses (S547; YES), the measured pressure of the pressure sensor P10 is stored as P10P (S548).

Furthermore, it is judged whether or not a predetermined time t10 has elapsed from a time when the power generation was prohibited (S549). When the predetermined time t10 elapses (S549; YES), a differential pressure (the pressure drop allowance) ΔP10 between the stored pressure P10P and the measured pressure of the pressure sensor P10 is calculated (S550). Here, when the differential pressure ΔP10 is a predetermined pressure Pj18 or more (S551; YES), it is judged that the gas leaks from the circulating section (S552), and the control section shifts to the next gas leakage judgment of the high/low pressure section. As causes for the gas leakage, opening troubles of the FC outlet valve H22 and the check valve H52, breakage of the fuel gas circulation path 32 and the like are considered. On the other hand, when the differential pressure ΔP10 is less than the predetermined threshold pressure Pj18 (S551; NO), the control section 50 prohibits the gas leakage judgment of the circulating section (S553), and shifts to the next gas leakage judgment of the high/low pressure section. It is to be noted that when the predetermined time t9 has not elapsed from a time when the power generation was prohibited (S547; NO), or when the predetermined time t10 has not elapsed (S549; NO), the control section 50 shifts to the next gas leakage judgment of the high/low pressure section.

Figure 20:
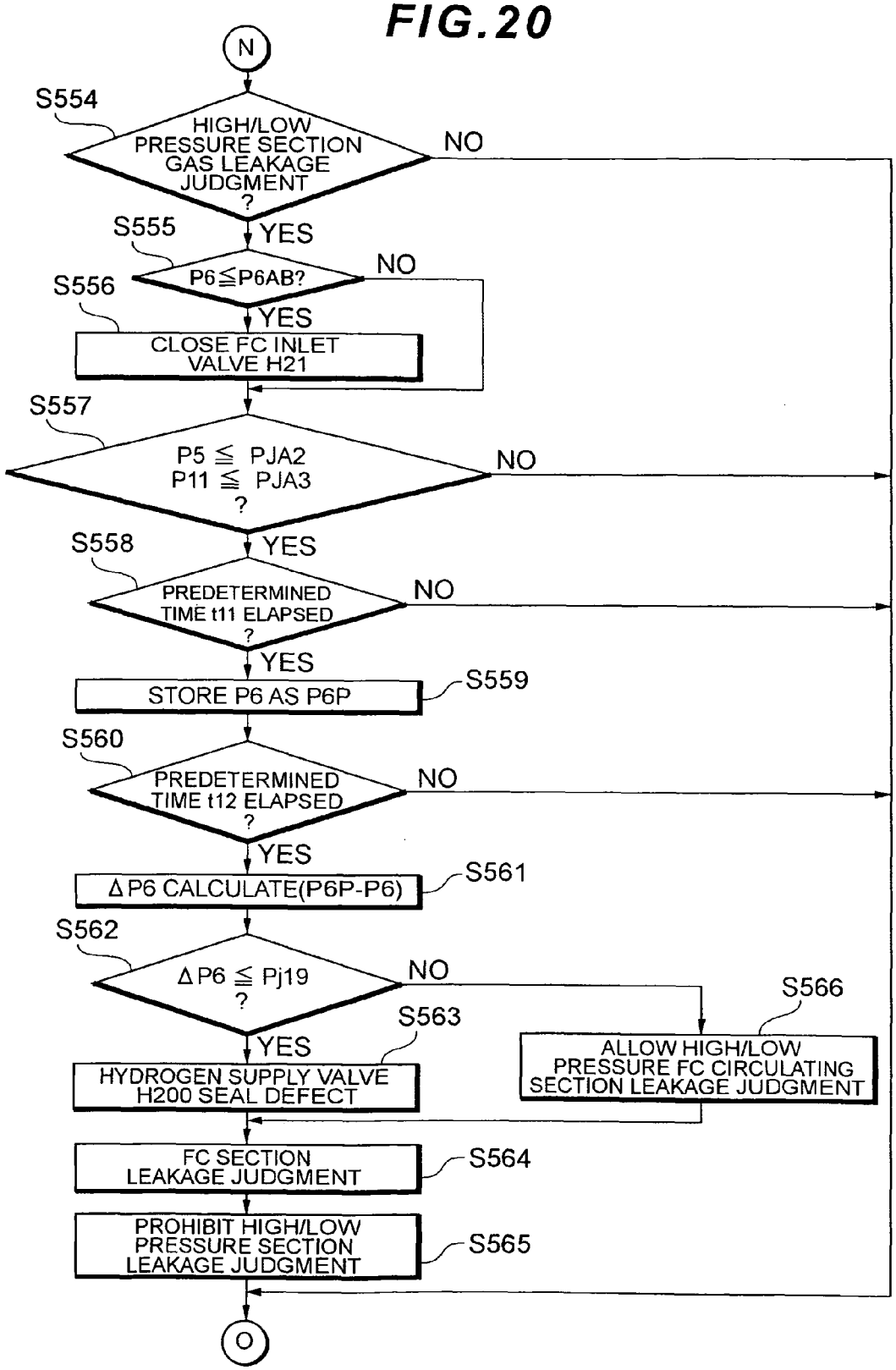

Next, the gas leakage judgment (S554) of the high/low pressure section constituted of the high pressure section and the low pressure section will be described. As shown in FIG. 20, in a case where the control section 50 judges that the pressure measured by the pressure sensor P6 is a target pressure P6AB or less (S555; YES), since it is indicated that the pressure of the high/low pressure section reaches the pressure suitable for the gas leakage judgment, the control section 50 closes the FC inlet valve H21 (S556). In consequence, the high/low pressure section is brought into the sealed state to form a closed space. Then, it is judged whether or not the pressures measured by the pressure sensors P5, P11 disposed on the downstream side of the FC inlet valve H21 drop below the predetermined pressures PJA2, PJA3, respectively (S557). When the measured pressures of the pressure sensors P5, P11 are the predetermined pressures PJA2, PJA3 or less, respectively (S557; YES), to perform the gas leakage judgment of the high/low pressure section, it is judged whether or not a predetermined time t11 has elapsed from a time when the FC inlet valve H21 was closed (S558). When the predetermined time t11 elapses (S558; YES), the measured pressure of the pressure sensor P6 is stored as P6P (S559).

Furthermore, it is judged whether or not a predetermined time t12 has elapsed from a time when the FC inlet valve H21 was closed (S560). When the predetermined time t12 elapses (S560; YES), a differential pressure (the pressure drop allowance) $\Delta P6$ between the stored pressure P6P and the measured pressure of the pressure sensor P6 is calculated (S561). Here, when the differential pressure $\Delta P6$ is a predetermined threshold pressure Pj19 or more (S562, YES), it is judged that the gas leaks from the hydrogen supply valve H200 owing to a seal defect (S563). Afterward, the control section performs the leakage judgment of the FC section (S564), and prohibits the leakage judgment of the high/low pressure section (S565). On the other hand, when the differential pressure $\Delta P6$ exceeds the predetermined threshold pressure Pj19 (S562; NO), the control section 50 performs the gas leakage judgment of the high/low pressure FC section as described later (S566), and prohibits the leakage judgment of the high/low pressure section (S565). It is to be noted that when the measured pressures of the pressure sensors P5, P11 exceed the predetermined pressures PJA2, PJA3 (S557; NO), when the predetermined time t11 has not elapsed from a time when the FC inlet valve H21 was closed (S558; NO), or when the predetermined time t12 has not elapsed (S560; NO), the control section 50 shifts to the next gas leakage judgment of the high/low pressure FC section.

Figure 21:
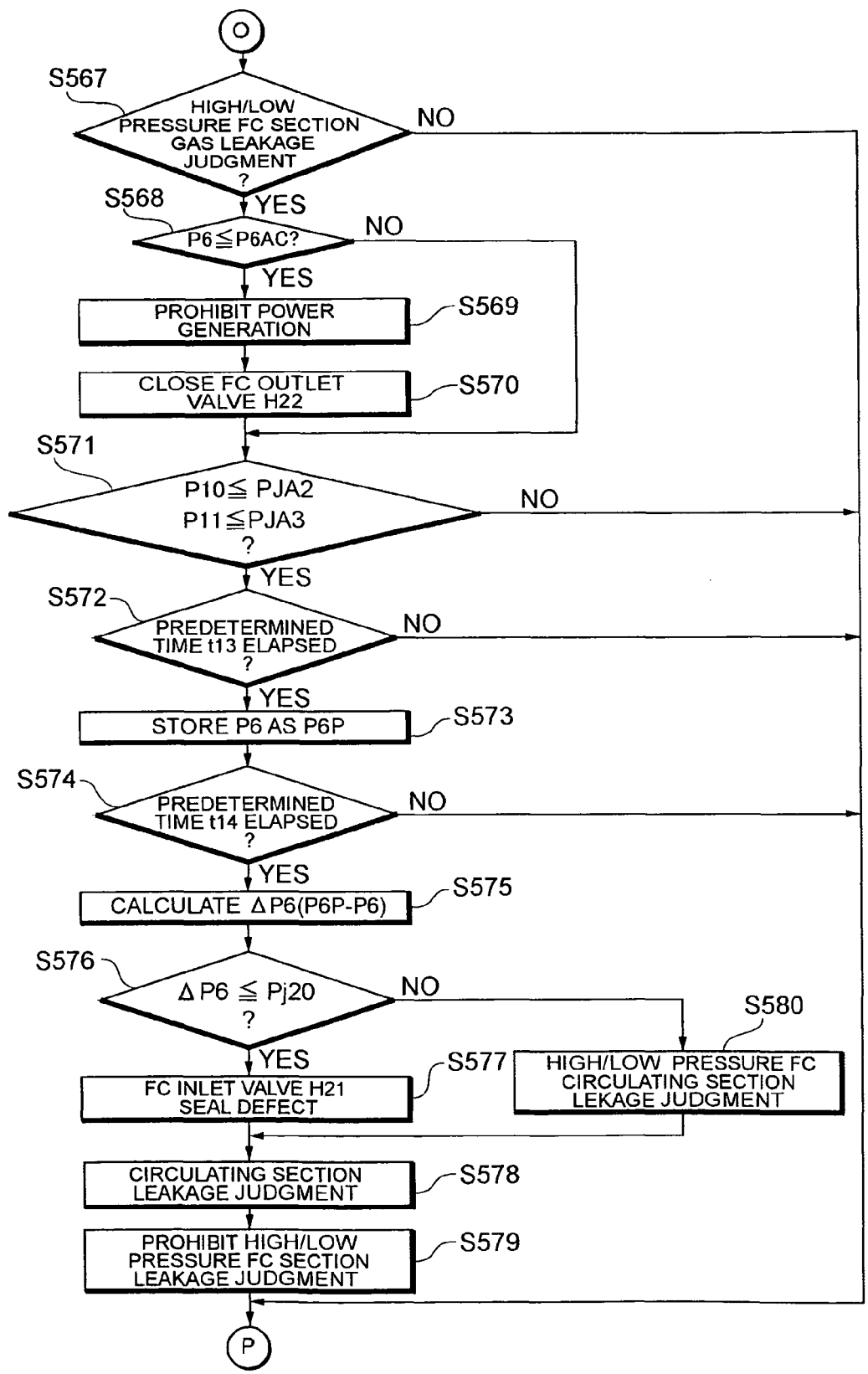

Next, the gas leakage judgment (S567) of the high/low pressure FC section constituted of the high pressure section, the low pressure section and the FC section will be described. As shown in FIG. 21, in a case where the control section 50 judges that the pressure measured by the pressure sensor P6 is a target pressure P6AC or less (S558; YES), since it is indicated that the pressure of the high/low pressure FC section reaches the pressure suitable for the gas leakage judgment, the control section 50 prohibits the power generation (S569), and closes the FC outlet valve H22 (S570). In consequence, the high/low pressure FC section is brought into the sealed state to form the closed space. Then, it is judged whether or not the pressures measured by the pressure sensors P10, P11 disposed on the downstream side of the FC outlet valve H22 drop below the predetermined pressures PJA2, PJA3, respectively (S571). When the measured pressures of the pressure sensors P10, P11 are the predetermined pressures PJA2, PJA3 or less, respectively (S571; YES), to perform the gas leakage judgment of the high/low pressure FC section, it is judged whether or not a predetermined time t13 has elapsed from a time when the FC outlet valve H22 was closed (S572). When the predetermined time t13 elapses (S572; YES), the measured pressure of the pressure sensor P6 is stored as P6P (S573).

Furthermore, it is judged whether or not a predetermined time t14 has elapsed from a time when the FC outlet valve H22 was closed (S574). When the predetermined time t14 elapses (S574; YES), a differential pressure (the pressure drop allowance) $\Delta P6$ between the stored pressure P6P and the measured pressure of the pressure sensor P6 is calculated (S575). Here, when the differential pressure $\Delta P6$ is a predetermined threshold pressure Pj20 or less (S576; YES), it is judged that the gas leaks from the FC inlet valve H21 owing to the seal defect (S577). Afterward, the control section performs the leakage judgment of the circulating section described above (S578), and prohibits the leakage judgment of the high/low pressure FC section (S573). On the other hand, when the differential pressure $\Delta P6$ exceeds the predetermined threshold pressure Pj20 (S576; NO), the control section 50 performs the gas leakage judgment of the high/low pressure FC circulating section as described later (S580), and prohibits the leakage judgment of the high/low pressure FC section (S579). It is to be noted that when the measured pressures of the pressure sensors P10, P11 exceed the predetermined pressures PJA2, PJA3 (S571; NO), when the predetermined time t13 has not elapsed from a time when the FC outlet valve H22 was closed (S572; NO), or when the predetermined time t14 has not elapsed (S574; NO), the control section 50 shifts to the next gas leakage judgment of the high/low pressure FC circulating section.

Figure 22:
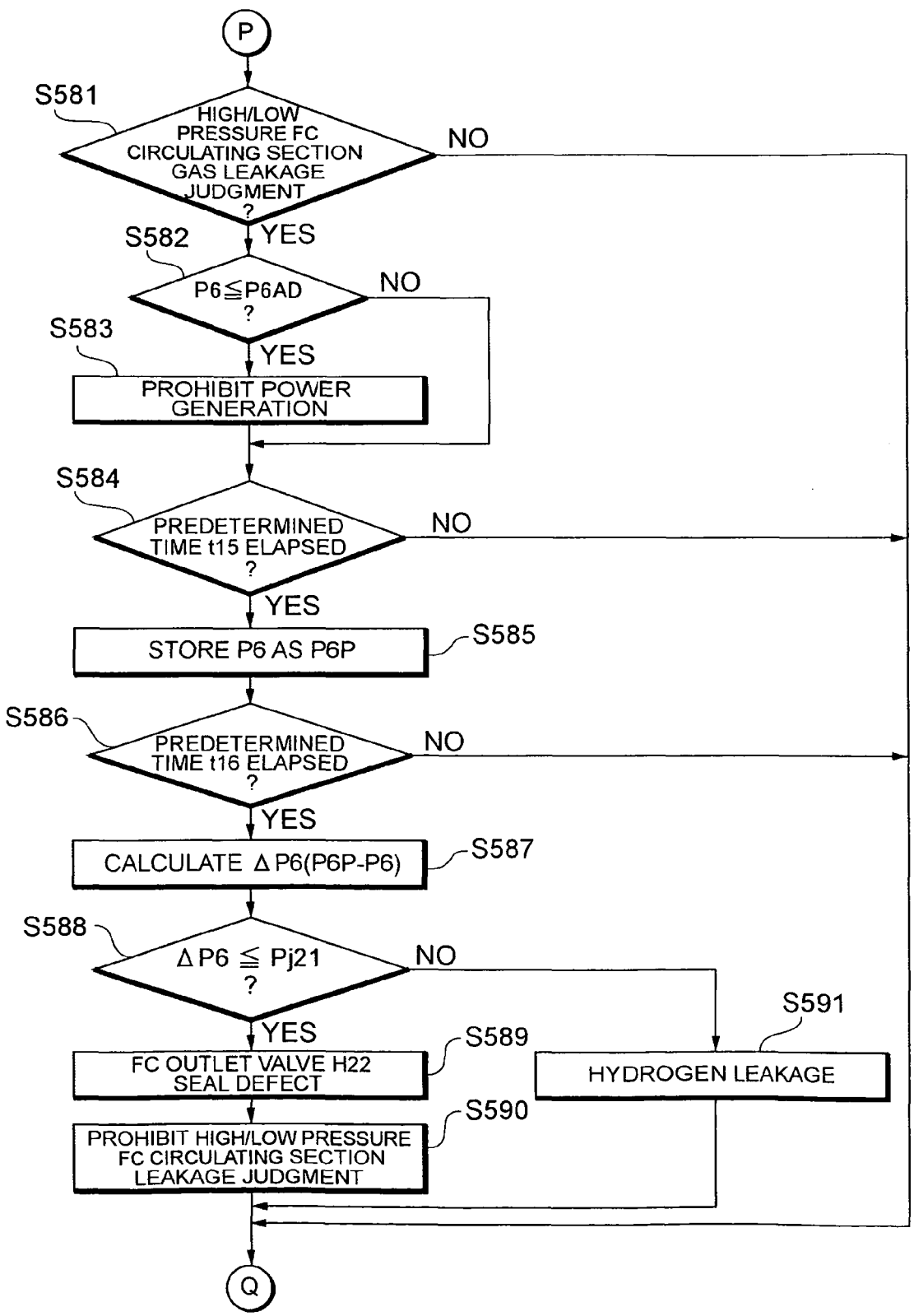

Next, the gas leakage judgment (S581) of the high/low pressure FC circulating section constituted of the high pressure section, the low pressure section, the FC section and the circulating section will be described. As shown in FIG. 22, in a case where the control section 50 judges that the pressure measured by the pressure sensor P6 is a target pressure P6AD or less (S582; YES), since it is indicated that the pressure of the high/low pressure FC circulating section reaches the pressure suitable for the gas leakage judgment, the control section 50 prohibits the power generation (S583). At this time, the opening of the purge valve is prohibited, and the high/low pressure FC circulating section is brought into the sealed state to form the closed space. Then, to perform the gas leakage judgment of the high/low pressure FC circulating section, it is judged whether or not a predetermined time t15 has elapsed from a time when the power generation was prohibited (S584). When the predetermined time t15 elapses (S584; YES), the measured pressure of the pressure sensor P6 is stored as P6P (S585).

Furthermore, it is judged whether or not a predetermined time t16 has elapsed from a time when the power generation was prohibited (S586). When the predetermined time t16 elapses (S586; YES), the differential pressure (the pressure drop allowance) $\Delta P6$ between the stored pressure P6P and the measured pressure of the pressure sensor P6 is calculated (S587). Here, when the differential pressure $\Delta P6$ is a predetermined threshold pressure Pj21 or less (S588; YES), it is judged that the gas leaks from the FC outlet valve H22 owing to the seal defect (S589). Afterward, the control section prohibits the leakage judgment of the high/low pressure FC circulating section (S590). On the other hand, when the differential pressure $\Delta P6$ exceeds the predetermined threshold pressure Pj21 (S588; NO), the control section 50 judges that the gas leaks (S591), and prohibits the leakage judgment of the high/low pressure FC circulating section (S590). As the causes for the gas leakage, breakages of the fuel gas supply path 31 and the fuel gas circulation path 32 and the like (causes other than seal defects of the hydrogen supply valve H200, the FC inlet valve H21 and the FC outlet valve H22) are considered. It is to be noted that when the predetermined time t15 has not elapsed from a time when the power generation was prohibited (S584; NO), or when the predetermined time t16 has not elapsed (S586; NO), the control section 50 shifts to the next gas leakage judgment of the low pressure FC section.

Figure 23:
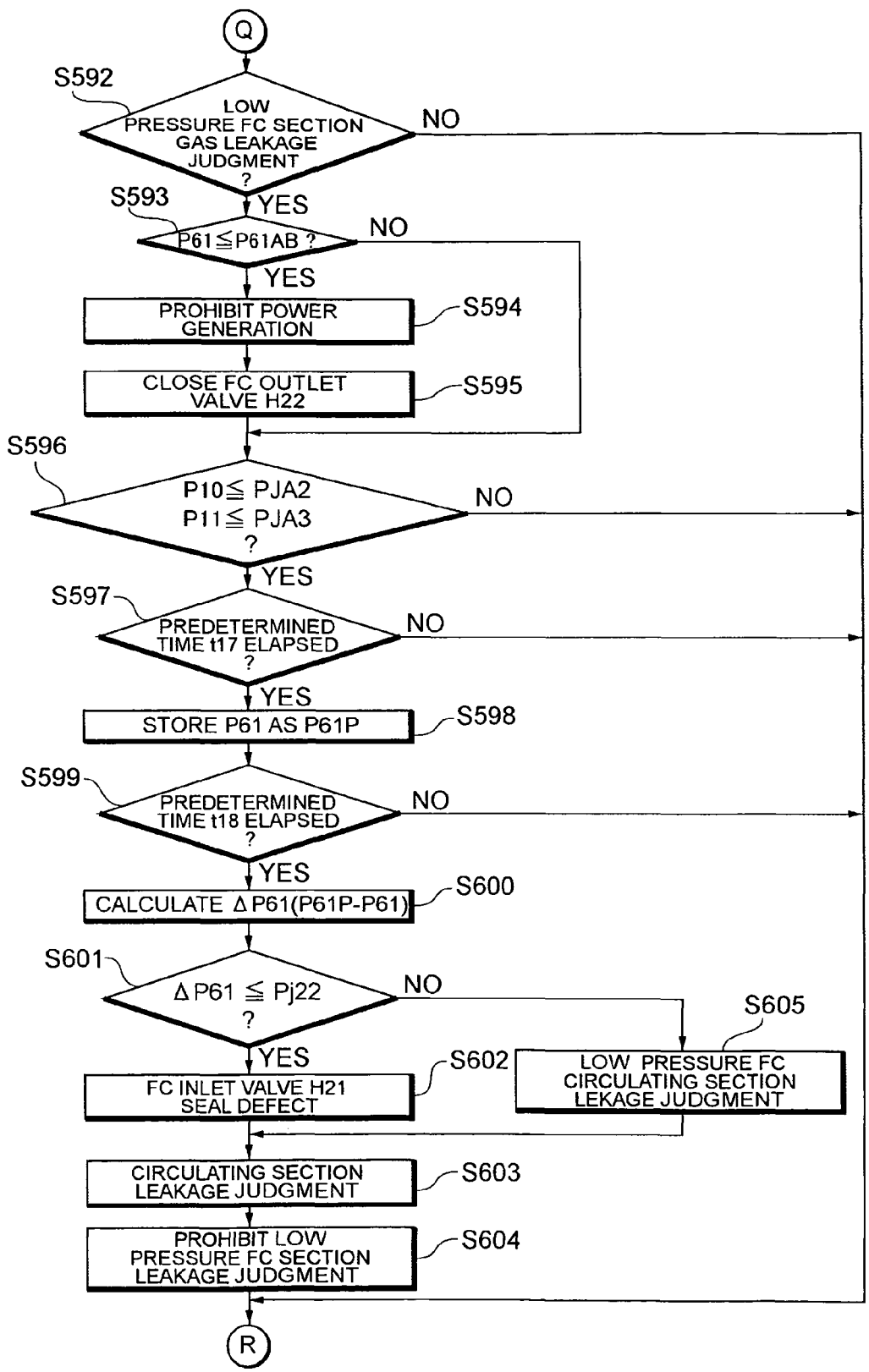

Next, the gas leakage judgment (S592) of the low pressure FC section constituted of the low pressure section and the FC section will be described. As shown in FIG. 23, in a case where the control section 50 judges that the pressure measured by the pressure sensor P61 is a target pressure P61AB or less (S593; YES), since it is indicated that the pressure of the low pressure FC section reaches the pressure suitable for the gas leakage judgment, the control section 50 prohibits the power generation (S594), and closes the FC outlet valve H22 (S595). In consequence, the low pressure FC section is brought into the sealed state to form the closed space. Then, to perform the gas leakage judgment of the low pressure FC section, it is judged whether or not a predetermined time t17 has elapsed from a time when the FC outlet valve H22 was closed (S597). When the predetermined time t17 elapses (S597; YES), the measured pressure of the pressure sensor P61 is stored as P61P (S598).

Furthermore, it is judged whether or not a predetermined time t18 has elapsed from a time when the FC outlet valve H22 was closed (S599). When the predetermined time t18 elapses (S599; YES), a differential pressure (the pressure drop allowance) ΔP61 between the stored pressure P61P and the measured pressure of the pressure sensor P61 is calculated (S600). Here, when the differential pressure ΔP61 is a predetermined threshold pressure Pj22 or less (S601; YES), it is judged that the gas leaks from the FC inlet valve H21 owing to the seal defect (S602). Afterward, the control section performs the leakage judgment of the circulating section described above (S603), and prohibits the leakage judgment of the low pressure FC section (S604). On the other hand, when the differential pressure ΔP61 exceeds the predetermined threshold pressure Pj22 (S601; NO), the control section 50 performs the gas leakage judgment of the low pressure FC circulating section as described later (S605), and prohibits the leakage judgment of the low pressure FC section (S604). It is to be noted that when the measured pressures of the pressure sensors P10, P11 exceed the predetermined pressures PJA2, PJA3 (S596; NO), when the predetermined time t17 has not elapsed from a time when the FC outlet valve H22 was closed (S597; NO), or when the predetermined time t18 has not elapsed (S599; NO), the control section 50 shifts to the next gas leakage judgment of the low pressure FC circulating section.

Figure 24:
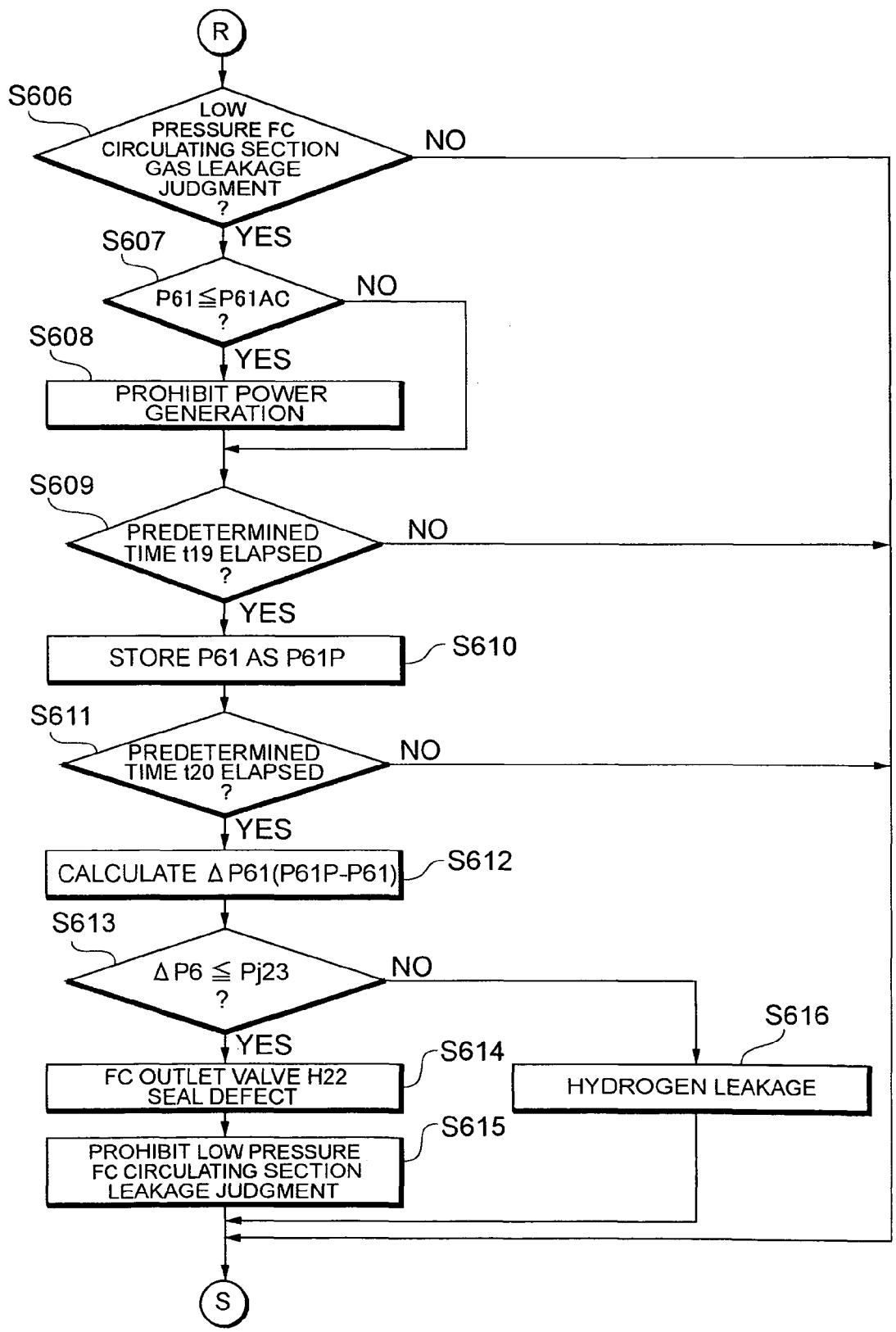

Next, the gas leakage judgment (S606) of the low pressure FC circulating section constituted of the low pressure section, the FC section and the circulating section will be described. As shown in FIG. 24, in a case where the control section 50 judges that the pressure measured by the pressure sensor P61 is a target pressure P61 AC or less (S607; YES), since it is indicated that the pressure of the low pressure FC circulating section reaches the pressure suitable for the gas leakage judgment, the control section 50 prohibits the power generation (S608). At this time, the opening of the purge valve is prohibited, and the low pressure FC circulating section is brought into the sealed state to form the closed space. Then, to perform the gas leakage judgment of the low pressure FC circulating section, it is judged whether or not a predetermined time t19 has elapsed from a time when the power generation was prohibited (S609). When the predetermined time t19 elapses (S609; YES), the measured pressure of the pressure sensor P61 is stored as P61P (S610).

Furthermore, it is judged whether or not a predetermined time t20 has elapsed from a time when the power generation was prohibited (S611). When the predetermined time t20 elapses (S611; YES), the differential pressure (the pressure drop allowance) ΔP61 between the stored pressure P61P and the measured pressure of the pressure sensor P61 is calculated (S612). Here, when the differential pressure ΔP61 is a predetermined threshold pressure Pj23 or less (S613; YES), it is judged that the gas leaks from the FC outlet valve H22 owing to the seal defect (S614). Afterward, the control section prohibits the leakage judgment of the low pressure FC circulating section (S615). On the other hand, when the differential pressure ΔP61 exceeds the predetermined threshold pressure Pj23 (S613; NO), the control section 50 judges that the gas leaks (S616), and prohibits the leakage judgment of the low pressure FC circulating section (S615). As the causes for the gas leakage, breakages of the fuel gas supply path 31 and the fuel gas circulation path 32 and the like (the causes other than seal defects of the hydrogen supply valve H200, the FC inlet valve H21 and the FC outlet valve H22) are considered. It is to be noted that when the predetermined time t19 has not elapsed from a time when the power generation was prohibited (S609; NO), or when the predetermined time t20 has not elapsed (S611; NO), the control section 50 shifts to the next gas leakage judgment of the FC circulating section.

Figure 25:
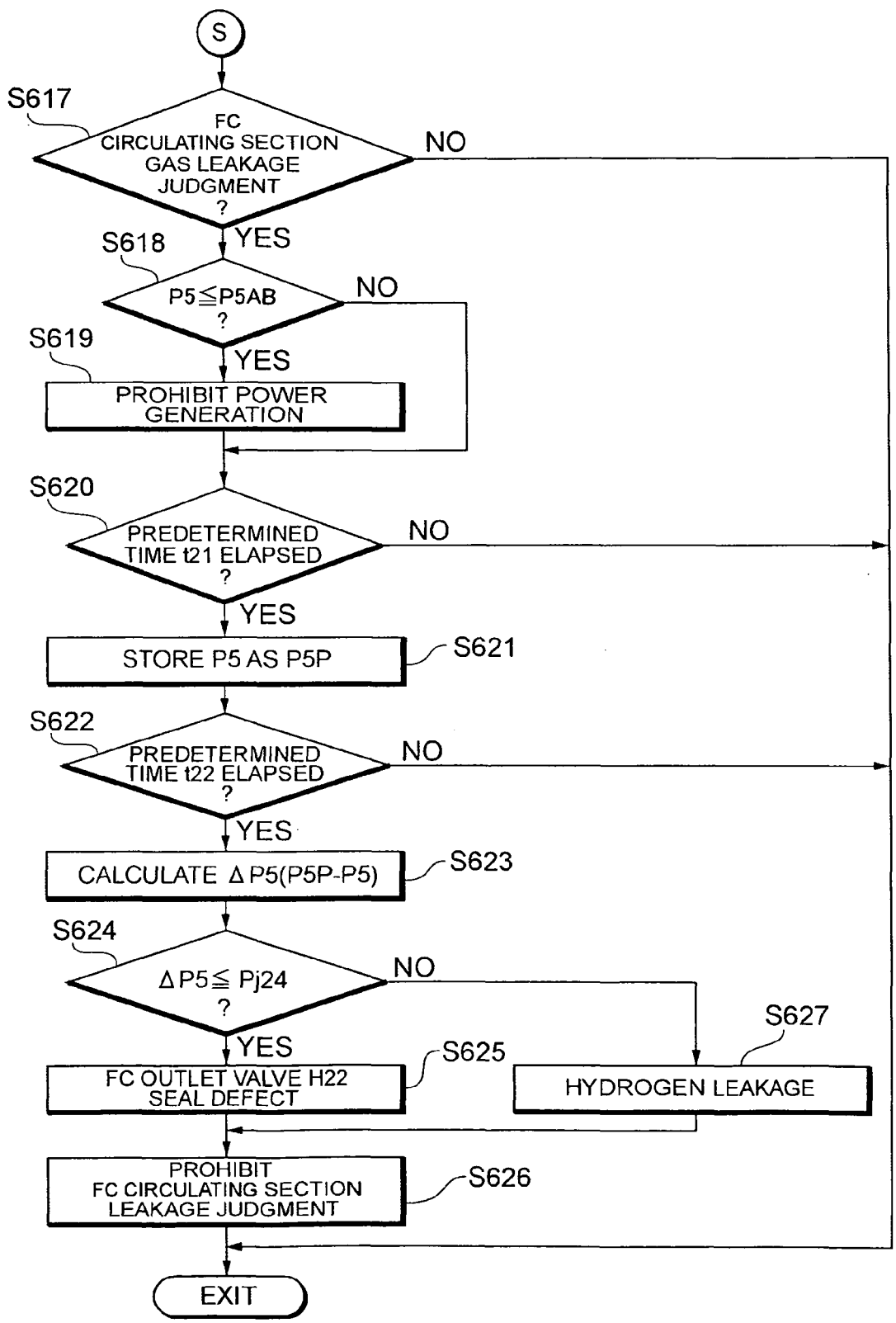

Next, the gas leakage judgment (S617) of the FC circulating section constituted of the FC section and the circulating section will be described. As shown in FIG. 25, in a case where the control section 50 judges that the pressure measured by the pressure sensor P5 is a target pressure P5AB or less (S618; YES), since it is indicated that the pressure of the FC circulating section reaches the pressure suitable for the gas leakage judgment, the control section 50 prohibits the power generation (S619). At this time, the opening of the purge valve is prohibited to bring the FC circulating section into the sealed state, thereby forming the closed space. Then, to perform the gas leakage judgment of the FC circulating section, it is judged whether or not a predetermined time t21 has elapsed from a time when the power generation was prohibited (S620). When the predetermined time t21 elapses (S620; YES), the measured pressure of the pressure sensor P5 is stored as P5P (S621).

Furthermore, it is judged whether or not a predetermined time t22 has elapsed from a time when the power generation was prohibited (S622). When the predetermined time t22 elapses (S622; YES), a differential pressure (the pressure drop allowance) ΔP5 between the stored pressure P5P and the measured pressure of the pressure sensor P5 is calculated (S623). Here, when the differential pressure ΔP5 is a predetermined threshold pressure Pj24 or less (S624; YES), it is judged that the gas leaks from the FC outlet valve H22 owing to the seal defect (S625). Afterward, the control section prohibits the leakage judgment of the FC circulating section (S626). On the other hand, when the differential pressure ΔP5 exceeds the predetermined threshold pressure Pj24 (S624; NO), the control section 50 judges that the gas leakage occurs (S627), and prohibits the leakage judgment of the FC circulating section (S626). As causes for the gas leakage, the breakages of the fuel gas supply path 31 and the fuel gas circulation path 32 and the like (the causes other than the seal defects of the FC inlet valve H21 an dh FC outlet valve H22) are considered. It is to be noted that when the predetermined time t21 has not elapsed from a time when the power generation was prohibited (S620; NO), or when the predetermined time t22 has not elapsed (S622; NO), the control section 50 shifts to the next step.

Figure 26:
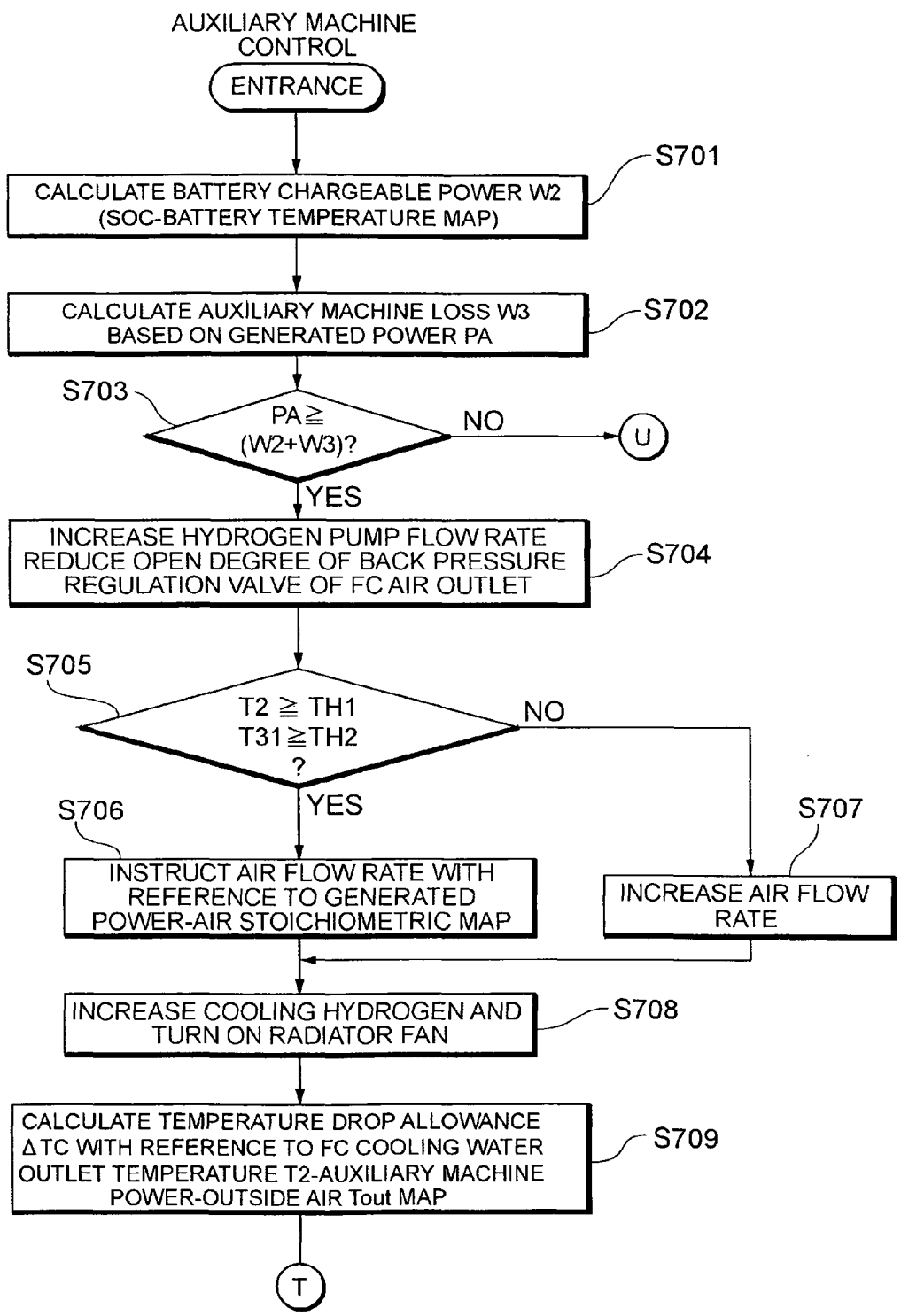
FIGS. 26 and 27 show an auxiliary machine control routine in the system control according to the first embodiment of the present invention.
Figure 27:
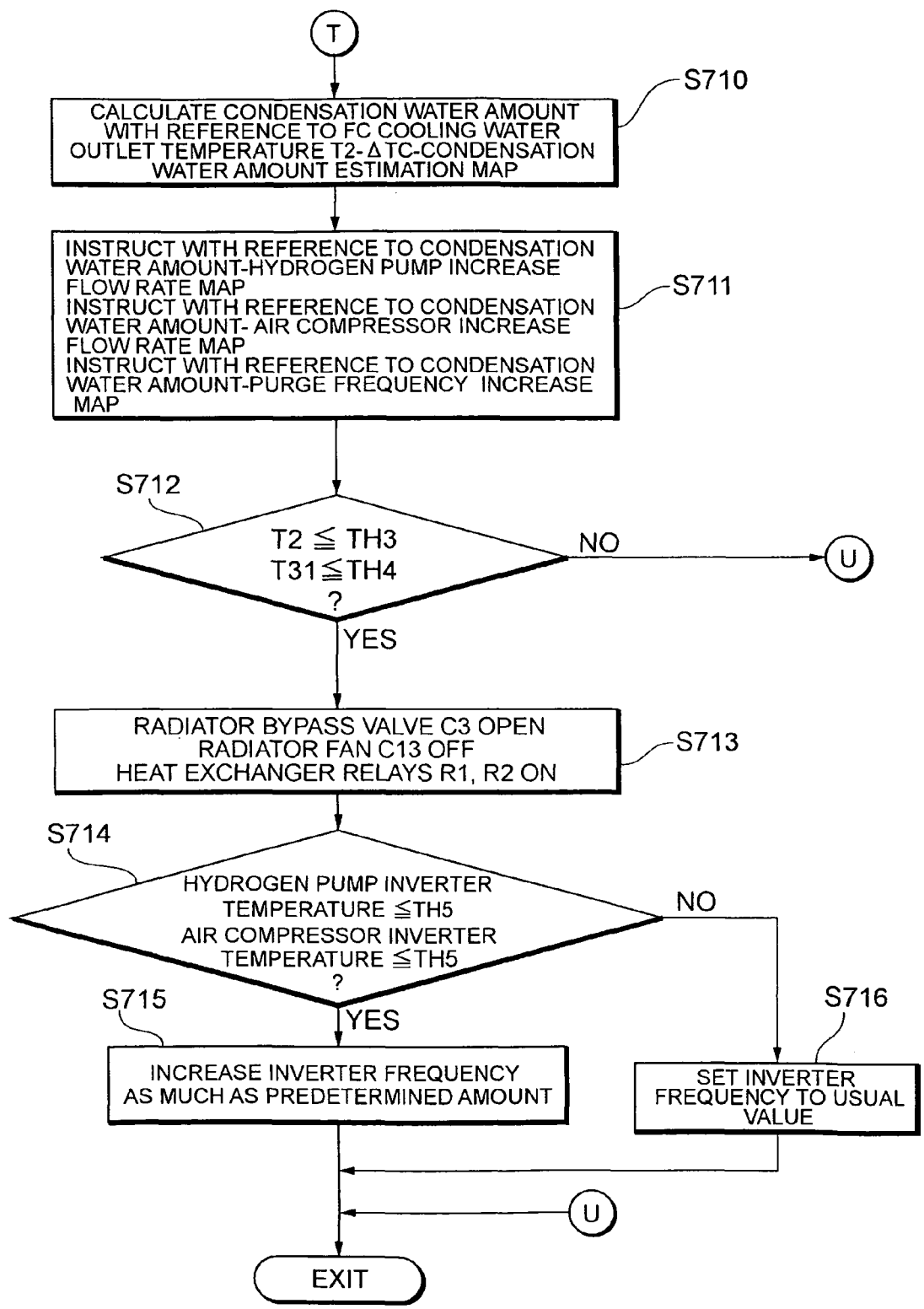

FIGS. 26 and 27 are flow charts showing an auxiliary machine control routine (S107). When such an auxiliary machine control routine is called, as shown in FIG. 26, the control section 50 calculates chargeable power W2 with respect to the battery 54 with reference to an SOC-battery temperature map (S701). The less the SOC of the battery 54 is, the more the chargeable power becomes. When the battery temperature is low or high, the chargeable power is reduced. Then, the control section 50 calculates an auxiliary machine loss W3 based on generated power PA of the fuel battery 20

(S702). Subsequently, it is judged whether or not the generated power PA exceeds the sum of the chargeable power W2 and the auxiliary machine loss W3 (S703). When the generated power PA exceeds the sum of the chargeable power W2 and the auxiliary machine loss W3 (S703; YES), the generated power PA tends to be surplus. Therefore, the flow rate of the hydrogen pump 63 is increased to increase a driving load (power consumption) of the hydrogen pump 63, or a valve open degree of the pressure regulation valve A4 is reduced to increase a fluid resistance of the cathode off gas channel 42, whereby the driving load (the power consumption) of the air compressor 40 is increased (S704).

Then, the control section 50 detects a temperature state of the fuel battery 20, and judges whether or not a measured temperature of a temperature sensor T2 is a predetermined temperature TH1 or more, or whether or not a measured temperature of a temperature sensor T31 is a predetermined temperature TH2 or more (S705). It is preferable to set predetermined temperatures TH1, TH2 to such temperatures that the fuel battery 20 tends to dry up. When the measured temperature of the temperature sensor T2 is the predetermined temperature TH1 or more, or when the measured temperature of the temperature sensor T31 is the predetermined temperature TH2 or more (S705; YES), the control section regulates the rotation number of the air compressor 40 with reference to the fuel battery generated power-air stoichiometric map so as to supply, to the fuel battery 20, such an oxidizing gas flow rate that the fuel battery 20 does not dry up (S706). On the other hand, in a case where the measured temperature of the temperature sensor T2 is less than the predetermined temperature TH1 and the measured temperature of the temperature sensor T31 is less than the predetermined temperature TH2 (S705; NO), even when the oxidizing gas flow rate to be supplied to the fuel battery 20 is increased, it is considered that the fuel battery 20 does not dry up. Therefore, the rotation number of the air compressor 40 is raised, and the driving load (the power consumption) of the air compressor 40 is increased (S707).

Then, the control section 50 increases the driving power (the power consumption) of the circulation pump C1 to increase a refrigerant flow rate, or drives the radiator fan C13 to increase an auxiliary machine loss of the cooling system (S708). In consequence, more surplus power can be consumed, but the temperature of the fuel battery 20 sometimes drops below a usual operation temperature. The control section 50 calculates a temperature drop allowance $\Delta TC$ of the fuel battery 20 with reference to an FC cooling water outlet temperature T2-auxiliary machine power-outside air temperature $T_{out}$ map (a three-dimensional map) (S709). This three-dimensional map is map data in which the temperature drop allowance of the fuel battery 20 is obtained beforehand based on the refrigerant temperature of the fuel battery 20, a driving load of a cooling auxiliary machine (the circulation pump C1 the radiator fan C13) and an outside air temperature $T_{out}$.

Subsequently, as shown in FIG. 27, the control section 50 estimates an amount of condensation water to be generated in the fuel battery 20 with reference to an FC cooling water outlet temperature T2-$\Delta TC$-condensation water amount estimation map (S710). It is considered that the fuel battery 20 on the anode side is almost filled with saturated water vapor, the condensation water amount can be estimated to a certain degree from the temperature drop allowance $\Delta TC$. Then, the control section 50 increases the rotation numbers of the hydrogen pump 63 and the air compressor 40 based on the condensation water amount with reference to a condensation water amount-hydrogen pump increase flow rate map, a condensation water amount-air compressor increase flow rate map and a condensation water amount-purge frequency increase map. When the condensation water amount increases, cell voltage drop due to flooding is seen, and hence amounts of the fuel gas and the oxidizing gas to be supplied are increased. To discharge water included in the fuel gas as much as possible, the purge frequency of the purge valve H51 is increased (S711).

Then, the control section 50 detects a temperature state of the fuel battery 20, and judges whether or not the measured temperature of the temperature sensor T2 is a predetermined temperature TH3 or less, or whether or not the measured temperature of the temperature sensor T31 is a predetermined temperature TH4 or less (S712). It is preferable that the predetermined temperatures TH3, TH4 are set so that the operation temperature of the fuel battery 20 is below a usual operation temperature. When the measured temperature of the temperature sensor T2 is the predetermined temperature TH3 or less, or when the measured temperature of the temperature sensor T31 is the predetermined temperature TH4 or less (S712; YES), to raise the refrigerant temperature, the control section 50 closes the bypass valve C3, turns off the radiator fan C13 and turns on the relays R1, R2 (S713). In consequence, the refrigerant bypasses the radiator C2 to flow into the heat exchanger 70, and the temperature of the refrigerant is raised with the heat exchanger 70. The heater 70a is energized, so that the surplus power can efficiently be consumed.

Subsequently, the control section 50 detects the temperature of the auxiliary inverter 52, and judges whether or not an inverter temperature of the hydrogen pump 63 or an inverter temperature of the air compressor 40 is a predetermined temperature TH5 or less (S714). It is preferable to set the predetermined temperature TH5 to a temperature at which a thermal loss of the auxiliary inverter 52 is excessively large. When the inverter temperature of the hydrogen pump 63 or the inverter temperature of the air compressor 40 is the predetermined temperature TH5 or less (S714; YES), it is considered that the thermal loss of the auxiliary inverter 52 is reduced. Therefore, an inverter frequency is raised to enlarge the thermal loss (S715). On the other hand, when the inverter temperature of the hydrogen pump 63 or the inverter temperature of the air compressor 40 is the predetermined temperature TH5 or more (S714; NO), the thermal loss of the auxiliary inverter 52 is large, and hence the inverter frequency is maintained at a usual value (S716).

Figure 28:
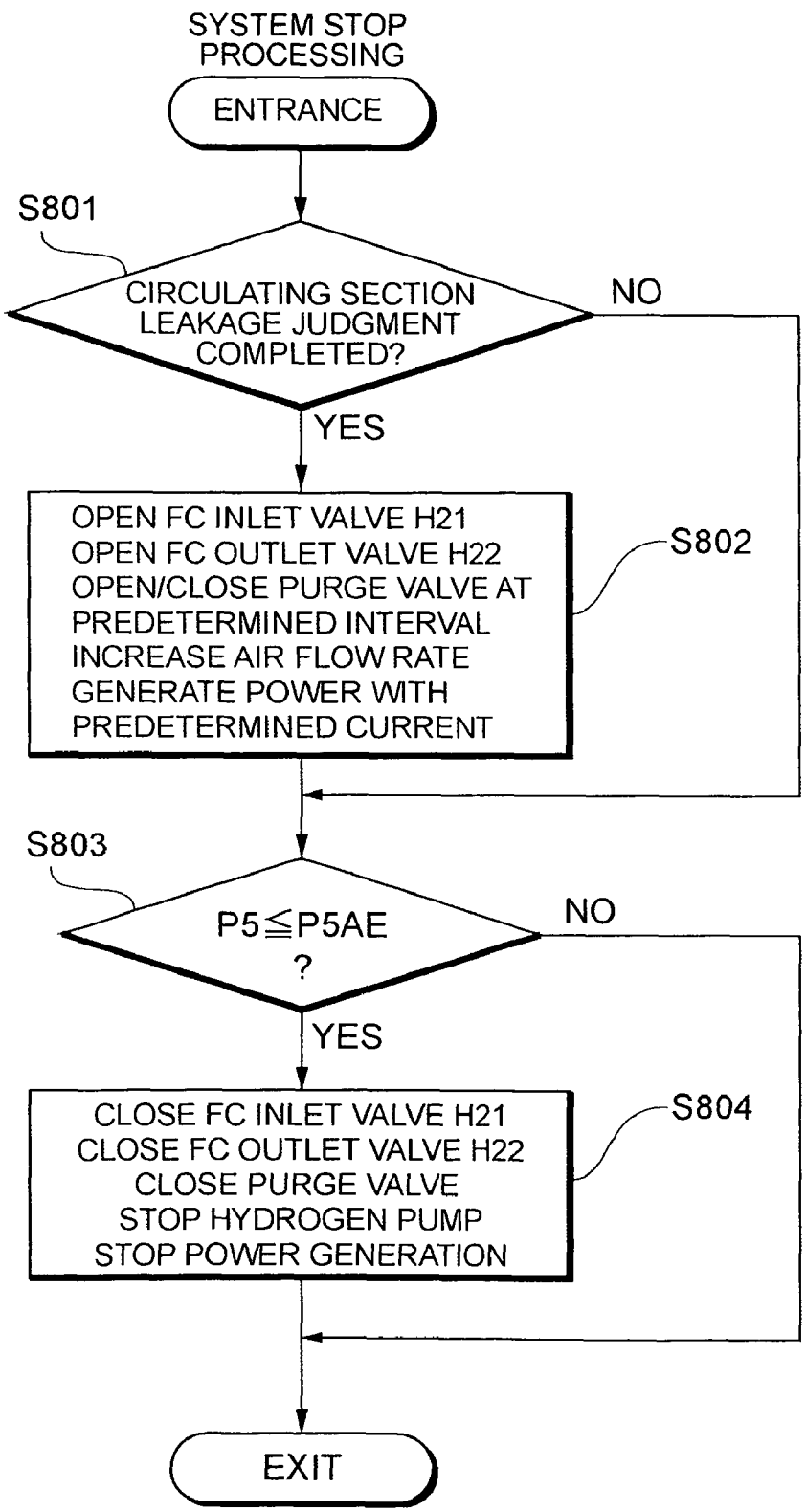
FIG. 28 shows a system stop processing routine in the system control according to the first embodiment of the present invention.

FIG. 28 is a flow chart showing the system stop processing routine (S110). When such system stop processing routine is called, the control section 50 judges whether or not the gas leakage judgment of the circulating section has been completed (S801). When the gas leakage judgment of the circulating section is completed (S801; YES), the control section 50 opens the FC inlet valve H21 and the FC outlet valve H22 to guide the fuel gas remaining in the fuel gas supply path 31 and the fuel gas circulation path 32 to the fuel battery 20 (S802). Simultaneously, the control section 50 rotates the air compressor 40 to supply the oxidizing gas to the fuel battery 20. The fuel gas introduced in the fuel battery 20 is consumed by the power generation. Furthermore, the control section 50 opens the purge valve H51 at an appropriate time interval, whereby the fuel gas is purged to reduce impurity concentration of the fuel gas circulated through the fuel battery 20. Then, it is judged whether or not the measured pressure of the pressure sensor P5 drops below a target pressure P5AE (S803). It is preferable to set the target pressure P5AE so that the fuel gas does not cross-leak to a cathode side during system stop. When the measured pressure of the pressure sensor P5 drops below the target pressure P5AE (S803; YES), the control section 50 closes the FC inlet valve H21, the FC outlet valve H22 and the purge valve H51, stops the air compressor 40 and the hydrogen pump 63, and stops power generation (S804).

Figure 29:
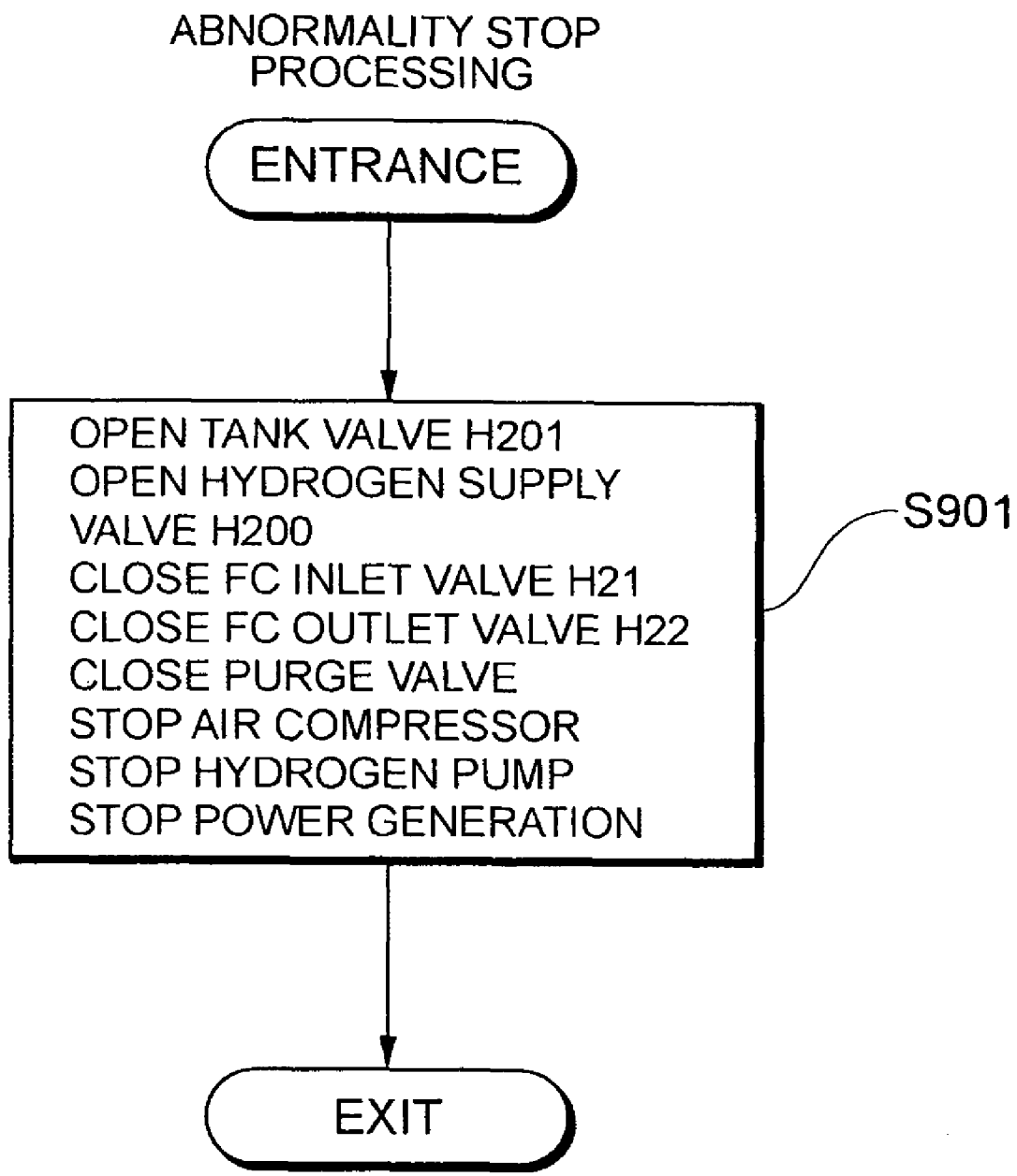
FIG. 29 shows an abnormality stop processing routine in the system control according to the first embodiment of the present invention.

FIG. 29 is a flow chart showing the abnormality stop processing routine (S112). In the above-mentioned gas leakage judgment (S102, S106 and S109), when it is judged that the gas leaks (S210, S552, S591, S616 and S627), the abnormality stop processing routine is called. When the routine is called, the control section 50 closes all the valves arranged in the fuel gas supply system, that is, the tank valve H201, the hydrogen supply valve H200, the FC inlet valve H21, the FC outlet valve H22 and the purge valve H51, and further stops the air compressor 40 and the hydrogen pump 63 to stop power generation (S901).

In the fuel battery system 10 according to the above embodiment, the gas leakage in one closed space is detected in a state in which the pressure of the other closed space adjoining at least the one closed space (e.g., the closed space in the high pressure section) as the gas leakage detection target on the downstream side is lowered. That is, not only the pressure drop of at least one closed space as the gas leakage detection target but also a pressure rise of the other closed space adjoining this one closed space on the downstream side can be detected. Therefore, it is possible to detect not only the gas leakage (external leakage) due to wall surface crack of a gas passage pipe which defines a part of this one closed space but also the gas leakage (internal leakage) to the other closed space due to valve closing abnormality (e.g., seal defect) of the valve for forming this one closed space in the gas passage. Therefore, as compared with a case where the conventional gas leakage detection system only is employed to detect the gas leakage based on the only pressure state of the one closed space, the accuracy of the gas leakage detection can be improved.

(Second Embodiment)

Next, a fuel battery system according to a second embodiment of the present invention will be described with reference to FIGS. 30 to 34. In the fuel battery system according to the present embodiment, a constitution of a control section of a fuel battery system 10 according to the first embodiment is changed, and another constitution is substantially the same as that of the first embodiment. Therefore, the changed constitution will mainly be described, and parts common to the first embodiment are denoted with the same reference numerals, and description thereof is omitted.

In the same manner as in the control section 50 of the first embodiment, a control section of the present embodiment obtains system required power based on an accelerator open degree detected by an acceleration sensor 55 or the like, and controls the fuel battery system so that output power of the fuel battery 20 matches with target power. Moreover, the section controls a DC/DC converter 53 to regulate an operation point of the fuel battery 20 so that the output power of the fuel battery 20 matches with the target power. The control section 50 of the present embodiment detects fuel gas leakage for each of closed spaces formed in sections (a high pressure section, a low pressure section, an FC section and a circulating section) of a fuel gas supply system. In this case, the control section 50 detects the gas leakage of one closed space in a state in which a pressure of at least one closed space as a gas leakage detection target on a downstream side is lowered, and the section judges that the gas leakage (especially, a valve closing abnormality of a valve) has been generated in this one closed space in a case where the pressure of the other closed space adjoining this one closed space on the downstream side rises. On the other hand, when the pressure of the other closed space adjoining this one closed space on the downstream side does not rise, it is judged that the gas leakage from a gas pipe has been generated owing to wall surface crack of the gas pipe of the fuel gas supply system which defines the one closed space.

Next, system control to be executed by the control section of the fuel battery system according to the embodiment of the present invention will be described with reference to FIGS. 30 to 34. In the system control of the present embodiment, a part of steps (FIG. 2; S106, S109) concerned with the gas leakage judgment during an intermittent operation or system stop is changed in a main routine described in the first embodiment, and the other steps are substantially the same as those of the first embodiment. Therefore, the changed steps will mainly be described.

First, the main routine will be described, When the fuel battery system is started, in the same manner as in the first embodiment (FIG. 2), the control section performs gas leakage judgment (S102) of the fuel gas supply system. Here, in a case where it is judged that there is not any gas leakage and that power can normally be generated, usual power generation control (S104) is performed, and then load driving judgment control (S104') is performed. When the usual operation is continued in this manner and predetermined intermittent operation start conditions are satisfied (S105; YES), the control section stops the power generation to perform the gas leakage judgment of the fuel gas supply system (S106). Subsequently, auxiliary machine control is performed in order to increase power consumption of auxiliary machines (S107). When the system stop is performed, the control section performs gas leakage judgment (S109) of the fuel gas supply system, and performs system stop processing (S110). When the gas leakage is detected (S111; YES), abnormality stop processing is performed (S112).

It is to be noted that in the present embodiment, a gas leakage judgment processing routine at the start of the system, a usual power generation control routine, a load driving judgment control routine, an auxiliary machine control routine, a system stop processing routine and an abnormality stop processing routine are substantially the same as those of the first embodiment (FIGS. 3 to 5 and FIGS. 26 to 29), and hence description thereof is omitted.

Next, the gas leakage judgment processing routine during the intermittent operation or the system stop will be described. In such a gas leakage judgment processing routine, first, in the same manner as in the first embodiment, various types of processing (pressure judgment, purge judgment and the like in each section) before the gas leakage judgment processing are performed. Since these various types of processing before the gas leakage judgment processing are substantially the same as those of the first embodiment (FIGS. 6 to 15), description thereof is omitted.

Figure 30:
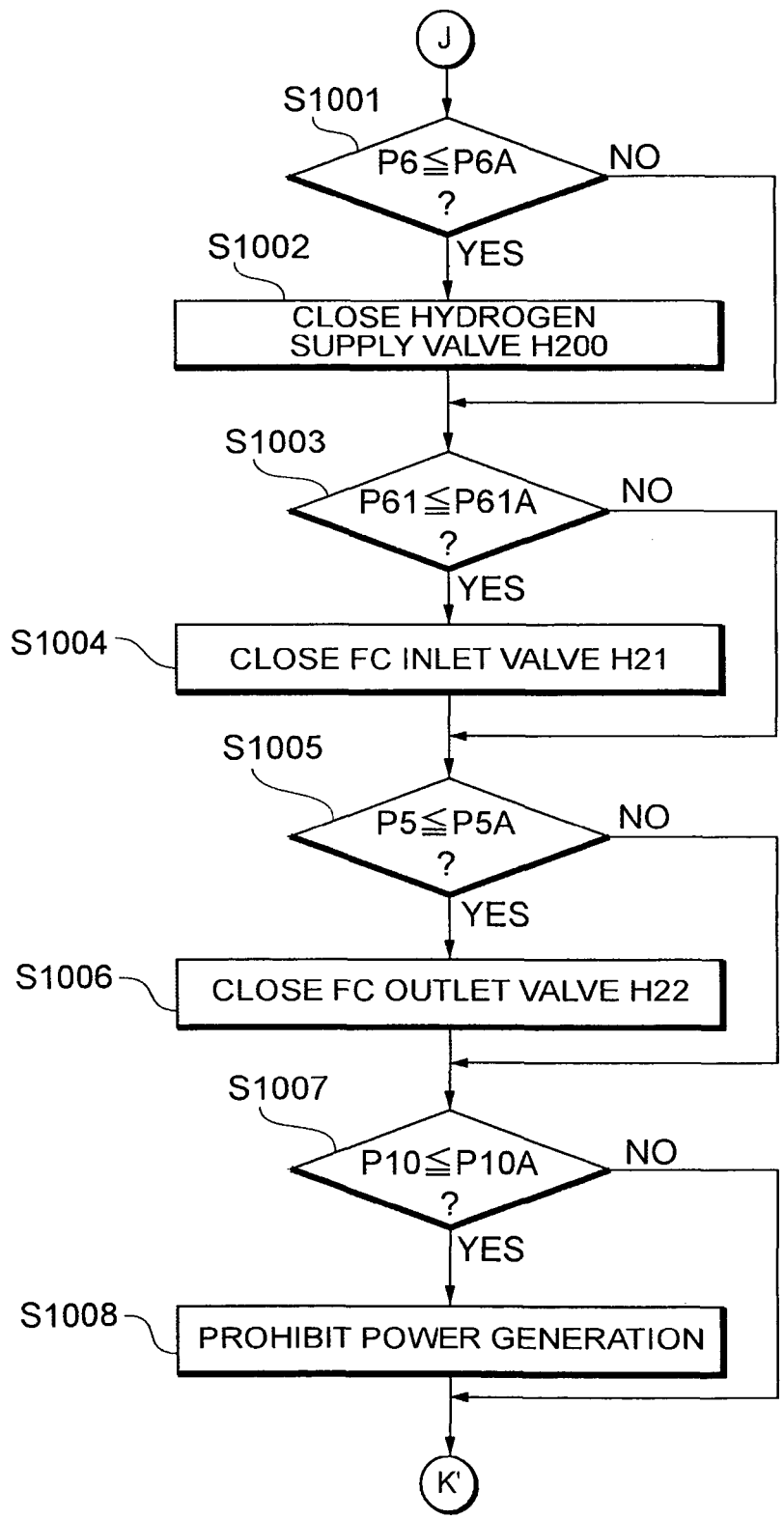
FIGS. 30 to 34 show a gas leakage judgment processing routine in system control according to a second embodiment of the present invention.

Subsequently, after performing the pressure judgment, the purge judgment and the like as shown in FIGS. 6 to 15, the control section performs valve closing processing as shown in FIG. 30 before the gas leakage judgment. The valve closing processing is processing of closing valves to form a closed space in a gas passage. As shown in FIG. 30, in a case where a measured pressure of a pressure sensor P6 is a target pressure P6A or less (S1001; YES), since it is indicated that the pressure of the high pressure section reaches a pressure suitable for the gas leakage judgment, the control section closes a hydrogen supply valve H200 (S1002). In consequence, the high pressure section is brought into a sealed state, and the closed space is formed. Subsequently, in a case where a measured pressure of a pressure sensor P61 is a target pressure P61A or less (S1003; YES), since it is indicated that the pressure of the low pressure section reaches a pressure suitable for the gas leakage judgment, the control section closes an FC inlet valve H21 (S1004). In consequence, the low pressure section is brought into a sealed state, and the closed space is formed. Subsequently, in a case where a measured pressure of a pressure sensor P5 is a target pressure P5A or less (S1005; YES), since it is indicated that the pressure of the FC section reaches a pressure suitable for the gas leakage judgment, the control section closes an FC outlet valve H22 (S1006). In consequence, the FC section is brought into a sealed state, and the closed space is formed. Then, in a case where a measured pressure of a pressure sensor P10 is a target pressure P10A or less (S1007; YES), since it is indicated that the pressure of the circulating section reaches a pressure suitable for the gas leakage judgment, the control section prohibits power generation (S1008). At this time, opening of the purge valve is prohibited to bring the circulating section into a sealed state, and the closed space is formed.

Figure 31:
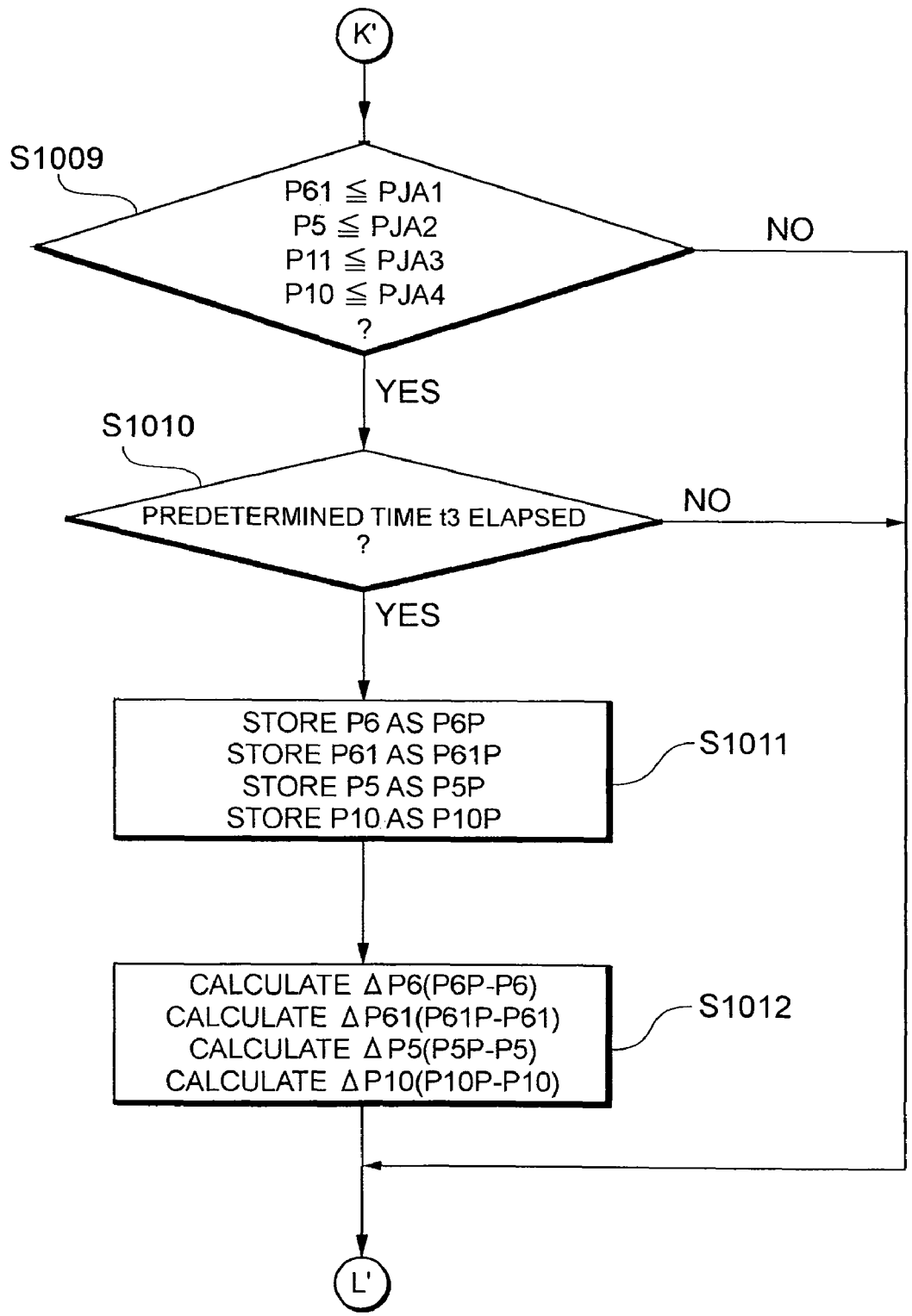

Subsequently, the control section 50 performs gas leakage judgment start processing as shown in FIG. 31. The gas leakage judgment start processing is predetermined processing to be performed before starting the gas leakage judgment. As shown in FIG. 31, the control section judges whether or not the measured pressure of the pressure sensor P61 disposed on the downstream side of the hydrogen supply valve H200 drops below a predetermined pressure PJA1, whether or not measured pressures of the pressure sensors P5 and P11 disposed on the downstream side of the FC inlet valve H21 drop below predetermined pressures PJA2, PJA3, respectively, and whether or not the measured pressure of the pressure sensor P10 disposed on the downstream side of the FC outlet valve H22 drops below a predetermined pressure PJA4 (S1009). The predetermined pressures PJA1 to PJA4 are pressures for judging whether or not the valves are securely closed, and S1009 is one embodiment of a first step in the present invention.

Then, in a case where the measured pressures of the pressure sensors P61 to 10 are the predetermined pressures PJA1 to PJA4 or less, respectively (S1009; YES), it is judged whether or not a predetermined time t3 has elapsed from a time when the valves were completely closed and the power generation was prohibited (S1010). When the predetermined time t3 elapses (S1010; YES), the measured pressures of the pressure sensors P6, P61, P5 and P10 are stored as P6P, P61P, P5P and P10P (S1011). Then differential pressures (pressure drop allowances) ΔP6, ΔP61, ΔP5 and ΔP10 between the stored pressures P6P to P10P and the measured pressures of the pressure sensors P6 to P10 are calculated (S1012). It is to be noted that in a case where the measured pressures of the pressure sensors P61 to 10 exceed the predetermined pressures PJA1 to PJA4 (S1009; NO) or in a case where the predetermined time t3 has not elapsed from a time when the power generation was prohibited (S1010; NO), the control section does not store the measured pressures or calculate the differential pressures, and shifts to next gas leakage judgment of the high pressure section.

Figure 32:
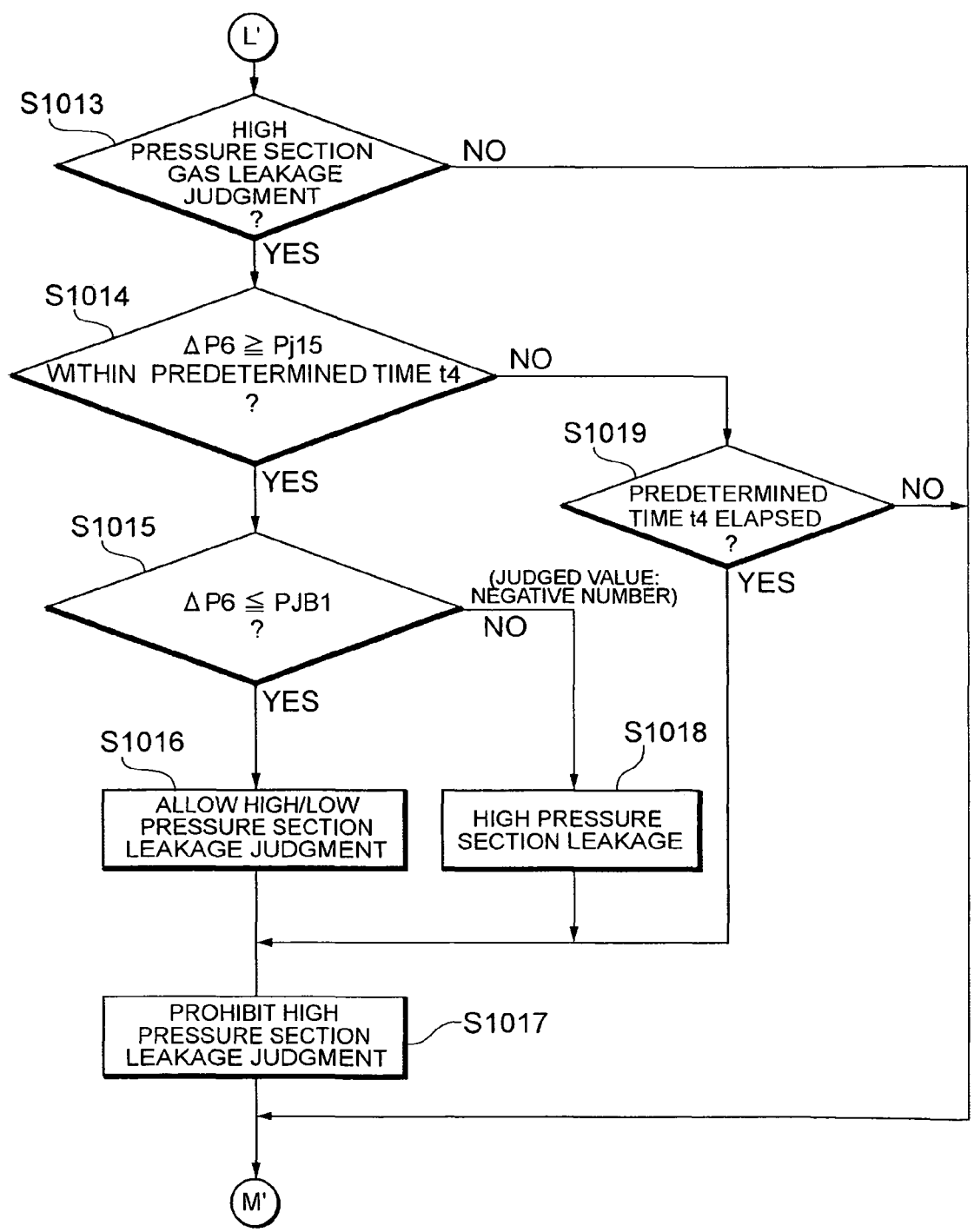

Next, the gas leakage judgment (S1013) of the high pressure section will be described. As shown in FIG. 32, the control section judges whether or not a predetermined time t4 has elapsed from a time when the power generation was prohibited (S1008) in the above-mentioned valve closing processing, and further judges whether or not a differential pressure (a pressure reduction value) ΔP6 between the stored pressure P6P and the measured pressure of the pressure sensor P6 reaches a predetermined pressure Pj15 (a predetermined threshold value) or more within this predetermined time t4 (S1014). The step S1014 is one embodiment of a second step in the present invention. Subsequently, in a case where the differential pressure ΔP6 reaches the predetermined pressure Pj15 or more within the predetermined time t4 (S1014; YES), the control section judges whether or not a differential pressure ΔP61 between the stored pressure P61P and the measured pressure of the pressure sensor P61 is a predetermined pressure PJB1 or less (S1015). Here, as the predetermined pressure PJB1, a "negative" value is employed. When the measured pressure of the pressure sensor P61 is higher than the stored pressure P61P and the differential pressure ΔP61 is "negative" (i.e., there is a pressure rise) and is the predetermined pressure PJB1 or less (S1015; YES), the gas leakage judgment of the high/low pressure section is allowed (S1016), and then the gas leakage judgment of the high pressure section is prohibited (S1017).

On the other hand, in a case where the differential pressure ΔP6 reaches the predetermined pressure Pj15 or more within the predetermined time t4 (S1014; YES), and the differential pressure ΔP61 exceeds the predetermined pressure PJB1 (i.e., there is not any pressure-rise) (S1015; NO), it is judged that the gas leakage has been generated in the high pressure section (S1018), and the gas leakage judgment of the high pressure section is prohibited (S1017). The step S1015 is one embodiment of a third step of the present invention. As causes for the gas leakage of the high pressure section, opening failure of the tank valve H201 or the hydrogen supply valve H200, breakage of regulators H9, H10 or a fuel gas supply path 31 and the like are considered. It is to be noted that when the differential pressure ΔP6 is less than the predetermined pressure Pj15 and the predetermined time t4 elapses (S1014; NO, S1019; YES), the gas leakage judgment of the high pressure section is prohibited without performing any special processing (S1017). Even in a case where the predetermined time t4 has not elapsed (S1019; NO), the control section shifts to the next gas leakage judgment of the low pressure section.

Figure 33:
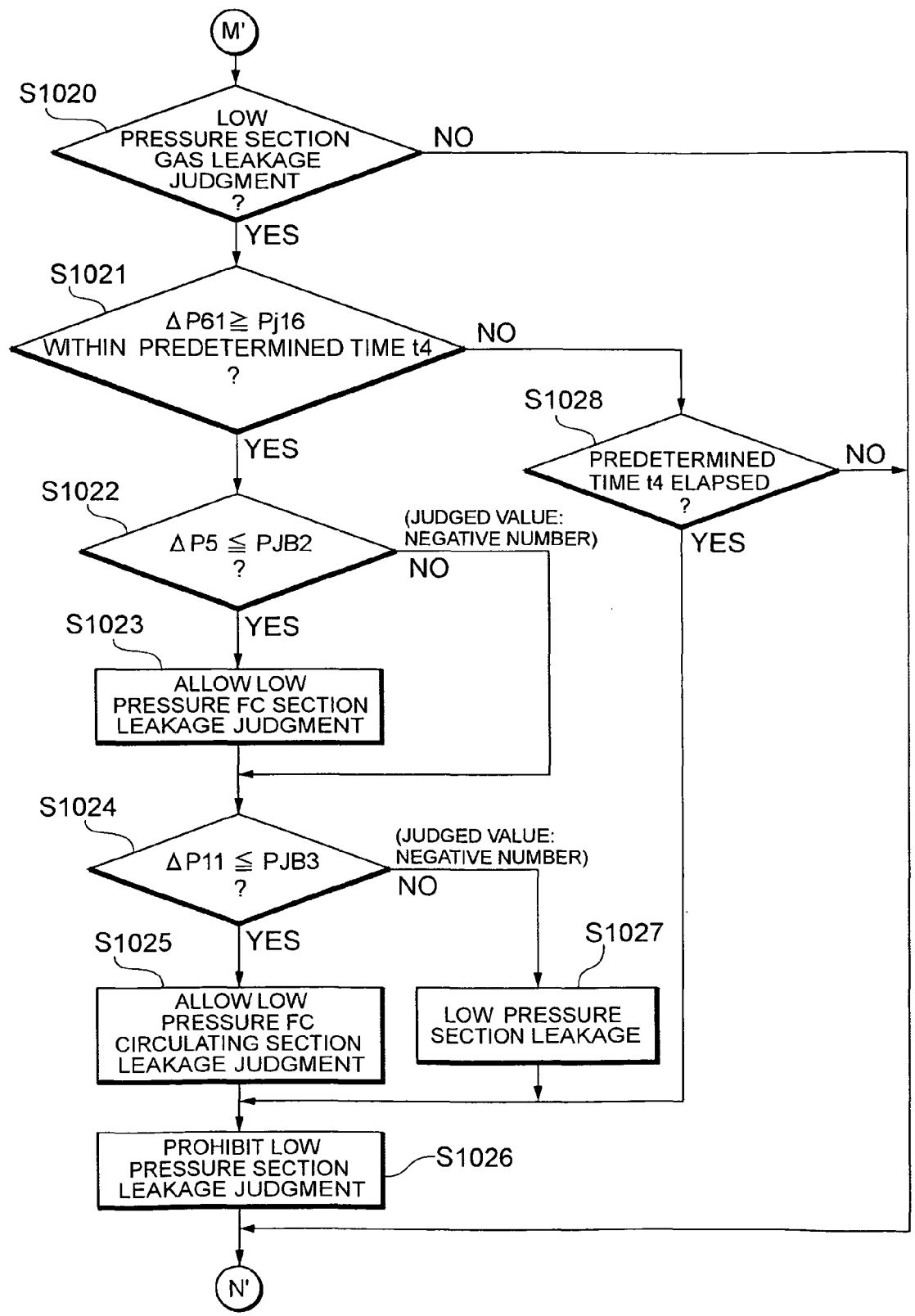

Next, the gas leakage judgment (S1020) of the low pressure section will be described. As shown in FIG. 33, the control section judges whether or not the predetermined time t4 has elapsed from a time when the power generation was prohibited (S1008) in the above-mentioned valve closing processing, and further judges whether or not a differential pressure ΔP61 between the stored pressure P61P and the measured pressure of the pressure sensor P61 reaches a predetermined pressure Pj16 or more within this predetermined time t4 (S1021). The step S1021 is one embodiment of the second step in the present invention. Subsequently, in a case where the differential pressure ΔP61 reaches the predetermined pressure Pj16 or more within the predetermined time t4 (S1021; YES), the control section judges whether or not a differential pressure ΔP5 between the stored pressure P5P and the measured pressure of the pressure sensor P5 is a predetermined pressure PJB2 (a negative value) or less (S1022). When the differential pressure ΔP5 is the predetermined pressure PJB2 or less (there is a pressure rise) (S1022; YES), the gas leakage judgment of the low pressure FC section is allowed (S1023). Afterward, the control section judges whether or not a differential pressure ΔP11 between the stored pressure P11P and the measured pressure of the pressure sensor P11 is a predetermined pressure PJB3 (a negative value) or less (S1024). When the differential pressure ΔP11 is the predetermined pressure PJB3 or less (there is a pressure rise) (S1024; YES), the gas leakage judgment of the low pressure FC circulating section is allowed (S1025), and the gas leakage judgment of the low pressure section is prohibited (S1026).

On the other hand, in a case where the differential pressure ΔP61 reaches the predetermined pressure Pj16 or more within the predetermined time t4 (S1021; YES), and the differential pressure ΔP5 exceeds the predetermined pressure PJB2 (there is not any pressure rise) (S1022; NO), the gas leakage judgment of the low pressure FC section is not performed, and it is judged whether or not a differential pressure ΔP11 is the predetermined pressure PJB3 or less (S1024). Then, in a case where the differential pressure ΔP11 exceeds the predetermined pressure PJB3 (there is not any pressure rise) (S1024; NO), it is judged that the gas leakage has been generated in the low pressure section (S1027), and the gas leakage judgment of the low pressure section is prohibited (S1026). The steps S1022 and S1024 are one embodiment of the third step of the present invention. As causes for the gas leakage of the low pressure section, opening failure of the hydrogen supply valve H200 or the FC inlet valve H21, breakage of the fuel gas supply path 31 and the like are considered. It is to be noted that when the differential pressure ΔP61 is less than the predetermined pressure Pj16 and the predetermined time t4 elapses (S1021; N0, S1028; YES), the gas leakage judgment of the low pressure section is prohibited without performing any special processing (S1026). Even in a case where the predetermined time t4 has not elapsed (S1028; NO), the control section shifts to the next gas leakage judgment of the FC section.

Figure 34:
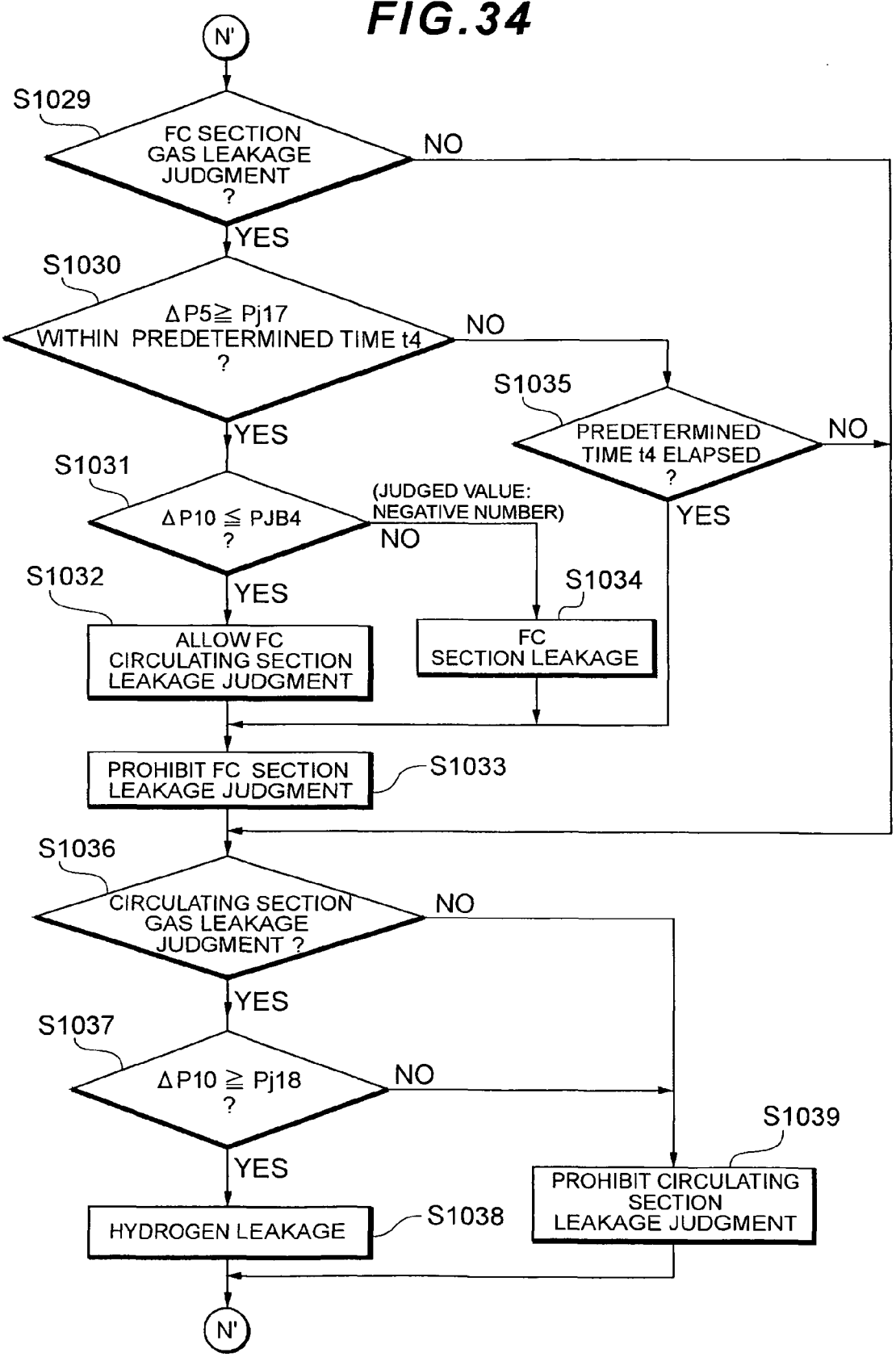

Next, gas leakage judgment (S1029) of the FC section will be described. As shown in FIG. 34, the control section judges whether or not the predetermined time t4 has elapsed from a time when the power generation was prohibited (S1008) in the above-mentioned valve closing processing, and further judges whether or not a differential pressure ΔP5 between the stored pressure P5P and the measured pressure of the pressure sensor P5 reaches a predetermined threshold pressure Pj17 or more within this predetermined time t4 (S1030). The step S1030 is one embodiment of the second step in the present invention. Subsequently, in a case where the differential pressure ΔP5 reaches the predetermined pressure Pj17 or more within the predetermined time t4 (S1030; YES), the control section judges whether or not an absolute value of a differential pressure ΔP10 between the stored pressure P10P and the measured pressure of the pressure sensor P10 is a predetermined pressure PJB4 (a negative value) or less (S1031). When the absolute value of the differential pressure ΔP10 is the predetermined pressure PJB4 or less (there is a pressure rise) (S1031; YES), the gas leakage judgment of the FC circulating section is allowed (S1032). Afterward, the control section prohibits the gas leakage judgment of the FC section (S1033).

On the other hand, in a case where the differential pressure ΔP5 reaches the predetermined pressure Pj17 or more within the predetermined time t4 (S1030; YES), and the differential pressure ΔP10 exceeds the predetermined pressure PJB4 (there is not any pressure rise) (S1031; NO), it is judged that the gas leakage has been generated in the FC section (S1034), and the gas leakage judgment of the FC section is prohibited (S1033). The step S1031 is one embodiment of the third step of the present invention. As causes for the gas leakage of the FC section, opening failure of the FC inlet valve H21 or the FC outlet valve H22, breakage of the fuel gas supply path 31 or the fuel gas circulation path 32 and the like are considered. It is to be noted that when the differential pressure ΔP5 is less than the predetermined pressure Pj17 and the predetermined time t4 elapses (S1030; NO, S1035; YES), the gas leakage judgment of the FC section is prohibited without performing any special processing (S1033). Even in a case where the predetermined time t4 has not elapsed (S1035; NO), the control section shifts to the next gas leakage judgment of the circulating section.

Subsequently, gas leakage judgment (S1036) of the circulating section will be described. As shown in FIG. 34, the control section judges whether or not a differential pressure ΔP10 between the stored pressure P10P and the measured pressure of the pressure sensor P10 reaches a predetermined threshold pressure Pj18 or more (S1037). Subsequently, in a case where the differential pressure ΔP10 reaches the predetermined pressure Pj18 or more (S1037; YES), the control section judges that the gas leakage has been generated in the circulating section (S1038), and shifts to the next step. As causes for the gas leakage, opening failure of the FC outlet valve H22 or a check valve H52, breakage of the fuel gas circulation path 32 and the like are considered. On the other hand, when the differential pressure ΔP10 is less than the predetermined threshold pressure Pj18 (S1037; NO), the control section prohibits the gas leakage judgment of the circulating section (S1039), and shifts to the next step.

Subsequently, in the same manner as in the first embodiment, there are performed gas leakage judgment of a high/low pressure section, gas leakage judgment of a high/low pressure FC section, gas leakage judgment of a high/low pressure FC circulating section, gas leakage judgment of a low pressure FC section, gas leakage judgment of a low pressure FC circulating section and gas leakage judgment of an FC circulating section. Since these gas leakage judgments of the high/low pressure section to the FC circulating section are substantially the same as those of the first embodiment (FIGS. 20 to 25), description thereof is omitted.

In the fuel battery system according to the above-mentioned embodiment, gas leakage of a new closed space constituted of one closed space and another closed space (a closed space concerned with the low pressure section) adjoining this one closed space on a downstream side is detected, in a case where a pressure of the other closed space adjoining the one closed space (e.g., a closed space concerned with the high pressure section) as a gas leakage detection target on the downstream side rises. That is, two closed spaces are allowed to communicate with each other, thereby forming one closed space, so that the gas leakage (the abnormality) can be detected. Therefore, the gas leakage detection can easily and quickly be performed in the whole system.

It is to be noted that in the above-mentioned embodiments, an example has been illustrated in which the present invention is applied to the system for detecting the gas leakage of the gas passage of the fuel gas (the opening failures of the valves arranged along the gas passage, leakage from the gas passage), but the present invention is applicable to a system which detects gas leakage of a gas passage of an oxidizing gas.

Moreover, in the above embodiments, the battery is illustrated as a load driving source, but the present invention is applicable to any power accumulation device such as a capacitor. The present invention is not limited to the power accumulation device, and is applicable to all load driving sources disposed separately from the fuel battery. For example, in a hybrid electric car including a fuel tank and an engine in addition to the fuel battery, an internal combustion unit such as an engine can be used as a load driving source. In a train or the like including a power receiving mechanism which receives supply of power via a power feed wire or the like in addition to the fuel battery, the power receiving mechanism can be used as the load driving source. Furthermore, in an airplane or the like including a gas turbine in addition to the fuel battery, a gas turbine can be used as the load driving source. In a submarine or the like including an atomic furnace in addition to the fuel battery, an atomic power generation mechanism such as the atomic furnace can be used as the load driving source. Furthermore, a power generator (an alternator) or the like which generates power with a driving force of the internal combustion engine may be used as the load driving source. The sum of the power which can be supplied to the load from any of these other load driving sources may be obtained to judge whether or not the obtained sum is system required power or more (FIG. 5; S11b to S11e).

Components S11b to S11e of FIG. 5 will be described. When the control section calculates the battery dischargeable power W3, the section calculates the internal combustion engine supply power W4 based on a detection signal of an internal combustion engine state detection sensor (not shown) (S11a→S11b). Similarly, the control section calculates receivable power W5, gas turbine supply power W6 and atomic force supply power W7 based on a power receiving state detection sensor, a gas turbine state detection sensor, an atomic furnace state detection sensor and the like (not shown), respectively. Then, the control section calculates the vehicle required power PPW based on the accelerator open degree, the car speed and the like, and then judges whether or not the sum of the power which can be supplied by these other driving sources is the vehicle required power PPW or more (S21→S31). Since the subsequent processing is similar to that of the present embodiment, the description thereof is omitted. As described above. The present invention is applicable to not only a case where one load driving source disposed separately from the fuel battery is present but also a case where a plurality of load driving sources are present.

INDUSTRIAL APPLICABILITY

As described above, according to the present invention, accuracy of gas leakage detection of a fuel battery system can be improved.

The invention claimed is:

1. A fuel battery system comprising:
a fuel battery to which a reactive gas is supplied to generate power;
a pipe which communicates with the fuel battery;
a plurality of valves which are disposed in the pipe and which form a plurality of adjoining closed spaces in the pipe;
a first pressure sensor which measures a pressure of a first closed space as a gas leakage detection target;
a second pressure sensor which measures a pressure of a second closed space adjoining the first closed space on a downstream side; and
a control section having a processor,
wherein said control section is programmed to detect gas leakage in the first closed space based on a combination of a pressure measurement result of the first pressure sensor and a pressure measurement result of the second pressure sensor in a state in which the pressure of the second closed space is lowered below the pressure of the first closed space,
wherein said control section is programmed to judge the gas leakage from a valve of the plurality of valves, the valve disposed between the first closed space and the second closed space, in a case where a pressure reduction value of the first closed space is a predetermined threshold value or more and a pressure rise value of the second closed space is a predetermined threshold value or more, and
wherein said control section is programmed to judge the gas leakage from the pipe of the first closed space, in a case where the pressure reduction value of the first closed space is the predetermined threshold value or more, and the pressure rise value of the second closed space is less than the predetermined threshold value.

2. The fuel battery system according to claim 1, further comprising:
a third pressure sensor disposed in a third closed space which adjoins the second closed space on the downstream side,
wherein said control section is programmed to detect the gas leakage from a new closed space based on a pressure measurement result of the new closed space including the first closed space and the second closed space in a state in which the pressure of the third closed space is lowered below the pressure of the second closed space, in a case where the pressure reduction value of the first closed space is a predetermined threshold value or more and the pressure rise value of the second closed space is less than a predetermined threshold value or more.

3. The fuel battery system according to claim 1, wherein said control section is programmed to detect the gas leakage of the closed space including at least one pressure reduction valve.

4. A mobile object comprising a fuel battery system according to claim 1.

5. A method for detecting gas leakage in a fuel battery system including a fuel battery to which a reactive gas is supplied to generate power, and a gas passage which communicates with the fuel battery and in which a plurality of adjoining closed spaces are formed, the method comprising:
a first step of lowering a pressure of a second closed space adjoining a first closed space as a gas leakage detection target on a downstream side below a pressure of the first closed space;
a second step of judging whether or not a pressure reduction value in the first closed space for a predetermined time is a predetermined threshold value or more; and
a third step of judging whether or not a pressure rise value of the second closed space is a predetermined threshold value or more, in a case where it is judged in the second step that the pressure reduction value in the first closed space for the predetermined time is the predetermined threshold value or more,
wherein in the third step,
the gas leakage from a valve disposed between the first closed space and the second closed space is judged, when the pressure rise value of the second closed space is the predetermined threshold value or more, and
the gas leakage from the pipe of the first closed space is judged, when the pressure rise value of the second closed space is less than the predetermined threshold value.

6. The method for detecting the gas leakage in the fuel battery system according to claim 5, wherein when it is judged in the third step that the pressure rise value of the second closed space is the predetermined threshold value or more, a new closed space including the first closed space and the second closed space is set as the first closed space, and a closed space present on a downstream side of the new closed space is set as a new second closed space to repeat the first to third steps.

* * * * *